US011860566B2

(12) United States Patent
Kanazawa et al.

(10) Patent No.: US 11,860,566 B2
(45) Date of Patent: Jan. 2, 2024

(54) IMAGE FORMING APPARATUS

(71) Applicant: CANON KABUSHIKI KAISHA, Tokyo (JP)

(72) Inventors: Takayuki Kanazawa, Kanagawa (JP); Nobuo Oshima, Tokyo (JP); Takayoshi Kihara, Shizuoka (JP); Kuniaki Tamagaki, Kanagawa (JP); Shuhei Tokiwa, Tokyo (JP); Taichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/081,910

(22) Filed: Dec. 15, 2022

(65) Prior Publication Data

US 2023/0195026 A1 Jun. 22, 2023

(30) Foreign Application Priority Data

Dec. 17, 2021 (JP) ................................ 2021-204782
Dec. 17, 2021 (JP) ................................ 2021-204783

(51) Int. Cl.
*G03G 21/00* (2006.01)
*G03G 15/02* (2006.01)
(Continued)

(52) U.S. Cl.
CPC ..... *G03G 21/0064* (2013.01); *G03G 15/0225* (2013.01); *G03G 15/168* (2013.01);
(Continued)

(58) Field of Classification Search
CPC .......... G03G 21/0005; G03G 21/0035; G03G 21/007; G03G 21/169; G03G 21/0064;
(Continued)

(56) References Cited

U.S. PATENT DOCUMENTS 6,928,253 B2 8/2005 Ojima
7,058,338 B2 6/2006 Ojima et al.
(Continued)

FOREIGN PATENT DOCUMENTS

JP S63-249186 A 10/1988
JP H08-314289 A 11/1996
(Continued)

OTHER PUBLICATIONS

U.S. Appl. No. 17/985,240, filed Nov. 11, 2022 (First Named Inventor: Shunsuke Matsushita).
Search Report dated Oct. 9, 2023, in European Patent Application No. 22212737.5.

*Primary Examiner* — Joseph S Wong
(74) *Attorney, Agent, or Firm* — Venable LLP

(57) ABSTRACT

An image forming apparatus includes a rotatable image bearing member, a developing member, a transfer member, and a brush contacting a surface of the image bearing member in a contact portion downstream of a transfer portion and upstream of a developing portion with respect to a rotational direction of the image bearing member. The toner which is not transferred onto a toner image receiving member is collected by the developing member. In a charging series, the toner is positioned on the same side as a normal charge polarity of the toner relative to the brush. In the contact portion, a maximum value of a contact pressure of 0.7 gf/mm$^2$ or more and 3.5 gf/mm$^2$ or less, a maximum contact area ratio is 18% or more and 74% or less, and a Clark-Evans index of the brush is 1 or more.

37 Claims, 30 Drawing Sheets

(51) Int. Cl.
*G03G 15/16* (2006.01)
*G03G 21/16* (2006.01)

(52) U.S. Cl.
CPC ....... *G03G 21/0005* (2013.01); *G03G 21/007* (2013.01); *G03G 21/169* (2013.01); *G03G 21/0035* (2013.01); *G03G 2215/022* (2013.01); *G03G 2221/0005* (2013.01); *G03G 2221/0089* (2013.01); *G03G 2221/1618* (2013.01); *G03G 2221/1627* (2013.01)

(58) Field of Classification Search
CPC ... G03G 2221/0089; G03G 2221/1618; G03G 2221/1627; G03G 2221/0005; G03G 15/0225; G03G 15/168; G03G 2215/022
See application file for complete search history.

(56) References Cited

U.S. PATENT DOCUMENTS

| | | | | |
|---|---|---|---|---|
| 9,971,298 | B2 | 5/2018 | Matsukawa et al. | |
| 2001/0051061 | A1* | 12/2001 | Bessho ................ | G03G 15/167 399/175 |
| 2006/0045571 | A1* | 3/2006 | Matsuura ........... | G03G 21/0064 399/258 |
| 2021/0382430 | A1* | 12/2021 | Funatani ............ | G03G 15/0131 |

FOREIGN PATENT DOCUMENTS

| | | | |
|---|---|---|---|
| JP | 2004-163911 | A | 6/2004 |
| JP | 2004-212854 | A | 7/2004 |
| JP | 2004-264508 | A | 9/2004 |
| JP | 2007-219563 | A | 8/2007 |
| JP | 2010-14982 | A | 1/2010 |
| JP | 2016-161902 | A | 9/2016 |
| JP | 2019-045801 | A | 3/2019 |

* cited by examiner (a)

(b)

(a)

(b)

IMAGE FORMING APPARATUS

FIELD OF THE INVENTION AND RELATED ART

The present invention relates to an image forming apparatus for forming an image on a recording material.

In the image forming apparatus of an electrophotographic type, a constitution which is called a simultaneous development and cleaning or a cleaner-less type has been known. Residual toner remaining on a surface of an image bearing member such as a photosensitive drum even after a toner image is transferred from the image bearing member onto a toner image receiving member (recording material or intermediary transfer member) is not collected by a cleaning device, but is collected simultaneously with a subsequent developing process by a developing member such as a developing roller.

In Japanese Laid-Open Patent Application (JP-A) 2010-14982, a constitution in which in the image forming apparatus of the cleaner-less type, a brush member for scattering transfer residual toner deposited on the photosensitive drum is provided downstream of a transfer roller and upstream of a charging brush with respect to a rotational direction of the photosensitive drum is disclosed. According to JP-A 2010-14982, the residual toner distributed in the same pattern as a toner image transferred on a recording material is scattered by the brush member, and thus behavior of the residual toner on a charging device or a developing device is uniformized, so that after-image due to the residual toner does not readily appear on the recording material.

In general, in the residual toner remaining on the surface of the image bearing member even after a transfer process, toner particles electrically charged to a normal polarity (normal charge polarity) of the toner, toner particles charged to a non-normal polarity opposite to the normal polarity, and toner particles of which charge amount is close to zero are contained. When the residual toner reaches a charging member or a developing member while being put in a state in which an electric charge distribution is broad, various inconveniences such as an occurrence of the after-image (fog image) resulting from improper charging due to contamination of the charging roller and improper collection of the residual toner by the developing member, and the like can occur.

For that reason, it would be considered that the brush member is disposed in a position downstream of a transfer member and upstream of the charging member with respect to a rotational direction of the image bearing member and thus an electric charge distribution of the residual toner is stabilized in the normal polarity by interposing the residual toner in the brush member between the transfer portion and the charging portion of the image bearing member. However, depending on a contact condition between the brush member and the image bearing member, the residual toner was not sufficiently charged to the normal polarity in some cases. Or, the residual toner was caused to concentratedly pass through a part of the brush member and was distributed in a stripe shape, so that deposition of the residual toner on the charging member was incapable of being suppressed in some cases.

SUMMARY OF THE INVENTION

Therefore, a principal object of the present invention is to provide an image forming apparatus capable of stabilizing an electric charge distribution of residual toner in a normal polarity.

Another object of the present invention is to provide an image forming apparatus capable of suppressing an occurrence of improper charging in a constitution in which a brush member contacting an image bearing member is provided.

According to an aspect of the present invention, there is provided an image forming apparatus comprising: a rotatable image bearing member; a developing member configured to develop an electrostatic latent image, formed on a surface of the image bearing member, with toner in a developing portion; a transfer member configured to transfer a toner image, obtained by developing the electrostatic latent image by the developing member, from the image bearing member onto a toner image receiving member in a transfer portion; and a brush contacting the surface of the image bearing member in a contact portion downstream of the transfer portion and upstream of the developing portion with respect to a rotational direction of the image bearing member, wherein the toner which is not transferred onto the toner image receiving member is collected by the developing member, wherein in a charging series, the toner is positioned on the same side as a normal charge polarity of the toner relative to the brush, and wherein in the contact portion, a maximum value of a contact pressure of 0.7 $gf/mm^2$ or more and 3.5 $gf/mm^2$ or less, a maximum area ratio is 18% or more and 74% or less, and a Clark-Evans index is 1 or more.

According to another aspect of the present invention, there is provided an image forming apparatus comprising: a rotatable image bearing member; a developing member configured to develop an electrostatic latent image, formed on a surface of the image bearing member, with toner in a developing portion; a transfer member configured to transfer a toner image, obtained by developing the electrostatic latent image by the developing member, from the image bearing member onto a toner image receiving member in a transfer portion; a brush contacting the surface of the image bearing member in a contact portion downstream of the transfer member and upstream of the developing member with respect to a rotational direction of the image bearing member; and voltage applying means, wherein the toner which is not transferred onto the toner image receiving member is collected by the developing member, wherein the voltage applied to the brush by the voltage applying means is on the same side as a normal charge polarity of the toner relative to a surface state of the image bearing member, and wherein in the contact portion, a maximum value of a contact pressure of 0.7 $gf/mm^2$ or more and 3.5 $gf/mm^2$ or less, a maximum area ratio is 18% or more and 74% or less, and a Clark-Evans index is 1 or more.

According to another aspect of the present invention, there is provided an image forming apparatus comprising: a rotatable image bearing member; a charging member forming a charging portion in contact with the image bearing member and configured to electrically charge a surface of the image bearing member in the charging portion; a developing member configured to develop, with the toner, an electrostatic latent image formed on the surface of the image bearing member; a transfer member configured to transfer a toner image, obtained by developing the electrostatic latent image by the developing member, from the image bearing member onto a toner image receiving member in a transfer portion; and a brush provided so as to contact the surface of the image bearing member in a contact portion downstream of the transfer portion and upstream of the charging portion with respect to a rotational direction of the image bearing member, and configured to electrically charge the toner which is not transferred onto the toner image receiving member, wherein the toner which is not transferred onto the toner image receiving member is collected by the developing member, wherein with respect to the rotational direction, a contact pressure between the brush and the image bearing member at an upstream end of the brush in the contact portion is higher than a contact pressure between the brush and the image bearing member at a downstream end of the brush in the contact portion, and wherein a contact area ratio between the brush and the image bearing member at the upstream end of the brush is larger than a contact area ratio between the brush and the image bearing member at the downstream end of the brush.

According to a further aspect of the present invention, there is provided an image forming apparatus comprising: a rotatable image bearing member; a charging member forming a charging portion in contact with the image bearing member and configured to electrically charge a surface of the image bearing member in the charging portion; a developing member configured to develop, with the toner, an electrostatic latent image formed on the surface of the image bearing member; a transfer member configured to transfer a toner image, obtained by developing the electrostatic latent image by the developing member, from the image bearing member onto a toner image receiving member in a transfer portion; and a brush provided so as to contact the surface of the image bearing member in a contact portion downstream of the transfer portion and upstream of the charging portion with respect to a rotational direction of the image bearing member, and configured to electrically charge the toner which is not transferred onto the toner image receiving member, wherein the toner which is not transferred onto the toner image receiving member is collected by the developing member, and wherein when a penetration amount of the brush in the surface of the image bearing member at the upstream end of the brush with respect to the rotational direction is δ1 (mm) and a penetration amount of the brush in the surface of the image bearing member at the downstream end of the brush with respect to the rotational direction is δ2 (mm), the following relationship is satisfied: $\delta 1 < \delta 2 > 0$.

Further features of the present invention will become apparent from the following description of exemplary embodiments with reference to the attached drawings.

Figure 3:
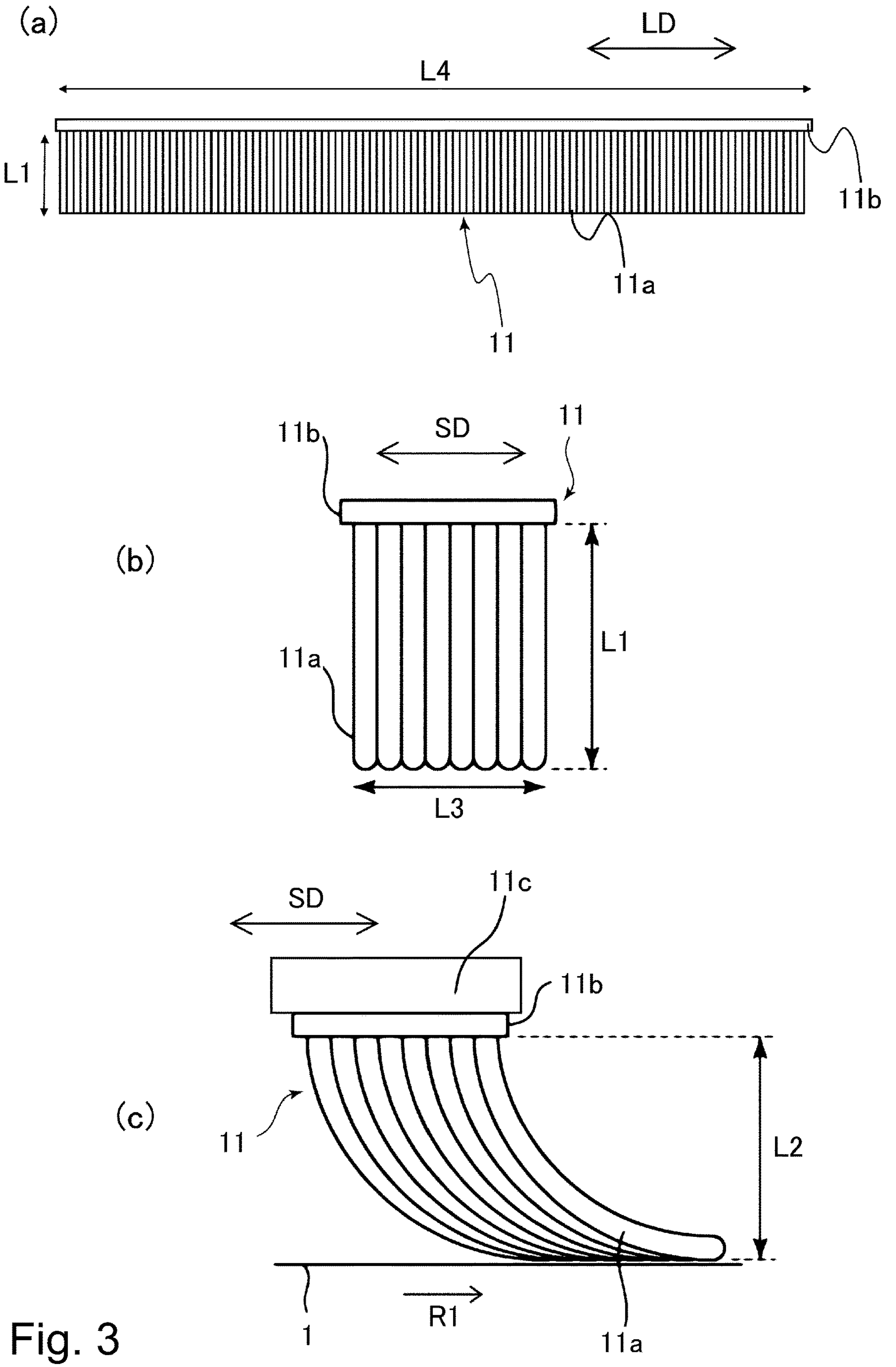

Part (a) of FIG. 3 is a front view of a brush member in the first embodiment, and parts (b) and (c) of FIG. 3 are sectional views of the brush member in the first embodiment.

Figure 4:
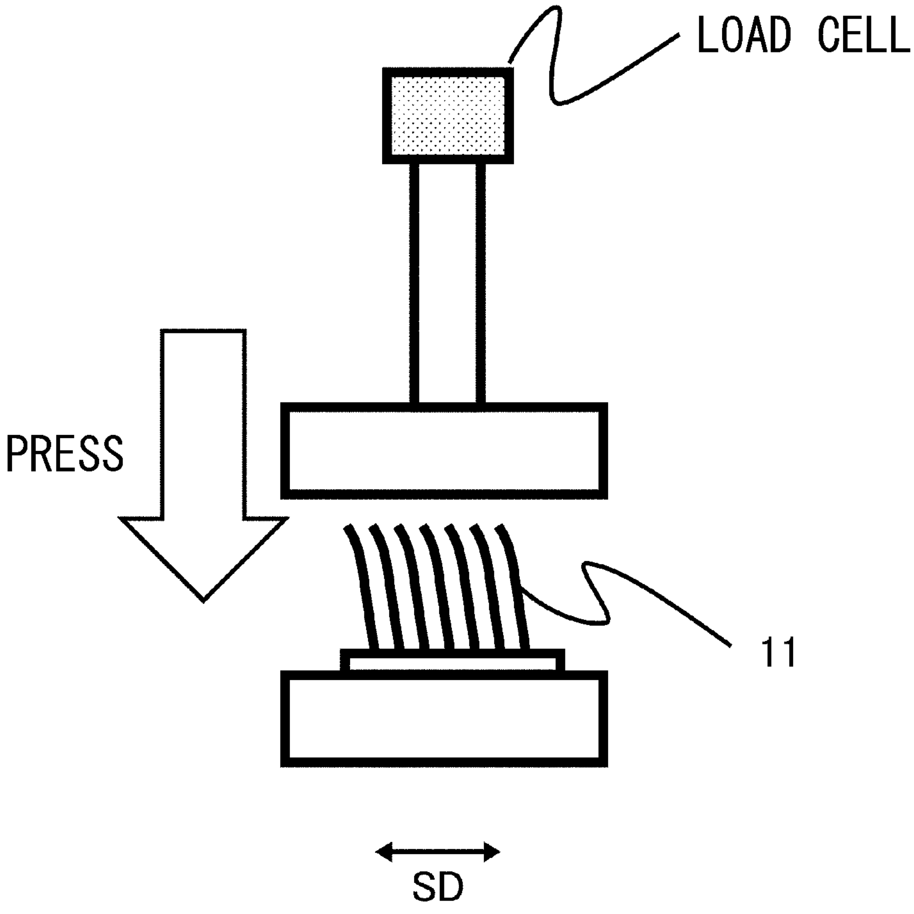

FIG. 4 is a schematic view showing a measuring method of normal reaction received by the brush member.

Figure 5:
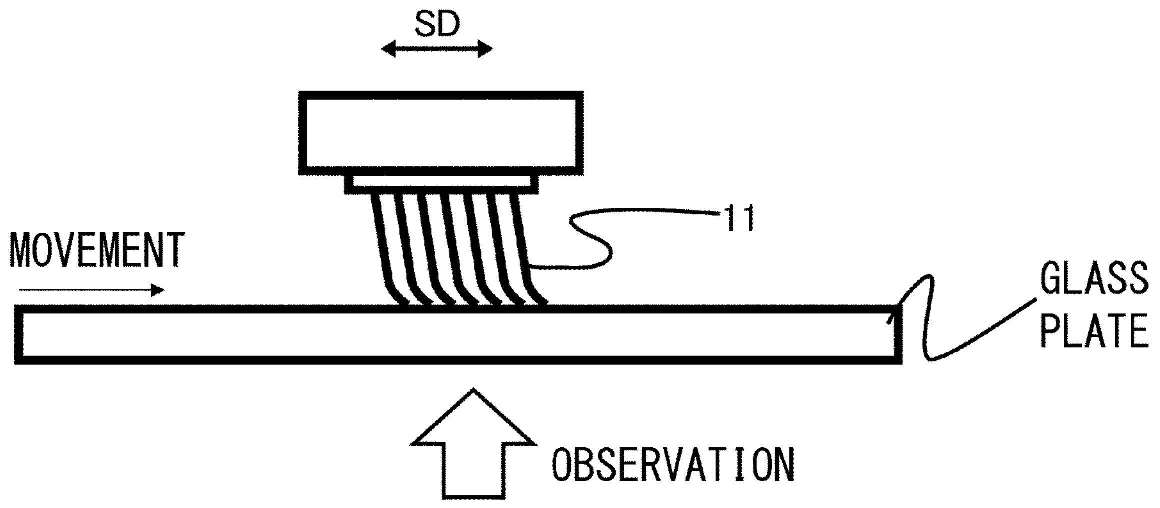

FIG. 5 is a schematic view showing an observation method of the brush member with use of a glass plate.

Figure 6:
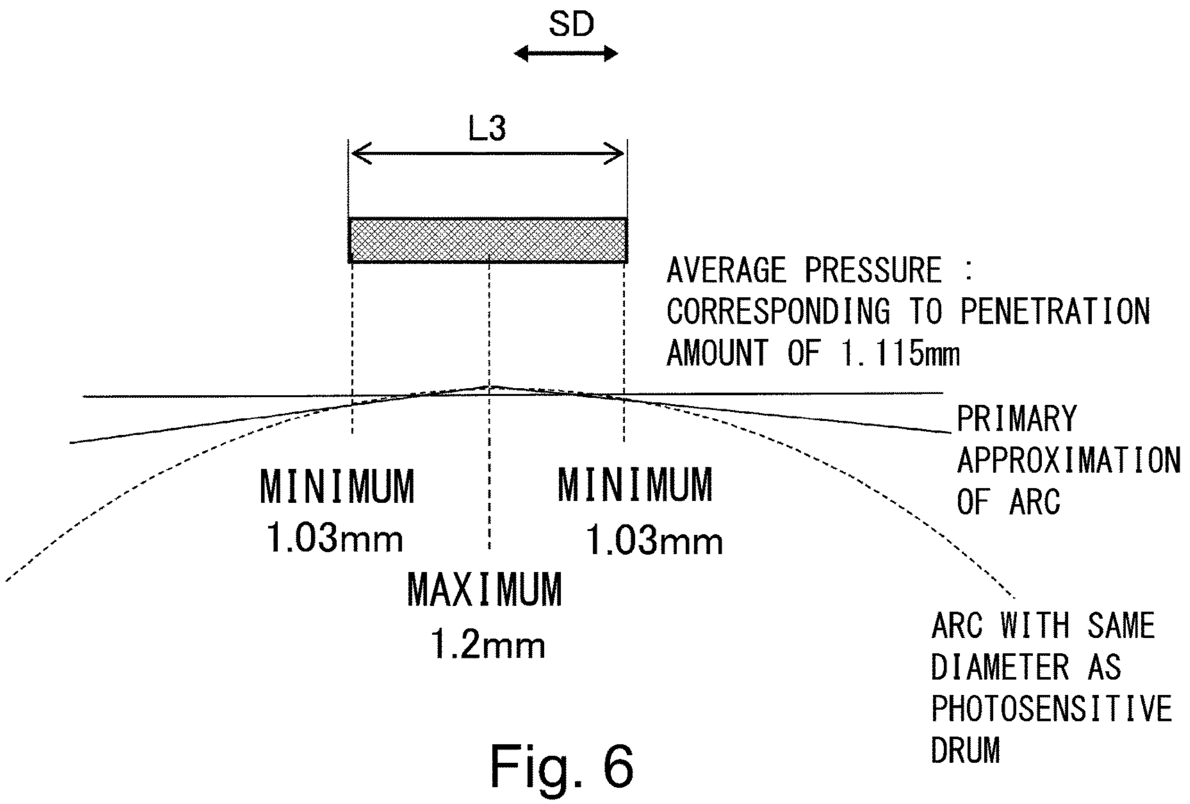

FIG. 6 is a schematic view for illustrating a calculating method of the peak pressure.

Figure 7:
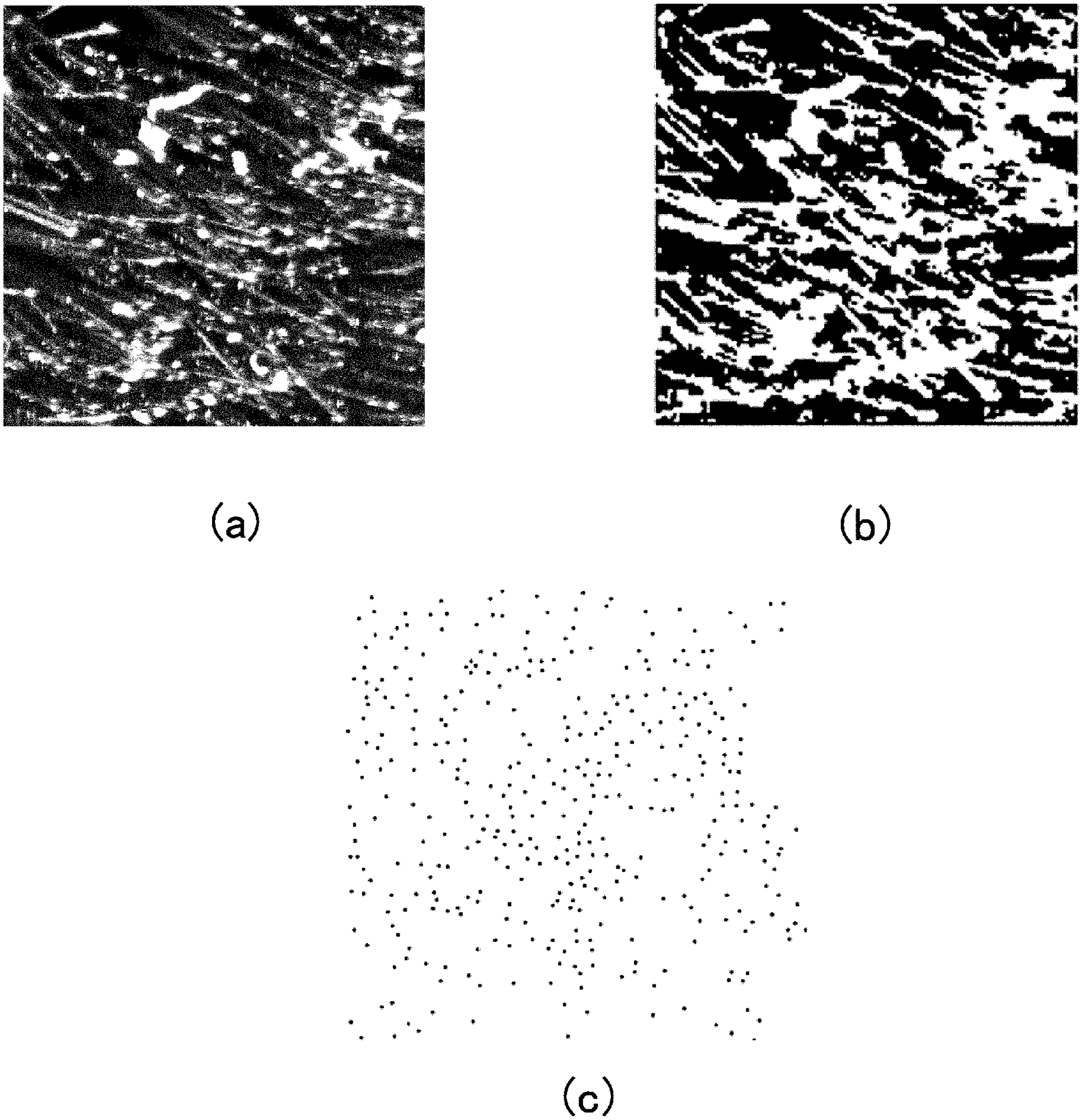

Part (a) of FIG. 7 is a schematic view showing an example of a brush contact portion observed with use of the glass plat, part (b) of FIG. 7 is a schematic view for illustrating a calculating method of contact area ratio, and part (c) of FIG. 7 is a schematic view for illustrating a calculating method of Clark-Evans index.

Figure 8:
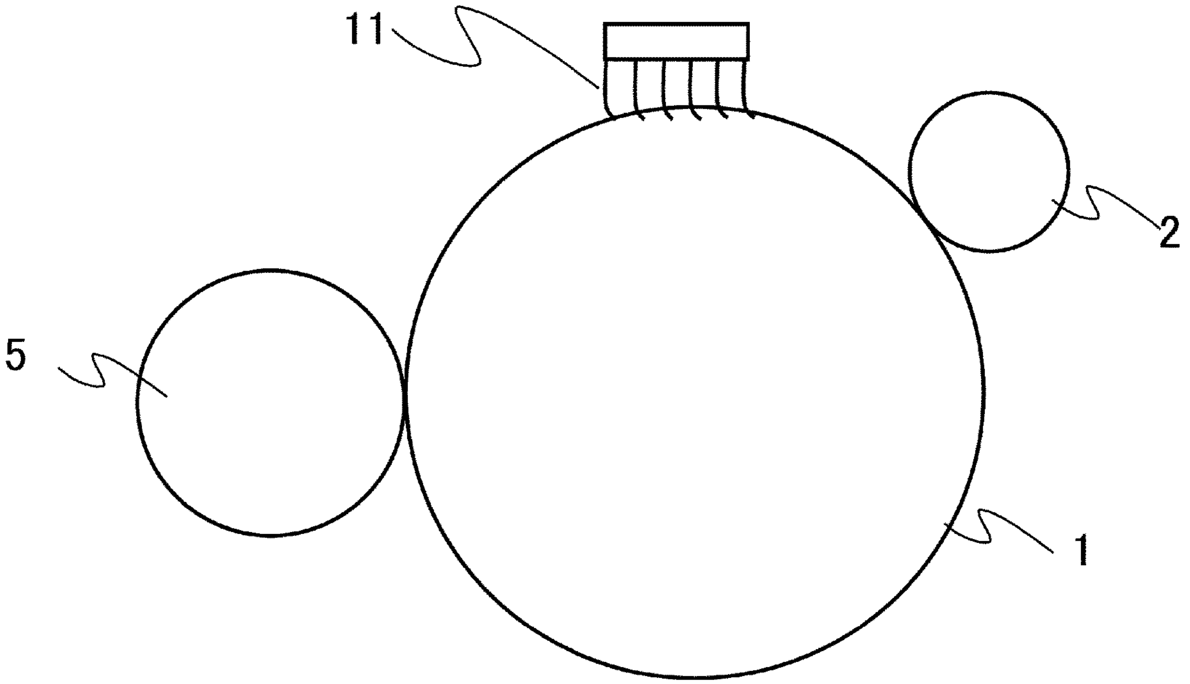

FIG. 8 is a schematic view of an image forming portion in a reference example 1.

Figure 9:
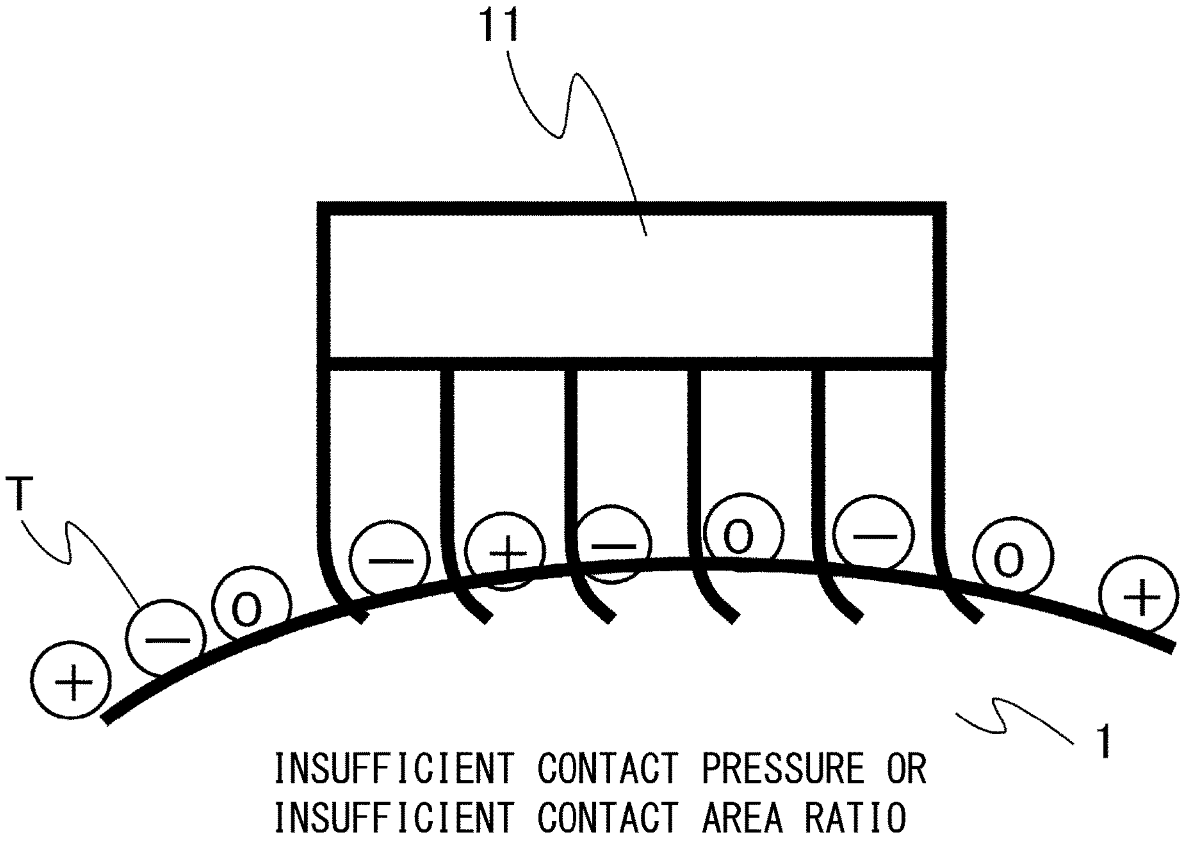

FIG. 9 is an enlarged view of a part of FIG. 8.

Figure 10:
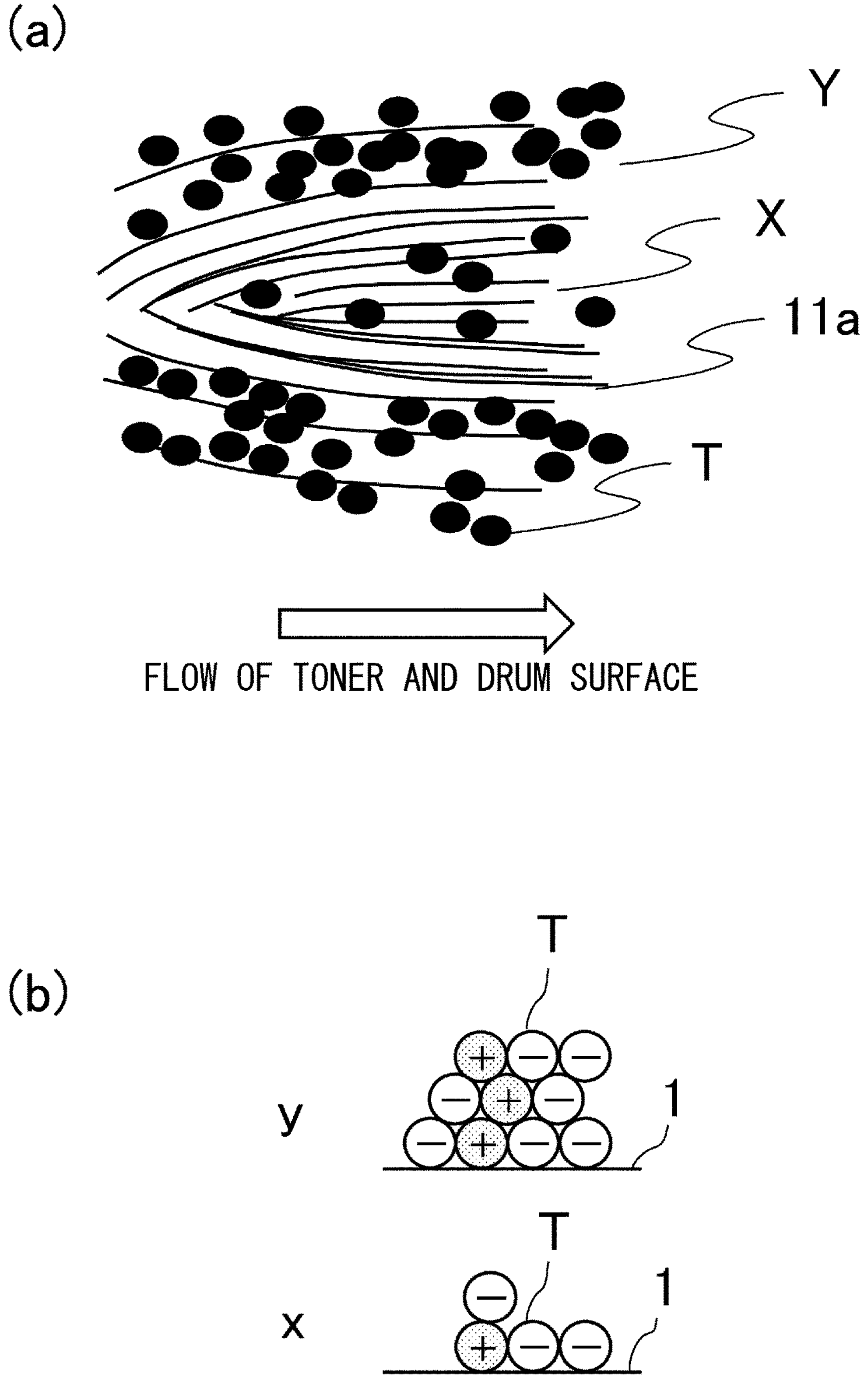

Part (a) of FIG. 10 is a schematic view of a brush contact portion in a reference example 2, and part (b) of FIG. 10 is a schematic view of a photosensitive drum surface passed through the brush contact portion in the reference example 2.

Figure 11:
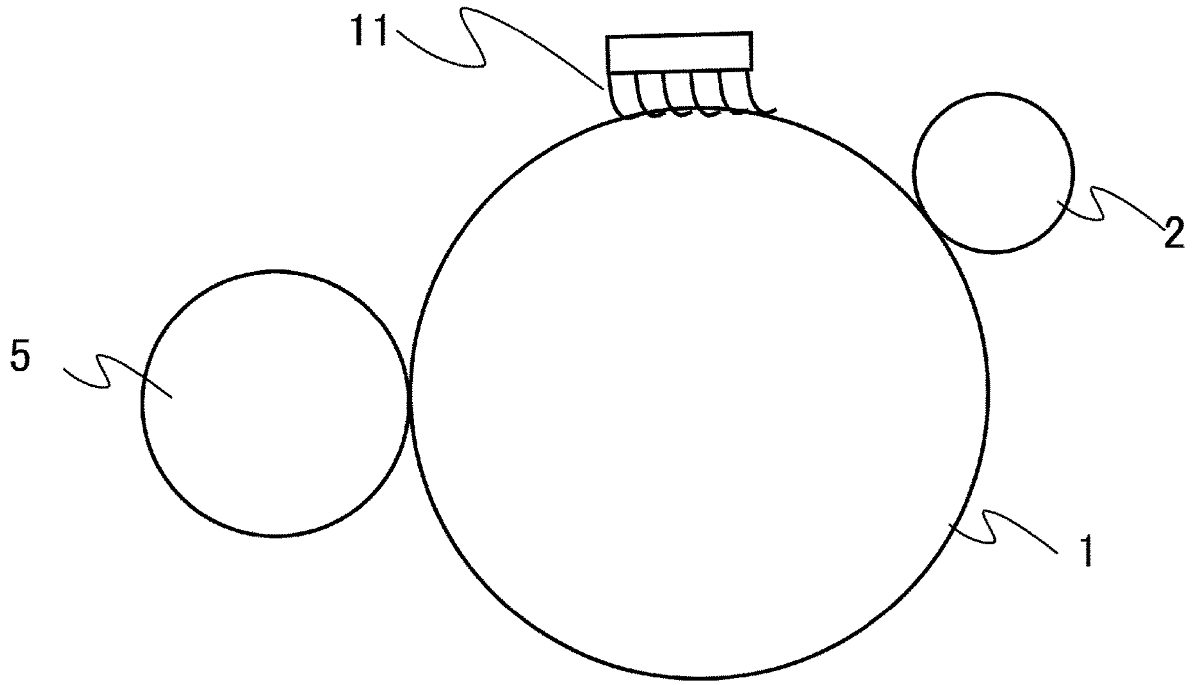

FIG. 11 is a schematic view of an image forming portion in the first embodiment.

Figure 12:
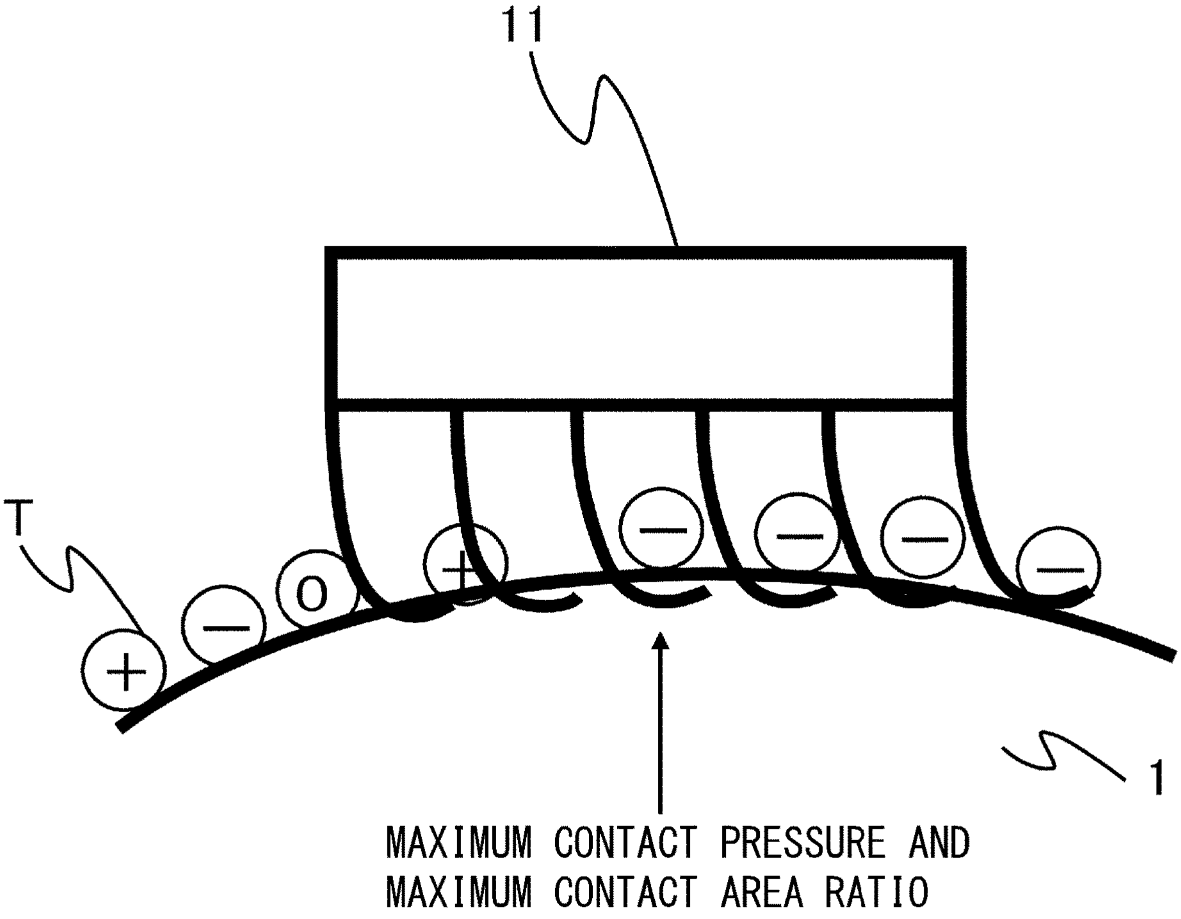

FIG. 12 is an enlarged view of a part of FIG. 11.

Figure 13:
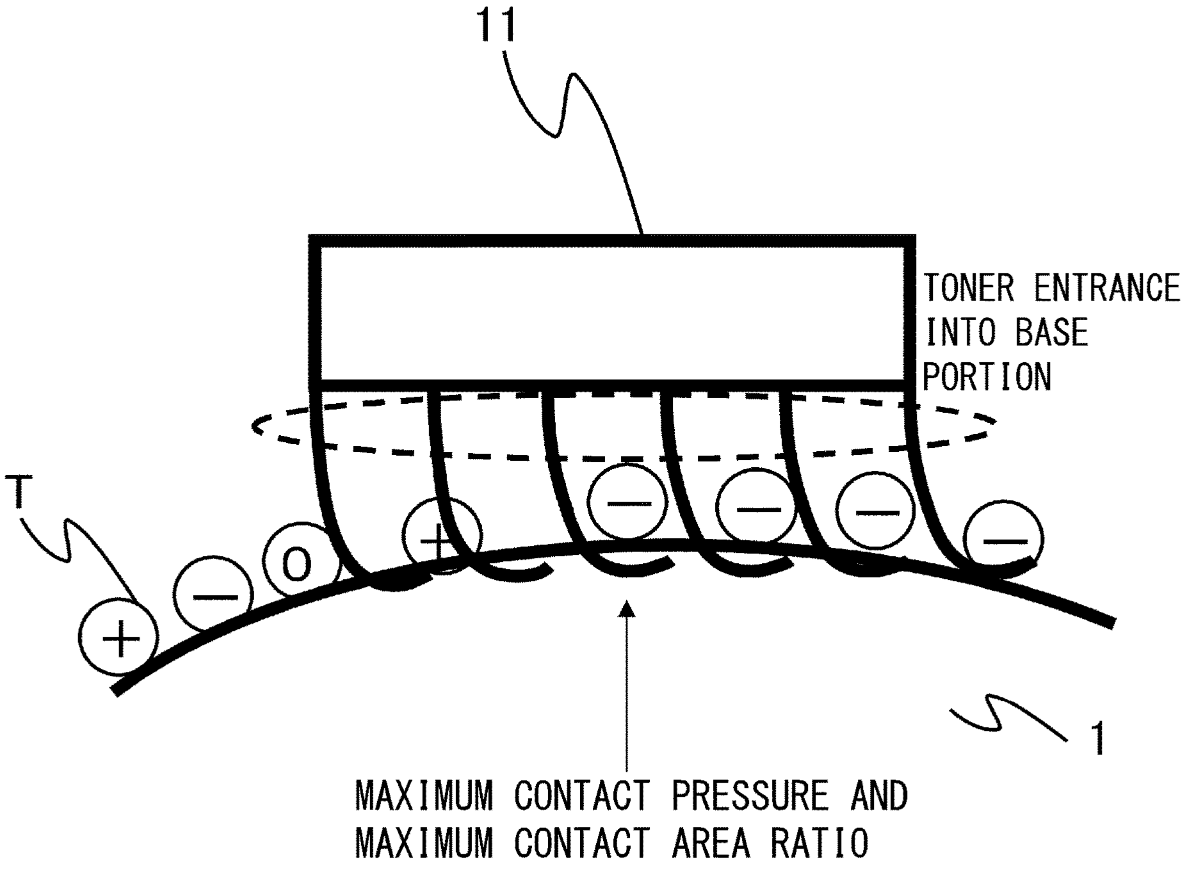

FIG. 13 is a schematic view of a brush member in a second embodiment.

Figure 14:
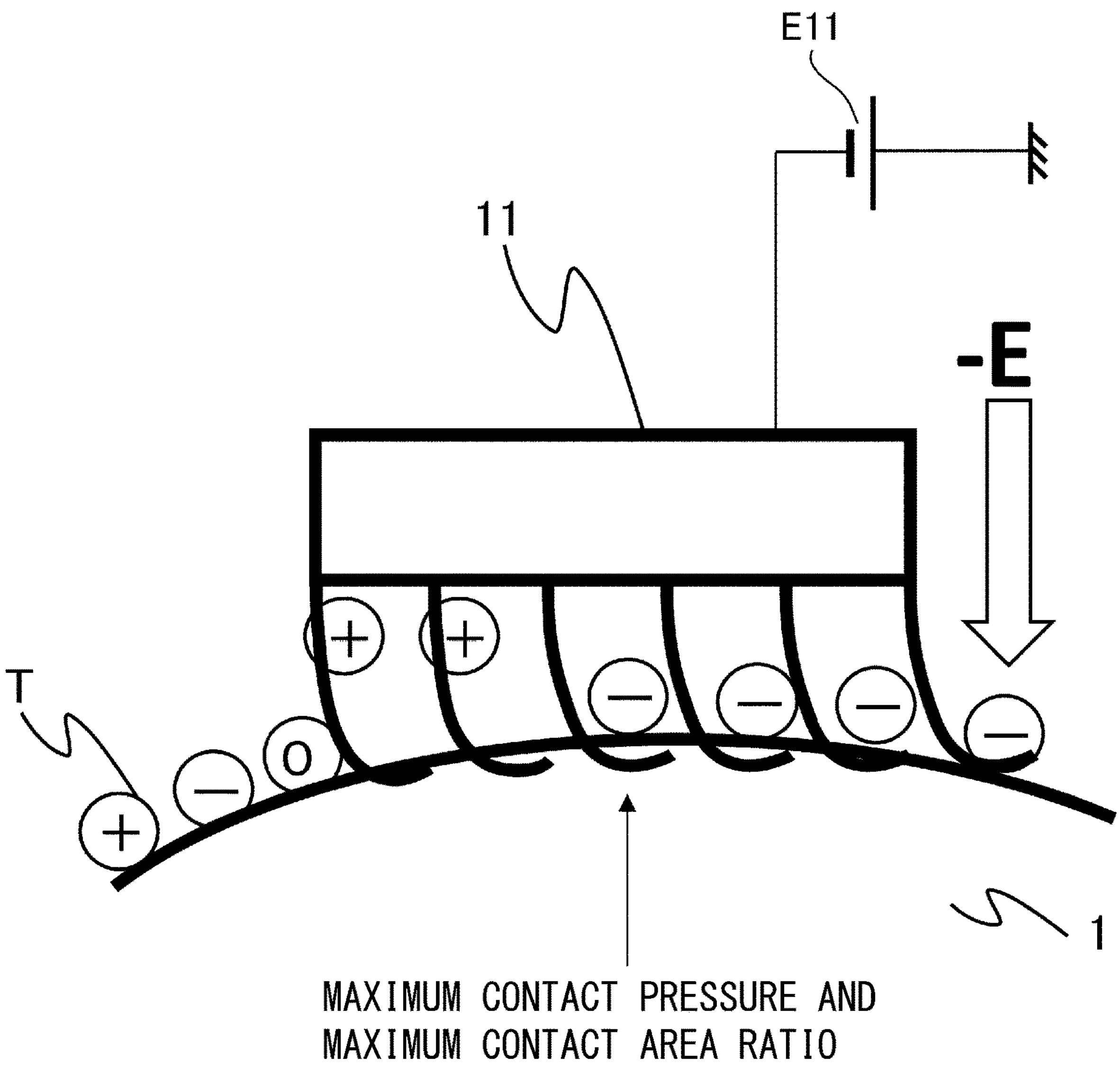

FIG. 14 is a schematic view of the brush member in the second embodiment.

Figure 15:
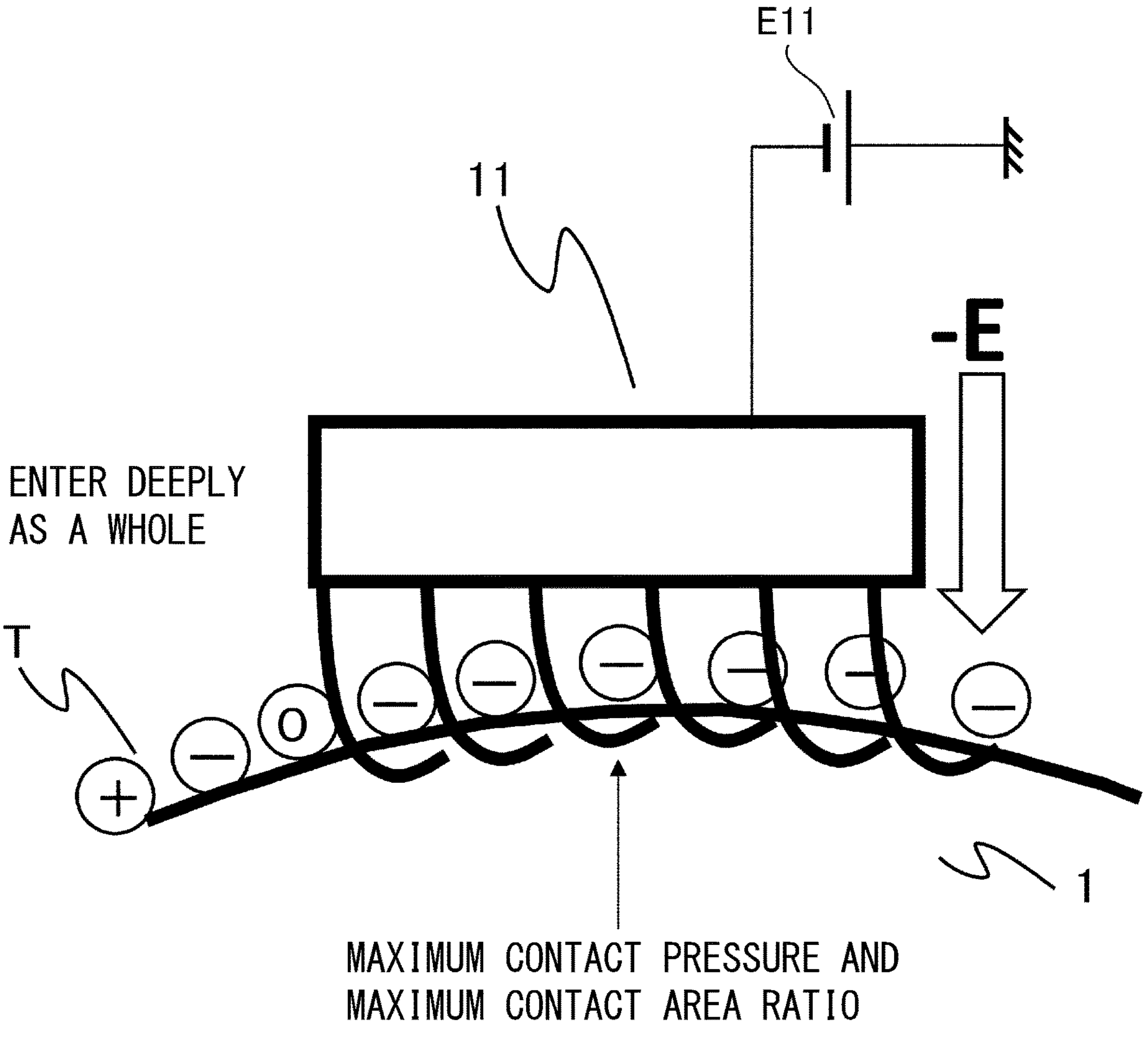

FIG. 15 is a schematic view showing a state in which a penetration amount of the brush member is increased in the second embodiment.

Figure 16:
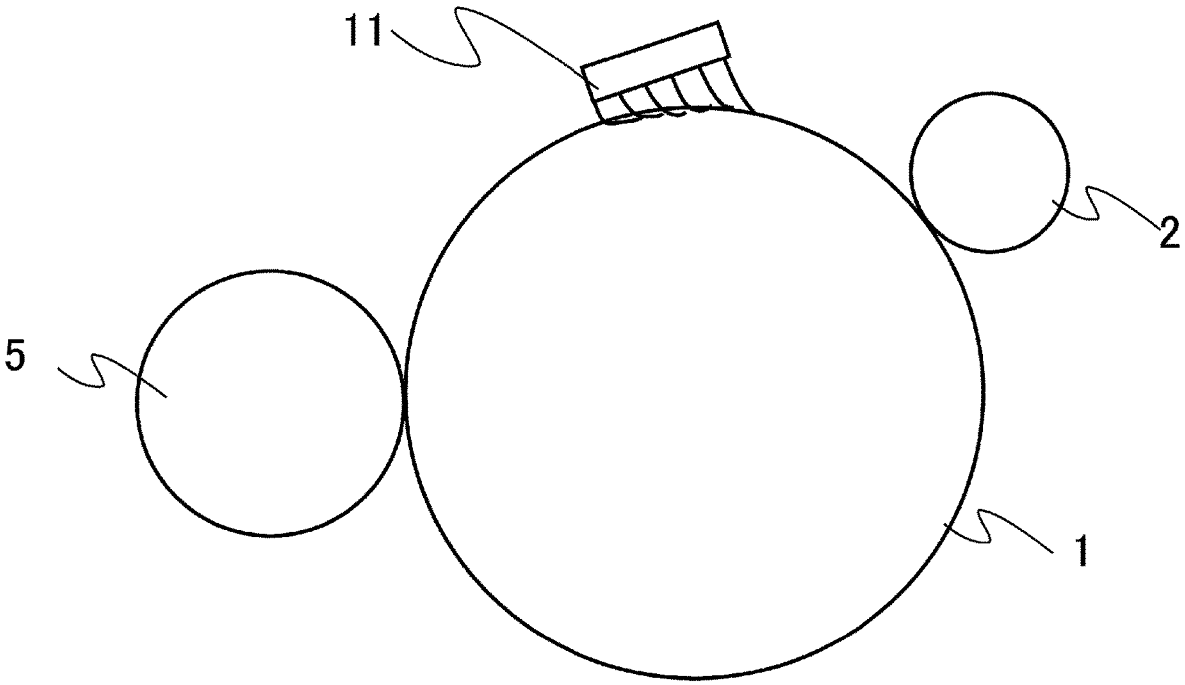

FIG. 16 is a schematic view of an image forming portion in a third embodiment.

Figure 17:
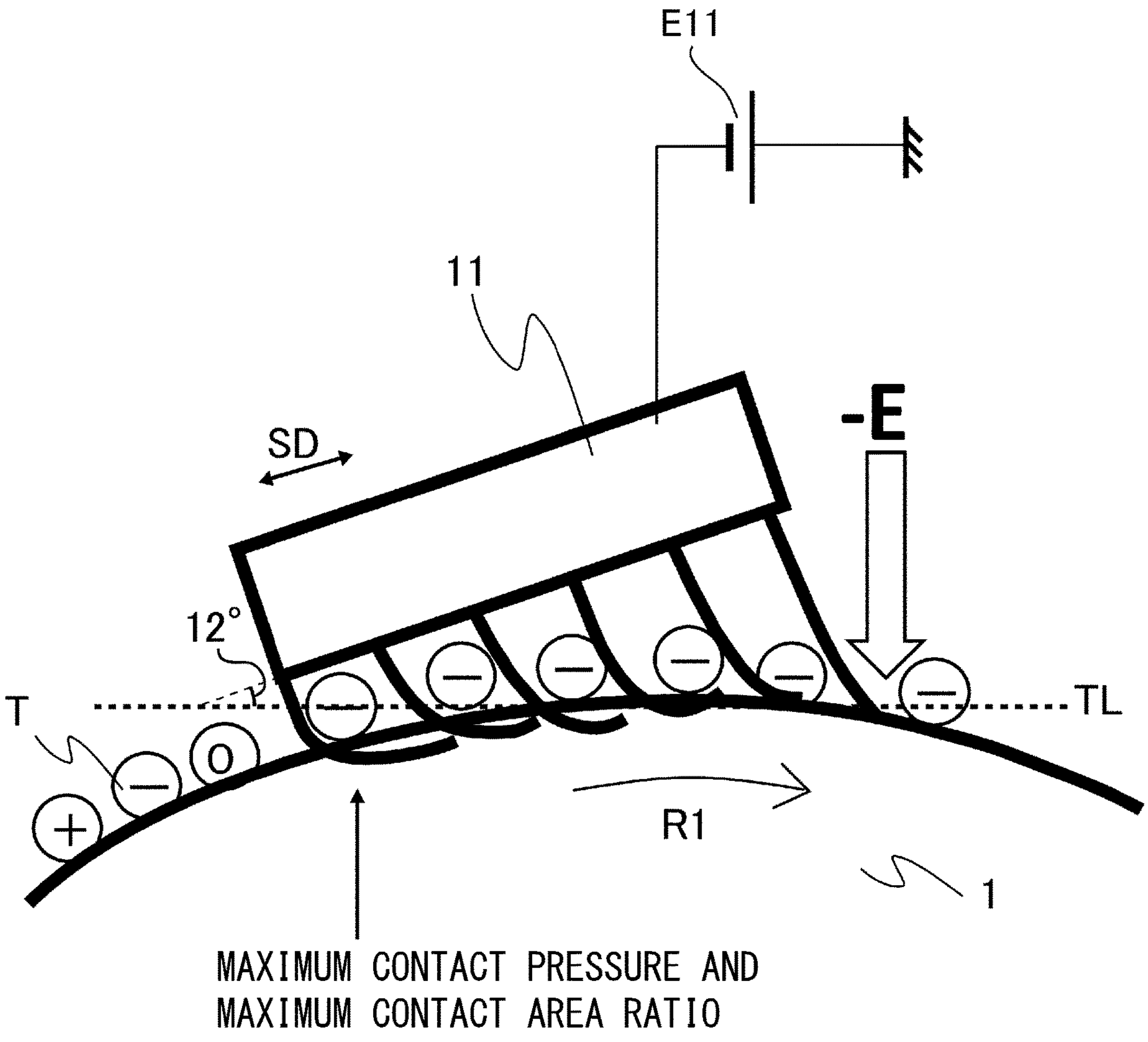

FIG. 17 is an enlarged view of a part of FIG. 16.

Figure 18:
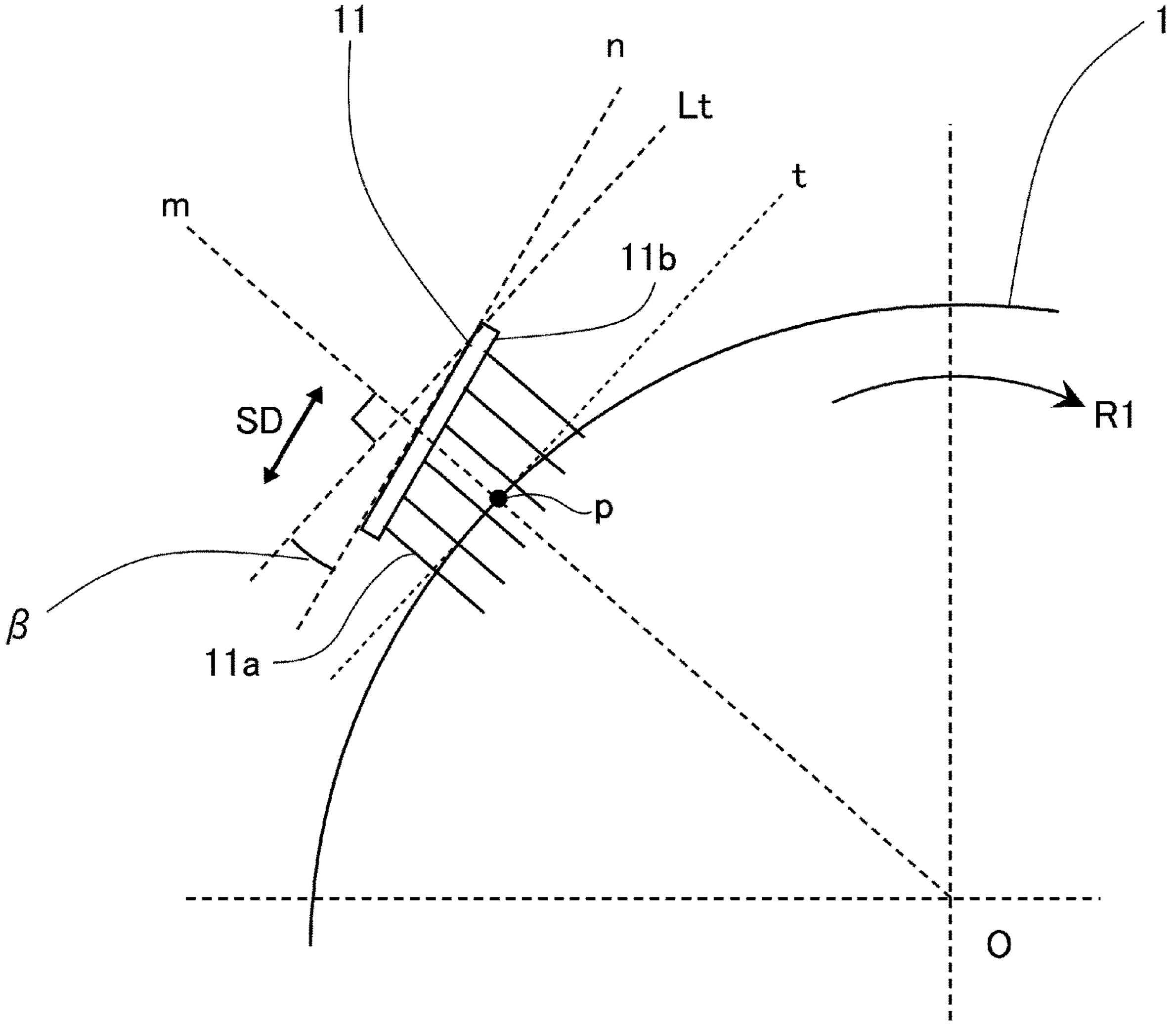

FIG. 18 is a schematic view for illustrating arrangement of a brush member in a fourth embodiment.

Figure 19:
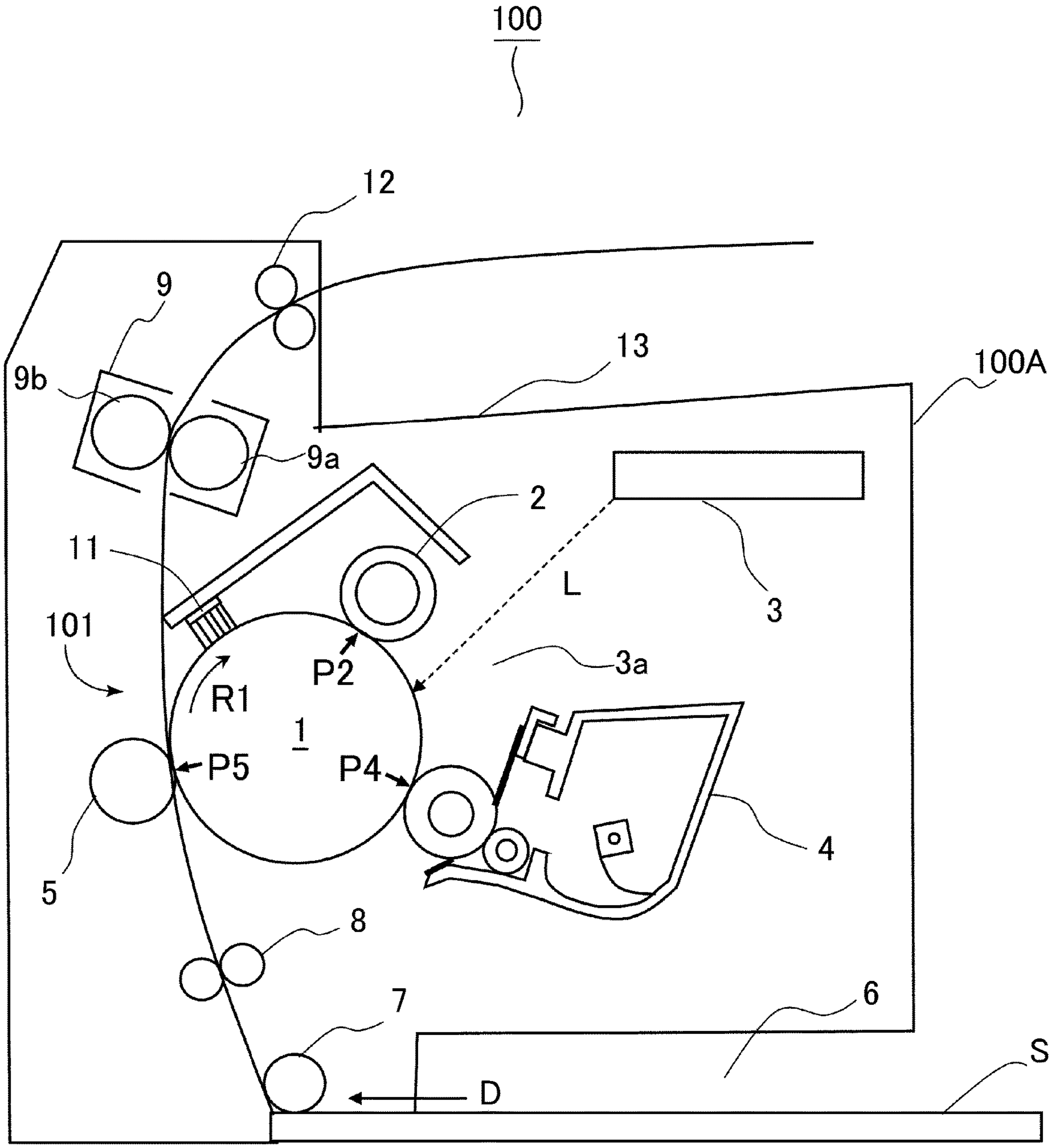

FIG. 19 is a schematic view of an image forming apparatus according to the fourth embodiment.

Figure 20:
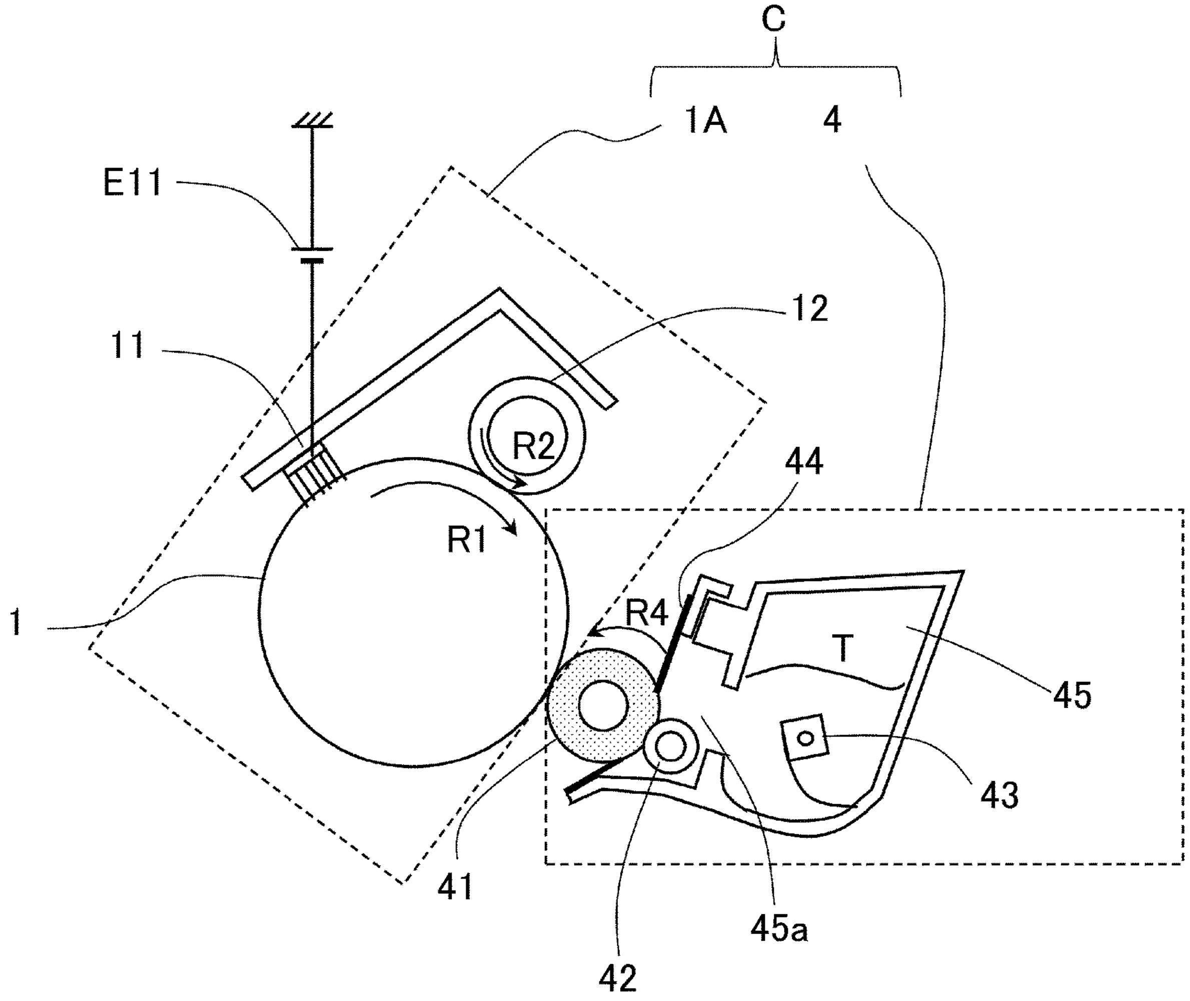

FIG. 20 is a schematic view of an image forming portion in the fourth embodiment.

Figure 21:
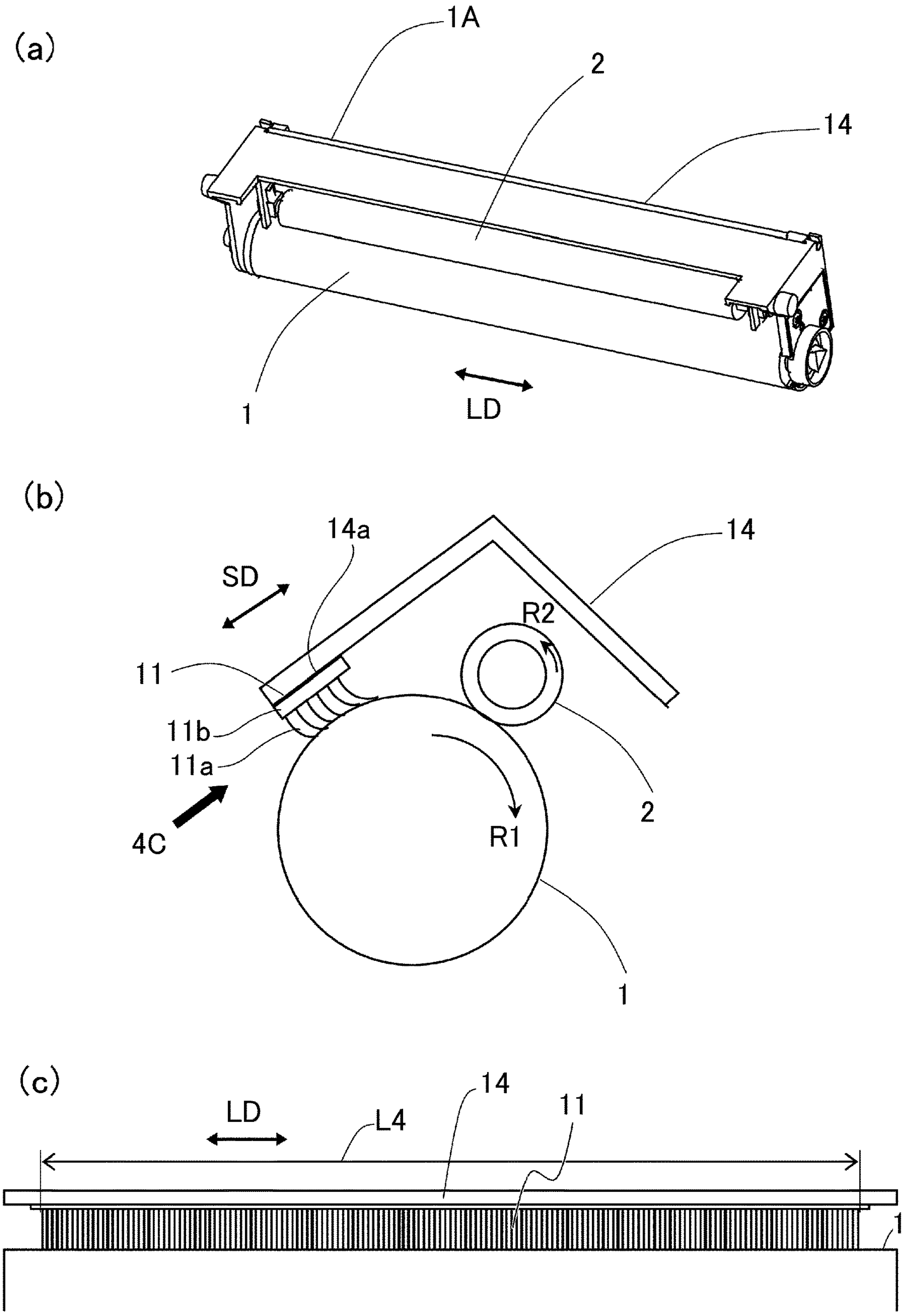

Parts (a) and (b) of FIG. 21 are a perspective view and a sectional view, respectively, of a latent image unit in the fourth embodiment, and part (c) of FIG. 21 is a schematic view of a brush contact portion as viewed from an upstream side of a rotational direction of a photosensitive drum in the fourth embodiment.

Figure 22:
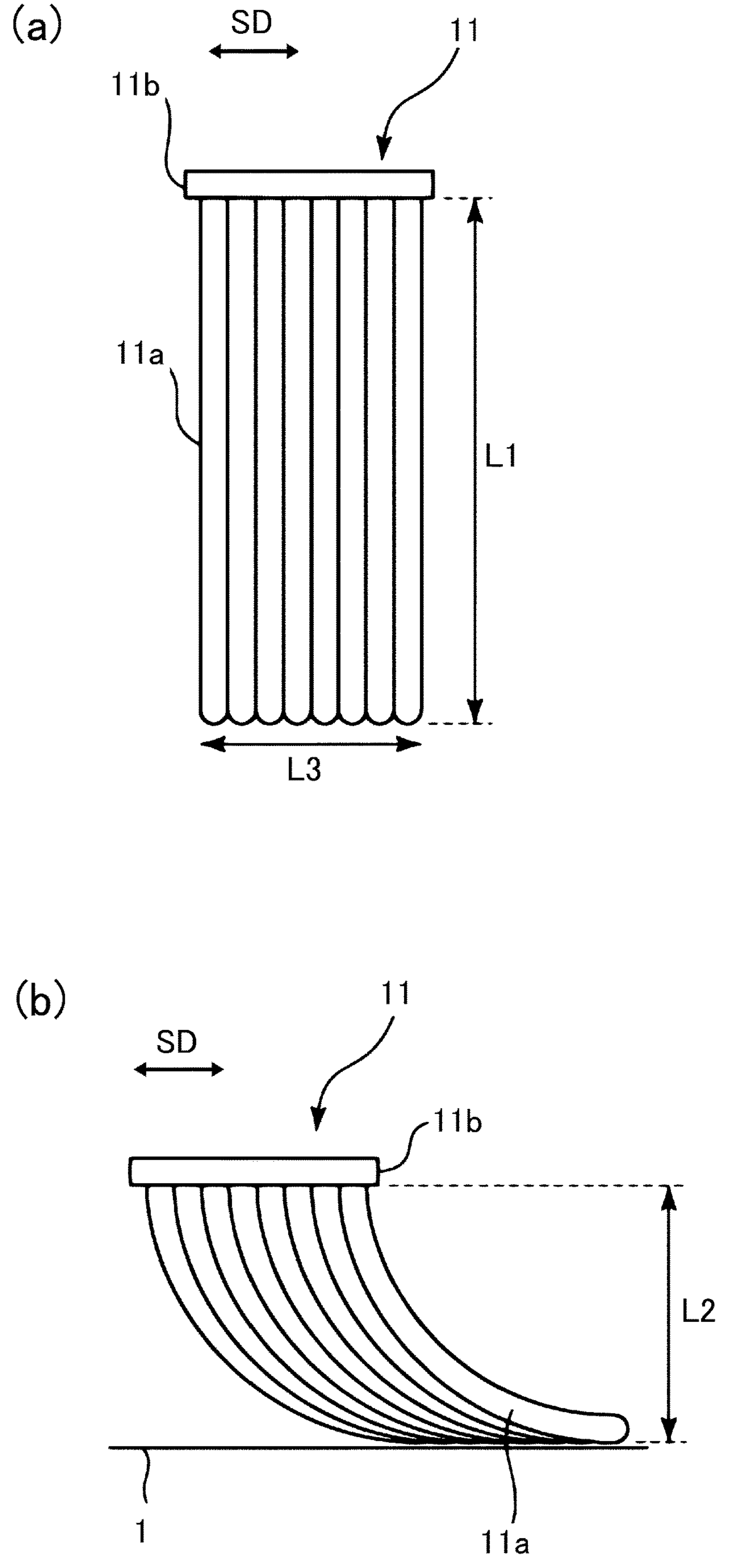

Parts (a) and (b) of FIG. 22 are sectional views showing the brush member in the fourth embodiment, in which part (a) shows a state of the brush member alone, and part (b) shows a state in which the brush member contacts the photosensitive drum.

Figure 23:
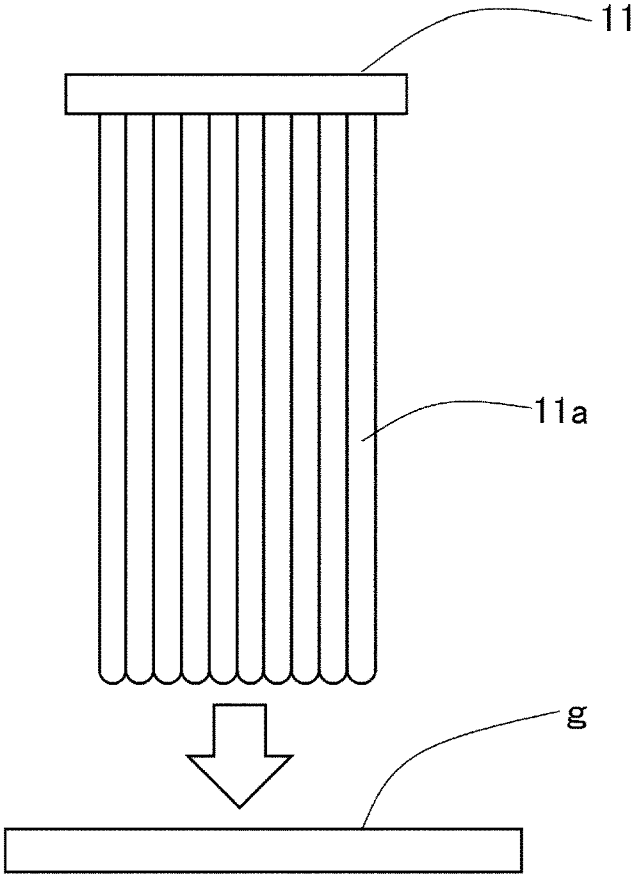
Figure 23:
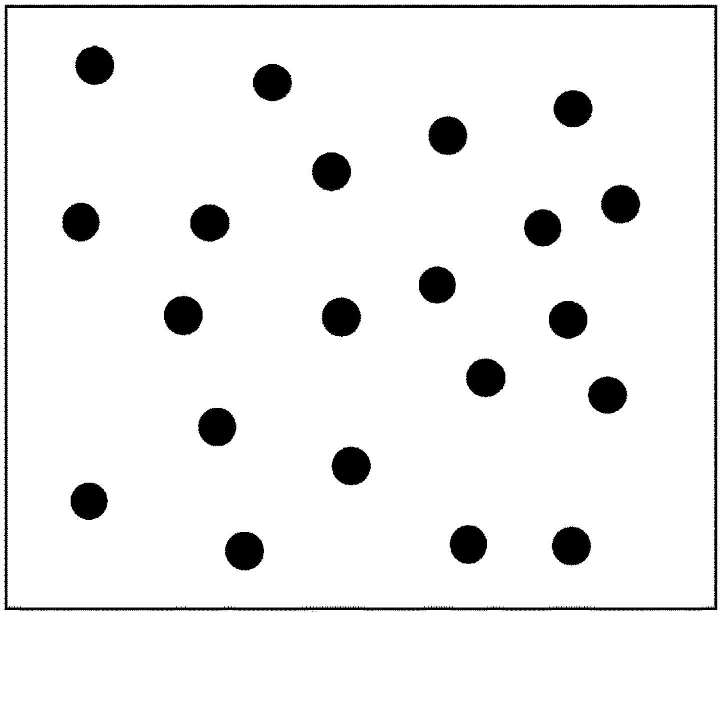

Parts (a) and (b) of FIG. 23 are schematic views for illustrating a calculating method of Clark-Evans index.

Figure 24:
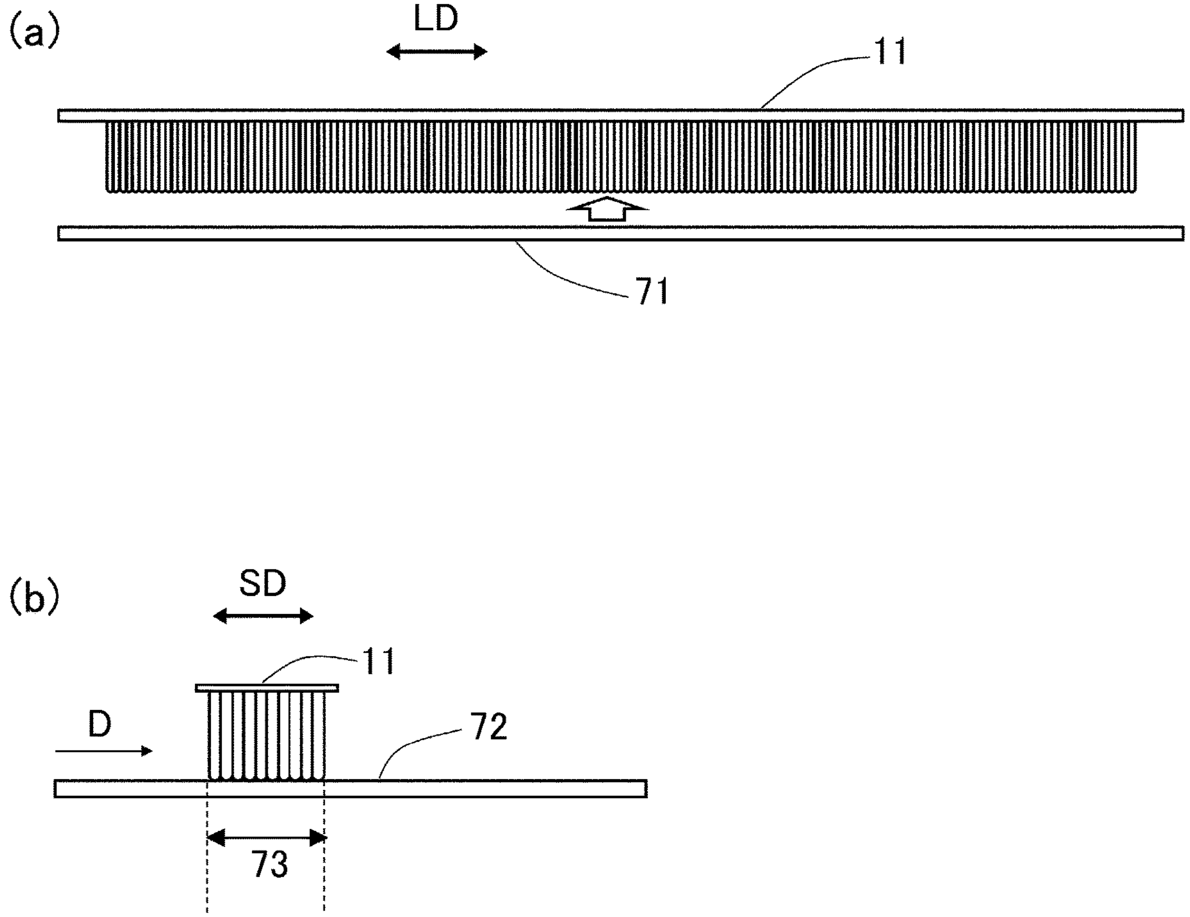

Parts (a) and (b) of FIG. 24 are schematic views for illustrating a calculating method of a contact pressure of the brush member.

Figure 25:
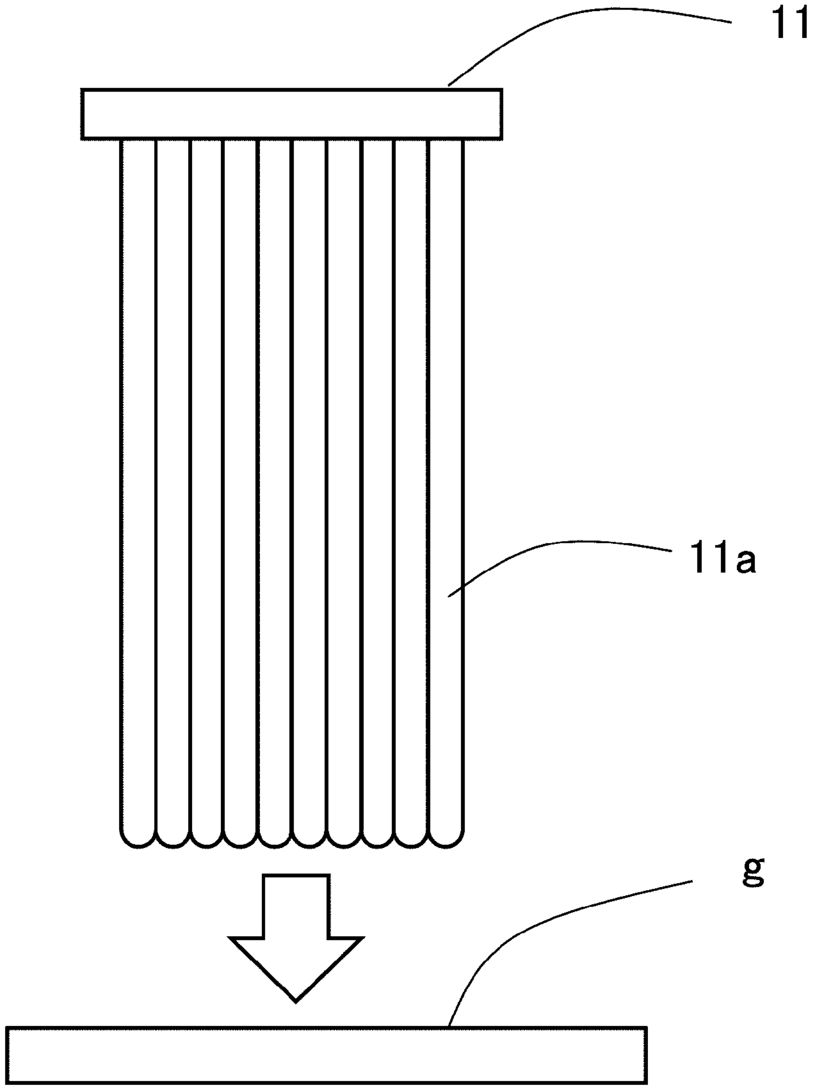

FIG. 25 is a schematic view for illustrating a calculating method of a contact area ratio of the brush member.

Figure 26:
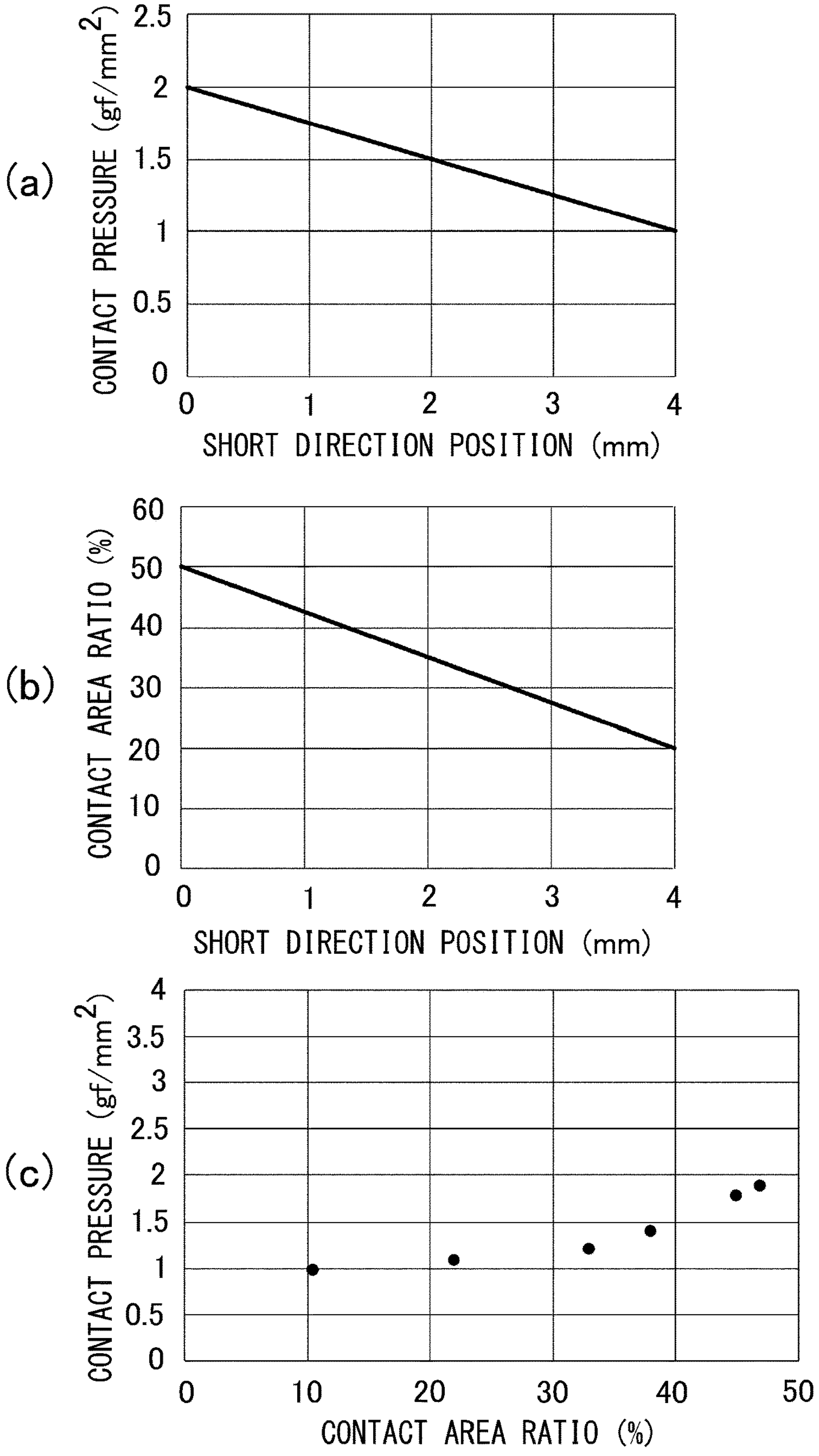

Part (a) of FIG. 26 is a graph showing a relationship between the contact pressure and a short(-side) direction in the fourth embodiment, part (b) of FIG. 26 is a graph showing a relationship between the contact area ratio and the short direction in the fourth embodiment, and part (c) of FIG. 26 is a graph showing a relationship between the contact pressure and the contact area ratio in the fourth embodiment.

Figure 27:
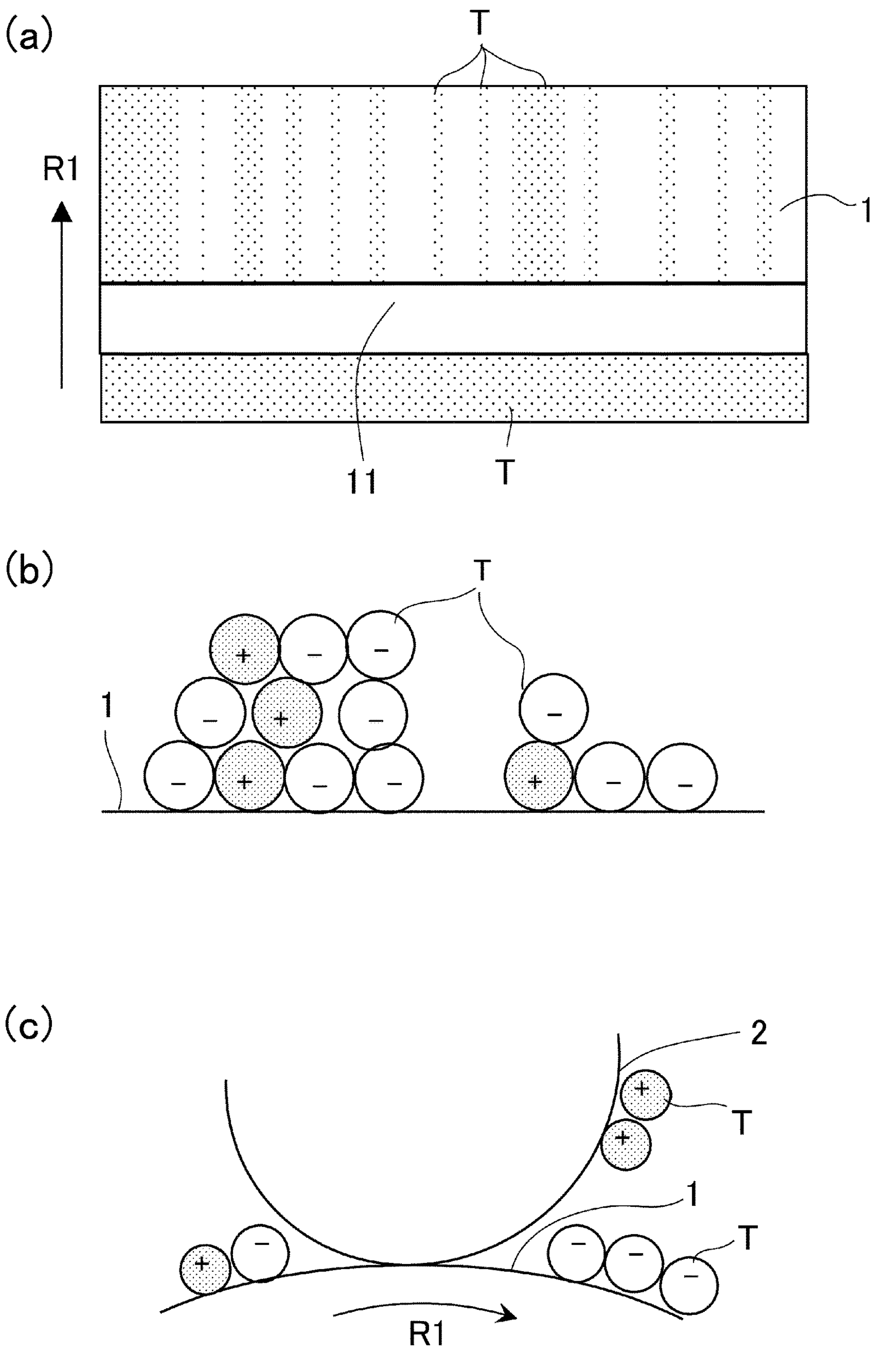

Parts (a) to (c) of FIG. 27 are schematic views for illustrating the case where toner passes through the brush member in a stripe shape.

Figure 28:
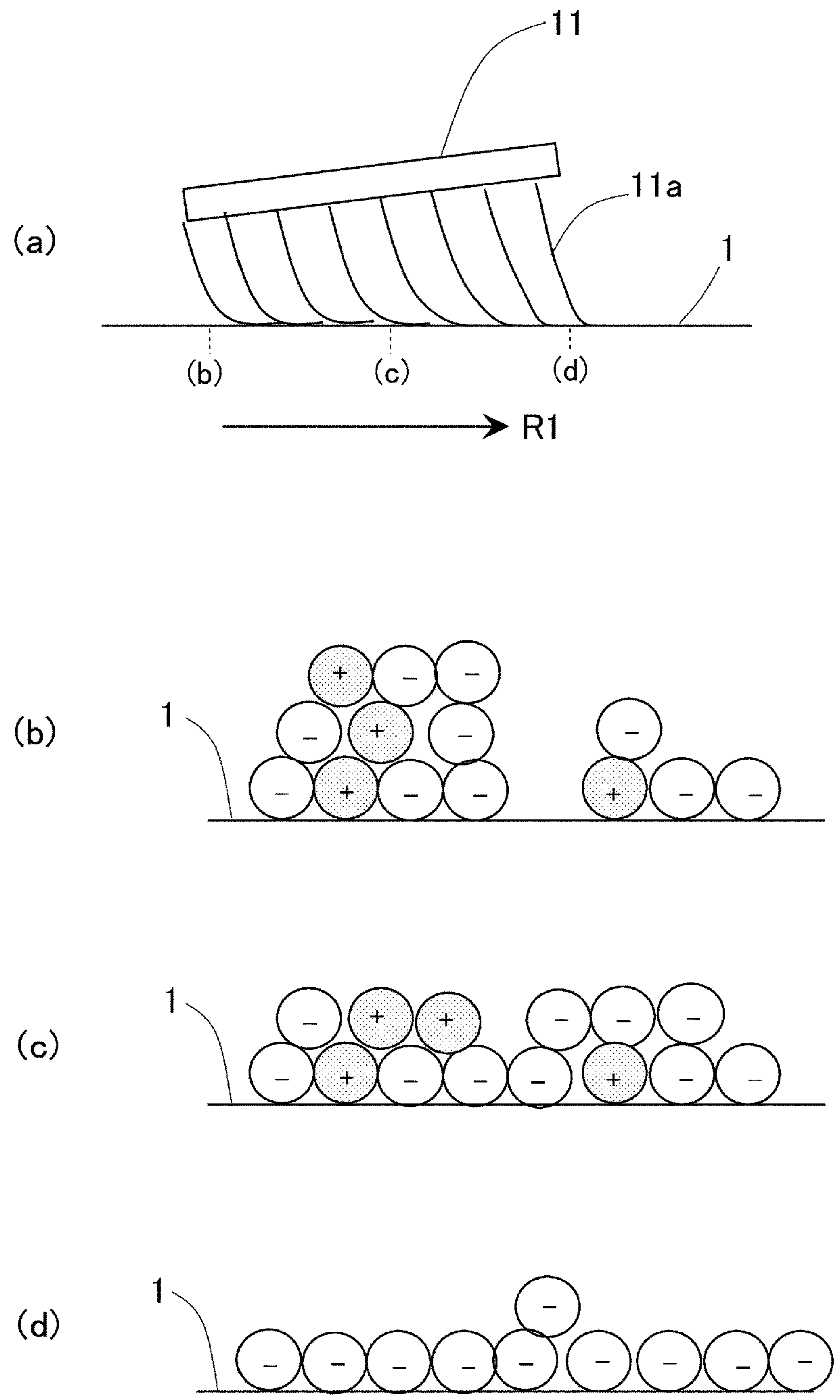

Parts (a) to (d) of FIG. 28 are schematic views for illustrating action of the brush member in the fourth embodiment.

Figure 29:
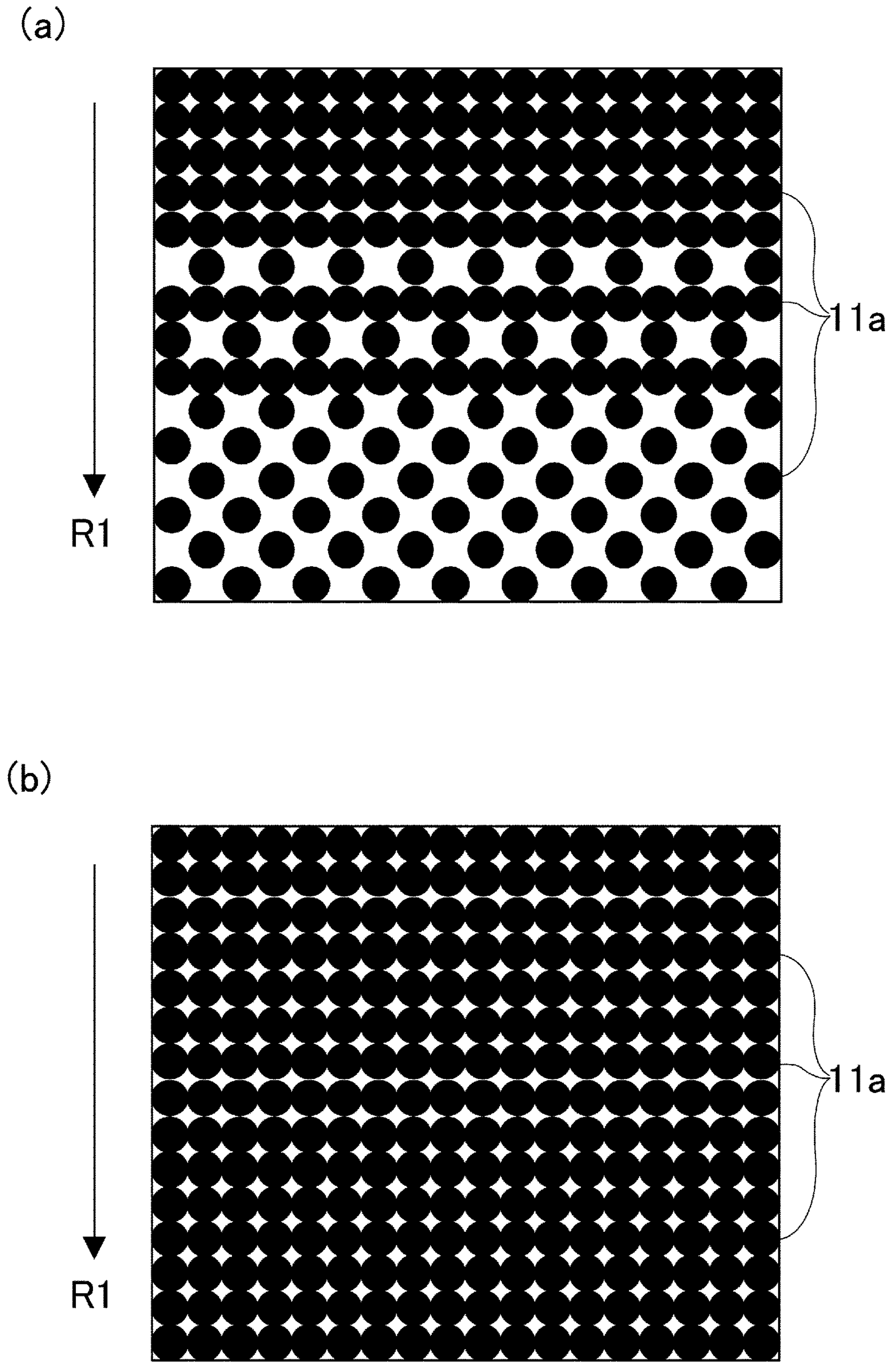

Part (a) of FIG. 29 is a schematic view of a brush member in a fifth embodiment as viewed from a free end side of a bristle material, and part (b) of FIG. 29 is a schematic view of the brush member in the fourth embodiment as viewed from a free end side of a bristle material.

Figure 30:
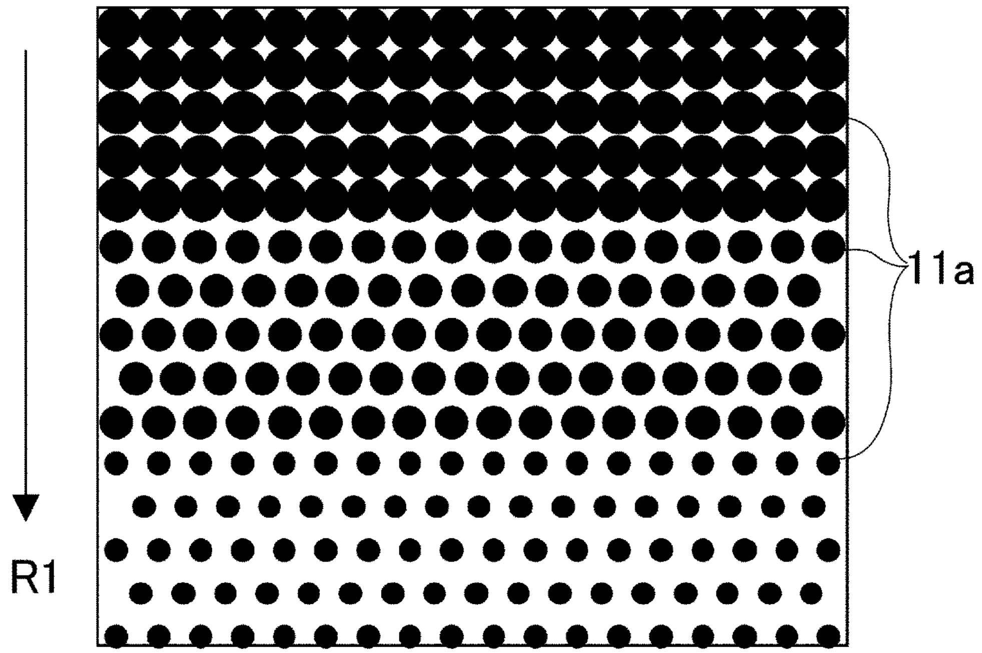
Figure 30:
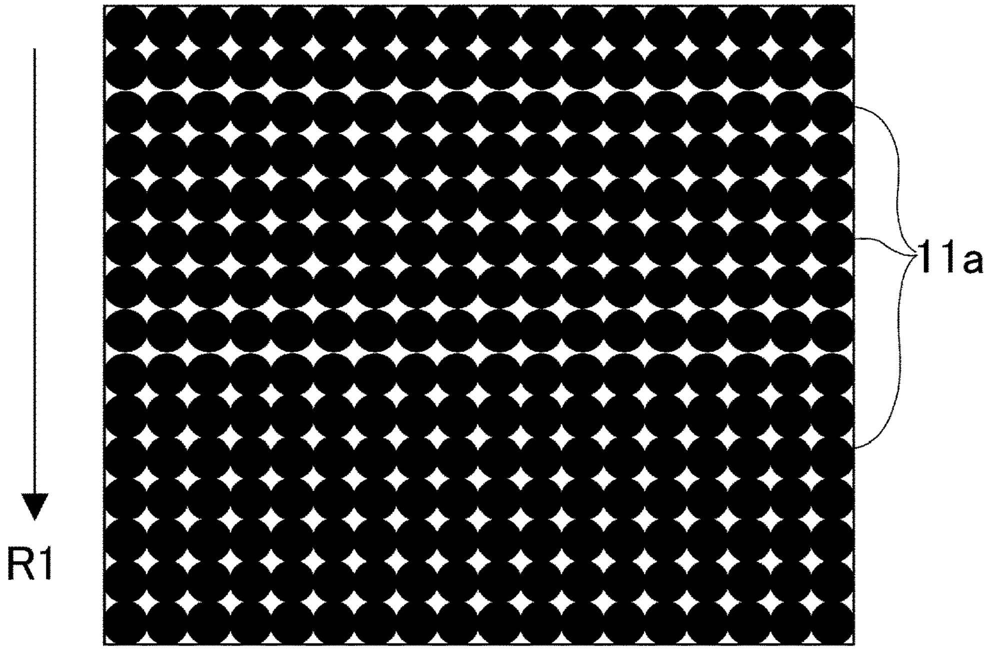

Part (a) of FIG. 30 is a schematic view of a brush member in a sixth embodiment as viewed from a free end side of a bristle material, and part (b) of FIG. 30 is a schematic view of the brush member in the fourth embodiment as viewed from the free end side of the bristle material.

Figure 31:
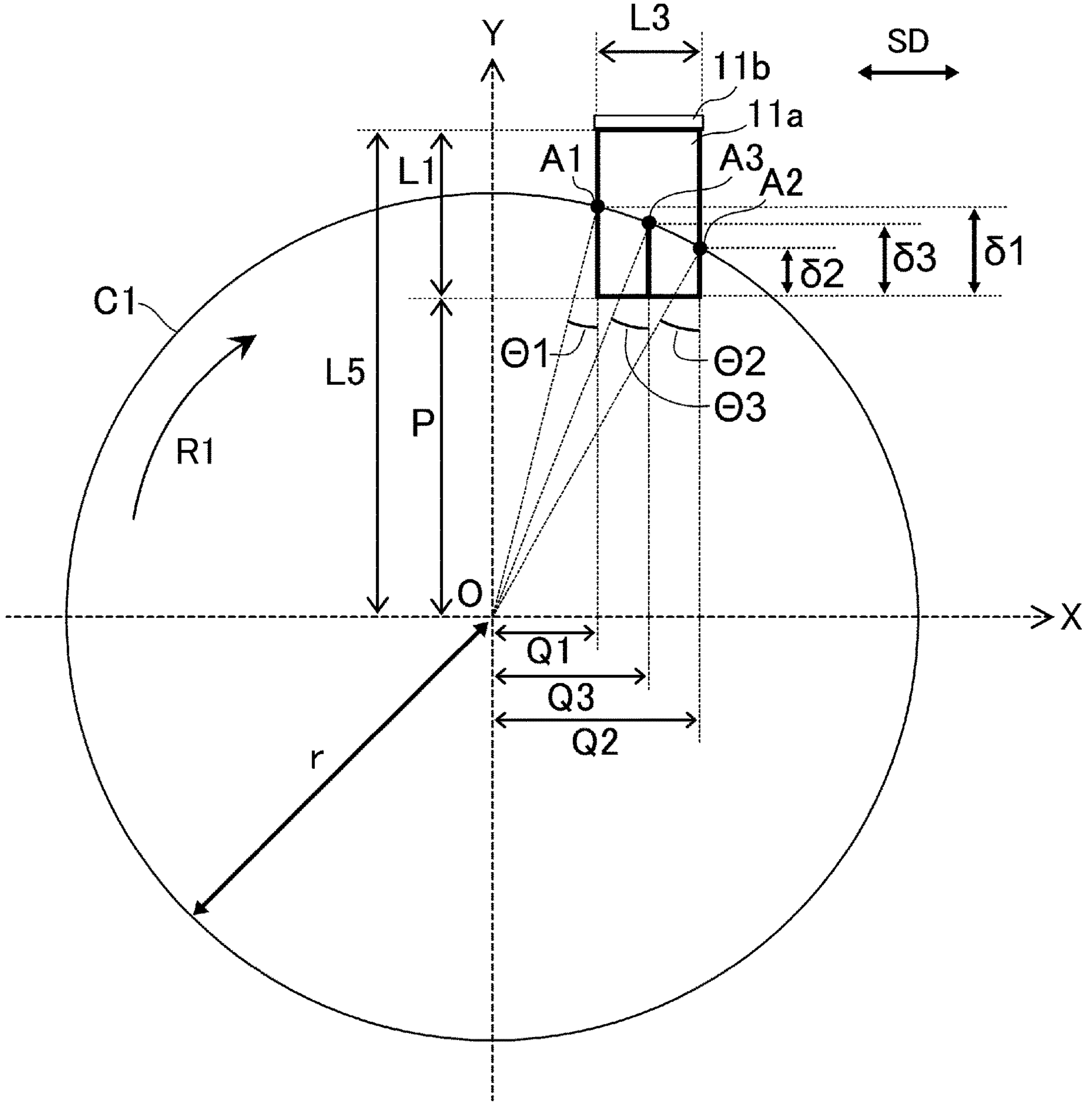

FIG. 31 is a schematic view showing a calculating method of a penetration amount of a brush member in a seventh embodiment.

DESCRIPTION OF THE EMBODIMENT

In the following, embodiments according to the present invention will be described with reference to the drawings.

First Embodiment

An outline of an image forming apparatus 100 according to a first embodiment will be described using FIG. 2. The image forming apparatus 100 is a monochromatic printer for forming a monochromatic image on a sheet S on the basis of image information received from an external device. As the sheet S which is a recording material, it is possible to use various sheets different in size and material, including paper such as plain paper or thick paper; a plastic film; a cloth; a sheet material such as coated paper subjected to surface treatment; a special-shaped sheet material such as an envelope or index paper; and the like.

Figure 2:
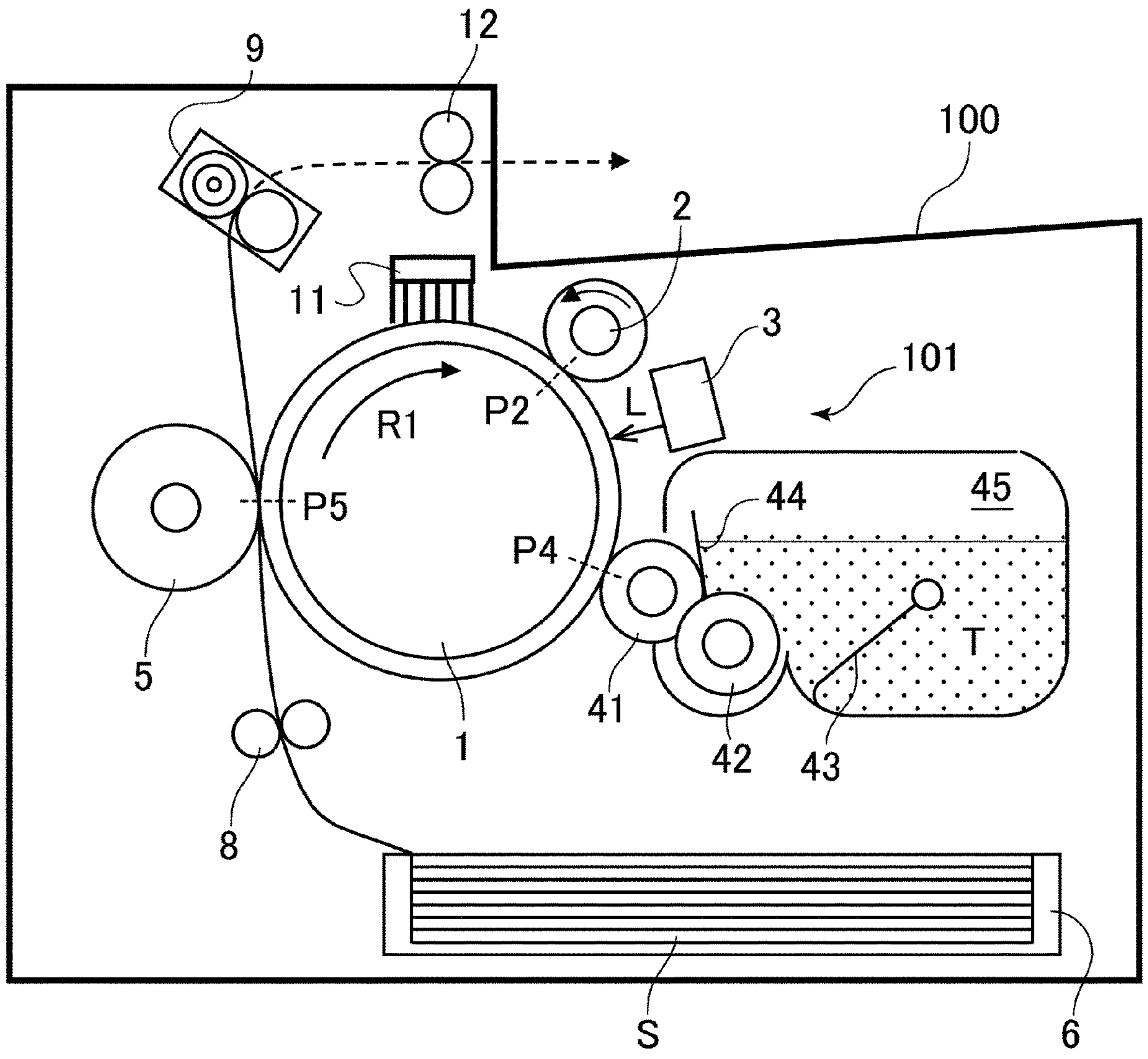
FIG. 2 is a schematic view of an image forming apparatus according to a first embodiment.

As shown in FIG. 2, the image forming apparatus 100 includes an image forming portion 101 of an electrophotographic type in which an image is formed on the sheet S, and a sheet feeding mechanism (6, 8, 12) for feeding and conveying the sheet S. The image forming portion 101 includes a photosensitive drum 1 as an image bearing member, a charging roller 2 as a charging means, an exposure device 3 as an exposure means, a developing device 4 as a developing means, a transfer roller 5 as a transfer means, a brush member 11, and a fixing device 9 as a fixing means.

The photosensitive drum 1 is an electrophotographic photosensitive member molded in a drum shape. The charging roller 2 is a charging member of a contact constitution example type in which the charging roller 2 contacts the photosensitive drum 1. A contact portion between the charging roller 2 and the photosensitive drum 1 is a charging portion P2 (charging position) where charging of a surface of the photosensitive drum 1 is carried out.

The developing device 4 includes a developing roller 41, a supplying roller 42, a stirring member 43, a developing blade 44, and a toner accommodating portion 45. The developing roller 41 is a developing member or a developer carrying member for supplying toner T to a developing portion P4 (developing position), where the developing roller 41 and the photosensitive drum oppose each other, by being rotated while carrying the toner T. In this embodiment, a so-called contact development type in which a toner layer carried on the developing roller 41 contacts the surface of the photosensitive drum 1 in the developing portion P4 is used. The developing roller 41 is disposed at an opening of the toner accommodating portion 45 provided in a position opposing the photosensitive drum 1. The supplying roller 42 supplies (applies) the toner T in the toner accommodating portion 45 to the developing roller 41. The stirring member 43 is disposed in the toner accommodating portion 45 and stirs the toner T in the toner accommodating portion 45 by being rotated. The toner accommodating portion 45 is a container for accommodating the toner T as a developer. The developing blade 44 is contacted from an inside of the toner accommodating portion 45 to a surface of the developing roller 41, rotating toward the developing portion P4, with a predetermined pressing force (pressure). The developing blade 44 is formed of, as a main component, a material (for example, iron or copper) which is on a positive polarity side (non-normal polarity side) relative to a main component (binder resin) in a charging series. By this, the toner T is triboelectrically charged to a normal polarity (normal charge polarity) by being rubber with the developing blade 44.

The transfer roller 5 is disposed in contact with the surface of the photosensitive drum 1. A nip where the transfer roller 5 and the photosensitive drum 1 oppose each other is a transfer portion 5 where the toner image is transferred from the photosensitive drum 1 onto the sheet S.

The brush member 11 is disposed downstream of the transfer portion P5 and upstream of the charging portion P2 with respect to a rotational direction R1 of the photosensitive drum 1. The brush member 11 is disposed in contact with the surface of the photosensitive drum 1 in a predetermined contact condition. Details of the brush member 11 will be described later.

The fixing device 9 includes a fixing roller or a flexible fixing film as a first rotational member, a pressing roller as a second rotatable member contacting the first rotatable member with a predetermined pressing force, and a heating means for heating the image on the sheet S through the first rotatable member. As the heating means, a halogen lamp generating radiant heat or a heater substrate in which a pattern of a heat generating resistor is formed on a ceramic substrate can be used.

The sheet feeding mechanism includes a cassette 6, a feeding (conveying) roller pair 8, and a discharging roller pair 12. The cassette 6 is a stacking portion in which sheets S are stacked. The feeding roller pair 8 is a feeding member for feeding the sheet S, fed from the cassette 6, to the transfer portion P5. The discharging roller pair 12 is a discharging member for discharging the sheet S on which the image is formed by the image forming portion 101.

In the following, an outline of an image forming operation by the image forming apparatus 100 will be described. When an execution instruction of the image forming operation is provided to the image forming apparatus 100, the photosensitive drum 1 is rotationally driven in the clockwise direction in FIG. 2, and the surface of the photosensitive drum 1 is electrically charged uniformly by the charging roller 2. The exposure device 3 exposes the surface of the photosensitive drum 1 to light by irradiating the surface of the photosensitive drum 1 with laser light L on the basis of the image information received from the external device. By this, an electrostatic latent image is written (formed) on the surface of the photosensitive drum 1.

In this embodiment, the reverse development type is employed. For that reason, the charging roller 2 charges the surface of the photosensitive drum 1 to a dark portion potential Vd of a negative polarity by being supplied with a voltage (charging voltage) of the negative polarity which is the same as the normal polarity of the toner T. After the charging, a light portion potential Vl of a region (image region) in which the photosensitive drum surface is exposed to light by the exposure device 3 is lower than the dark portion potential Vd. In a constitution example of this embodiment, Vd=−700 (V) and Vl=−100 (V) are set.

In the developing device 4, the toner T accommodated in the toner accommodating portion 45 is uniformized by the stirring member 43, and is supplied to the developing roller 41 by the supplying roller 42. The toner T carried on the developing roller 41 is not only triboelectrically charged to the normal polarity by being rubbed with the developing blade 44 but also regulated in a predetermined layer thickness during passing through the developing blade 44. By rotation of the developing roller 41, the toner T charged to the normal polarity is supplied to the developing portion P4. Then, a voltage (developing V) of the normal polarity which is the same as the normal polarity of the toner T is applied to the developing roller 41, so that the toner T is transferred onto the photosensitive drum 1 depending on a potential distribution on the surface of the photosensitive drum 1. By this, the electrostatic latent image on the surface of the photosensitive drum 1 is developed and visualized as a toner image. The toner image formed on the surface of the photosensitive drum 1 is fed to the transfer portion P5 in a state in which the toner image is carried on the photosensitive drum 1.

In parallel to the above-described process, the sheets S and fed one by one from the cassette 6 by an unshown feeding unit, and then the sheet S is conveyed to the transfer portion P5 by the feeding (conveying) roller pair 8. A voltage (transfer voltage) of a positive polarity opposite to the normal polarity of the toner T is applied to the transfer roller 5, so that the toner image is transferred from the photosensitive drum 1 onto the sheet S in the transfer portion P5.

The sheet S passed through the transfer portion P5 is conveyed to the fixing device 9. In the fixing device 9, the image on the sheet S is heated and fixed by the first rotatable member heated by the heating means while nipping and conveying the sheet S in the nip between the first rotatable member and the second rotatable member. The sheet S passed through the fixing device 9 is discharged to an outside of the image forming apparatus 100 by the discharging roller pair 12.

(Cleaner-Less Brush Type)

Next, an operation peculiar to a cleaner-less brush type using the brush member 11 will be described. In this embodiment, a simultaneous development and cleaning type in which residual toner which was not transferred onto a toner image receiving member (sheet S) in the transfer portion P5 is collected by the developing roller 41 when the residual toner reaches the developing portion P4 next time is employed. In the simultaneously development and cleaning type, the residual toner collected by the developing roller 41 is stirred together with another toner in the toner accommodating portion 45 and then is used for the development again.

In the simultaneous development and cleaning type, the residual toner which was not transferred onto the toner image receiving member in the transfer portion P5 is collected by the developing roller 41, and therefore, the brush member 11 basically permits passing of the residual toner therethrough. For that reason, the "brush member" in this embodiment is different from a brush member as a cleaning device (drum cleaner) for the purpose of removing the residual toner from the photosensitive drum 1. Incidentally, in the simultaneous development and cleaning type, the cleaning device for collecting the residual toner is not disposed, and therefore, such a type is called a cleaner-less brush type in some cases.

In the cleaner-less brush type, in the simultaneous development and cleaning type, the brush member 11 for scattering the residual toner deposited on the surface of the photosensitive drum 1 passed through the transfer portion P5 is disposed downstream of the transfer portion P5 and upstream of the charging portion P2 with respect to the rotational direction R1. By disposing the brush member 11, a state in which the residual toner locally exists in a large amount on the photosensitive drum 1 can be alleviated. When the residual toner locally exists in the large amount on the photosensitive drum 1, there is a possibility that image defects are caused by improper charging due to contamination of the charging roller 2 with the residual toner and by improper collection of the residual toner in the developing portion P4. On the other hand, in the cleaner-less brush type, the residual toner is scattered by the brush image 11, and behavior of the residual toner in the charging portion P2 and the developing portion P4 is uniformized, so that the above-described inconveniences can be suppressed.

(Operation Peculiar to Cleaner-Less Brush Type)

In the cleaner-less brush type, the residual toner passed through the contact portion between the brush member 11 and the photosensitive drum 1 reaches the charging portion P2. To the charging roller 2, the charging voltage of a same polarity as the normal polarity of the toner is applied, and therefore, of the residual toner particles, toner particles charged to the normal polarity pass through the charging portion 2 while being pressed against the photosensitive drum 1. On the other hand, of the residual toner particles, toner particles charged to the non-normal polarity or toner particles of which charge amount is close to zero are partially deposited on the charging roller 2 in the charging portion P2. When the residual toner is deposited and accumulated on the charging roller 2, uniform charging of the photosensitive drum 1 is prevented, so that the image defect due to the improper charging becomes apparent.

In this embodiment, in order to alleviate a degree of deposition of the residual toner on the charging roller 2, a peripheral spaced difference between the charging roller 2 and the photosensitive drum 1 is set. Specifically, a peripheral speed of the charging roller 2 is set at a value higher than a peripheral speed of the photosensitive drum 1 by 5% or more. Further, in order to charge the residual toner to the normal polarity by friction between the charging roller 2 and the photosensitive drum 1, materials of a surface layer of the charging roller 2 and a surface layer of the photosensitive drum 1 are selected. That is, in the charging series, the materials of the surface layer of the charging roller 2 and the surface layer of the photosensitive drum 1 are positioned in a higher rank (positive polarity side, non-normal polarity side) than the toner. By constituting the peripheral speed difference and the materials as described above, in the charging portion P2, the residual toner is charged to the normal polarity by friction with the charging roller 2 or the photosensitive drum 1, so that deposition of the residual toner on the charging roller 2 can be suppressed.

The residual toner passed through the charging portion P2 reaches the developing portion P4 with rotation of the photosensitive drum 1.

Of the residual toner particles carried on the photosensitive drum 1 in a non-image region (non-exposure region), the toner particles charged to the normal polarity are transferred onto the developing roller 41 and are collected in the toner accommodating portion 45 by a potential difference between the dark portion potential Vd and the developing voltage. On the other hand, of the residual toner particles carried on the photosensitive drum 1 in an image region (exposure region), the toner particles charged to the normal polarity are not transferred onto the developing roller 41 and remain on the photosensitive drum 1 by a potential difference between the light portion potential Vl and the developing voltage. In this case, the toner particles are sent as a part of the toner image, obtained by developing the electrostatic latent image, to the transfer portion P5. Incidentally, a voltage value of the developing voltage has the same polarity as the normal polarity of the toner, and is higher than the light portion potential Vl and is lower than the dark portion potential Vd.

Ideally, of the residual toner particles, the toner particles charged to the non-normal polarity and the toner particles of which charge amount is close to zero are changed in polarity to the normal polarity, and thus are collected by the developing roller 41 in the developing portion P4 without being deposited on the charging roller 2. However, when the residual toner charged to the non-normal polarity in a large amount enters the charging portion P2, the residual toner which is not changed in polarity to the normal polarity in the charging portion P2 is liable to be deposited on the charging roller 2. Further, when the residual toner which is not changed in polarity to the normal polarity in the charging portion P2 reaches the developing portion P4, the residual toner passes through the developing portion P4 without being collected by the developing roller 41. In this case, there is a possibility that contamination of the transfer roller 5 with the residual toner and image defect (white background fog) such that a thin toner image is formed on a white background portion (non-image region) occurs.

In the following, constituent elements of the image forming apparatus 100 will be specifically described.

(Brush Member)

First, the brush member 11 in this embodiment will be described. As shown in FIG. 2, the brush member 11 contacts the surface of the photosensitive drum 1 in a position downstream of the transfer portion P5 and upstream of the charging portion P2 with respect to the rotational direction R1 of the photosensitive drum 1. That is, the image forming apparatus 100 includes the brush member 11 disposed downstream of the transfer member and upstream of the developing member with respect to the rotational direction of the image bearing member and contacting the surface of the image bearing member. In the following, a region where the brush member 11 contacts the photosensitive drum 1 is referred to as a "brush contact portion".

Part (a) of FIG. 3 is a front view of the brush member 11 in a single body state (as viewed from one side with respect to a short (-side) direction). The single body state is a state in which the brush member 11 is not mounted in the image forming apparatus 100, i.e., a state in which an external force does not act on the brush member 11. Part (b) of FIG. 3 is a sectional view of the brush member 11 in the single body state cut along a flat plane perpendicular to a longitudinal direction of the brush member 11. Part (c) of FIG. 3 is a sectional view of the brush member 11 in a state in which the brush member 11 is contacted to the photosensitive drum 1.

As shown in parts (a) to (c) of FIG. 3, the brush member 11 includes a base cloth 11*b* as a base portion and an electroconductive thread (yarn) 11*a* as a bristle material (fiber) supported by the base cloth 11*b*. The base cloth 11*b* is formed of a synthetic resin fiber containing carbon black as an electroconductive agent. The electroconductive thread 11*a* is formed of, for example, a nylon fiber in which the electroconductive agent is added, and is textured and planted on the base cloth 11*b*. The material of the electroconductive thread 11*a* is not limited to nylon, but other synthetic resin fibers such as rayon may be used.

The brush member 11 is a member extending thin and long in a predetermined direction. In the following, an extension direction is referred to as a longitudinal direction LD of the brush member 11, and a direction along the base cloth 11*b* and perpendicular to the longitudinal direction LD is referred to as a short direction SD of the brush member 11. In the state in which the external force does not act on the brush member 11 (part (b) of FIG. 3), the electroconductive thread 11*a* projects in a direction (direction normal to the base cloth 11*b*) substantially perpendicular to both the longitudinal direction LD and the short direction SD.

As shown in part (c) of FIG. 3, the brush member 11 is disposed in an attitude such that the longitudinal direction LD is substantially parallel to a rotational axis direction of the photosensitive drum 1.

As shown in part (b) of FIG. 3, a distance from the base cloth 11*c* to a free end of the electroconductive thread 11*a* in the brush member 11 in the single body state is bristle height L1. The bristle height L1 of the brush member 11 in this embodiment is 5.75 mm. The brush member 11 is supported by a supporting member 11*c*, mounted in the image forming apparatus 100 at a predetermined position, to which the base cloth 11*b* is fixed by a fixing means such as a double-side tape. The position of the supporting member 11*c* is set so that free ends of the electroconductive threads 11*a* enter the photosensitive drum 1. For this reason, the brush member 11 is in a state in which the free ends of the electroconductive threads 11*a* are pressed against the surface of the photosensitive drum 1 and are flexed (bent).

In this embodiment, a fixing surface of the base cloth 11*c* to the supporting member 11*c* is disposed substantially parallel to the surface of the photosensitive drum 1, so that a distance (clearance) between the supporting member 11*c* and the photosensitive drum 1 is substantially constant. That is, as viewed in the longitudinal direction LD, a rectilinear line passing from a rotational axis of the photosensitive drum 1 through a center position of the base cloth 11*b* with respect to the short direction SD is perpendicular to the fixing surface of the supporting member 11*c*.

Further, in this embodiment, a minimum distance from the base cloth 11*b* of the brush member 11, fixed to the supporting member 11*c*, to the photosensitive drum 1 is taken as L2. In this embodiment, a difference between L2 and L1 is defined as a maximum penetration amount of the brush member 11 into the photosensitive drum 1. However, L2<L1 holds.

In this embodiment, the maximum penetration amount of the brush member 11 into the photosensitive drum 1 is, for example, 1.2 mm. Further, in this embodiment, as shown in part (b) of FIG. 3, as regards the brush member 11 in the single body state, a length of the brush member 11 with respect to the short direction SD, which is a short(-side) width L3 is, for example, 4 mm. As shown in part (c) of FIG. 3, in the state in which the brush member 11 is pressed against the photosensitive drum 1, an occupied width of the electroconductive threads 11*a* with respect to the short direction SD is about 5 mm to about 6 mm.

Further, in this embodiment, a length L4 of the brush member 11 with respect to the longitudinal direction LD is 216 mm. The length L4 is set so that with respect to the longitudinal direction LD, the brush member 11 is capable of contacting an entire area of an image forming region (toner image formable region, maximum region of the latent image formed by the exposure device 3) on the photosensitive drum 1. Further, in this embodiment, a thickness of the electroconductive threads 11*a* is for example, 2 denier and a density of the electroconductive threads 11*a* is, for example, 240 kF/inch$^2$. The thickness and density of the electroconductive threads 11*a* are capable of being appropriately changed as long as the electroconductive threads 11*a* satisfy a function required for the brush member 11. As an example, it is preferable that the thickness of the electroconductive threads 11*a* is denier or more and 6 denier or less and that the density of the electroconductive threads 11*a* is 150 kF/inch$^2$ and 350 kF/inch$^2$. Incidentally, 1 kF/inch$^2$ represents a planting density of 1000 fibers per square inch.

Incidentally, in the case of nylon electroconductive threads 11*a* used in this embodiment, when 1 to 6 denier which is a unit of formula for direct yarn count is converted into a fiber diameter, 1 to 6 denier corresponds to about 10 μm to about 30 μm. For this reason, in the case where the bristle material other than nylon is used as the brush member, it is possible to use a bristle material with a thickness of 1 denier or more and 6 denier or less in terms of direct yarn count and of 10 μm or more and 30 μm or less in term of the fiber diameter.

"1 denier or more and 6 denier or less" can be said as "1.1 decitex or more and 6.7 decitex or less". Further, 1 inch$^2$ is about 6.45 cm$^2$, and therefore, "150 kF/inch$^2$ or more and 350 kF/inch$^2$" can be said as "23 kF/mm$^2$ or more and 54 kF/mm$^2$".

In this embodiment, the brush member 11 is constituted so as to permit the passing of the residual toner while scattering the residual toner deposited on the surface of the photosensitive drum 1 passed through the transfer portion P6. For that reason, in the case where the electroconductive threads 11*a* are excessively thick, there is a possibility that the residual toner cannot be uniformly scattered and passes through the brush contact portion in a stripe shape and thus leads to stripe-shaped contamination of the charging roller 2 with the residual toner. Further, in the case where the electroconductive threads 11*a* are excessively high in density, the residual toner is blocked by the brush contact portion, and thus not only constitutes an obstacle to collection of the residual toner by the developing roller 41 but also contaminates an inside of the image forming apparatus by being dropped or scattered from the photosensitive drum 1. Further, the brush member 11 is constituted so as to triboelectrically charge the residual toner in the brush contact portion. For that reason, in the case where the electroconductive threads 11*a* are excessively thin, there is possibility that the electroconductive threads 11*a* are readily flexed even when the residual toner contacts the electroconductive threads 11*a* and are escaped from the residual toner, and thus the toner particles are not rolled and the residual toner is not sufficiently triboelectrically charged. Further, in the case where the electroconductive threads 11*a* are excessively low in density, a frequency of collision with the electroconductive threads 11*a* becomes low, so that there is a possibility that the residual toner cannot be sufficiently triboelectrically charged.

In the above description, from the viewpoints of a function of scattering the residual toner and a function of triboelectrically charging the residual toner, preferred ranges of the thickness and the density of the electroconductive threads 11*a* were described, but depending on functions required for the brush member 11, details of the thickness, the density, the material, the bristle height, and the like can be appropriately changed. Incidentally, the brush member 11 in this embodiment may have a function of blocking a foreign matter (for example, paper powder) other than the residual toner in the brush contact portion.

(Developer)

In this embodiment, as the developer, the toner T which is one-component developer of which normal polarity is the negative polarity. For that reason, in the following description of this embodiment, the "negative polarity" is synonymous with the normal polarity of the toner T and the "positive polarity" is synonymous with the non-normal polarity of the toner T unless otherwise specified.

The toner T contains a binder resin and a colorant and may further contain a parting agent, a charge control agent, and an external additive as desired. As the binder resin, styrene-acrylic resin and polyester resin, which are lower in rank of the charging series (negative polarity side) than nylon and rayon are, can be preferably used. That is, a main component (binder resin) of the toner T may desirably be positioned on the positive polarity side (lower rank) relative to the material of fibers (bristle materials) of the brush member 11 in the charging series. In this embodiment, as the binder resin of the toner, the styrene-acrylic resin is employed.

As the colorant, a known colorant can be used. For example, a dye and a pigment are cited. As the parting agent, a known charge control agent can be used. The charge control agent has an acid value or a hydroxy value and may preferably have the negative polarity which is equivalent to or more than the binder resin. As the external additive, a known external additive can be used. For example, silica, alumina, titania, titanium composite oxide, and the like are cited. The colorant and the parting agent may preferably be included in the binder resin so as not to have the influence on the charge polarity of the toner particle surface.

Further, as the toner, a polymerization toner formed by a polymerization method can be employed. The toner T with a particle size (volume-average particle size) of 4-10 μm, preferably 6-8 μm may preferably be used. In this embodiment, spherical toner prepared by the polymerization method and with a particle size of 7 μm is used. Further, the toner T in this embodiment is so-called non-magnetic one-component developer which does not contain a magnetic component and which is carried on the developing roller 41 principally by an intermolecular force or an electrostatic force (mirror force). However, as the developer, a one-component developer consisting of toner containing the magnetic component may be used. Further, as the developer, a two-component developer constituted by non-magnetic toner and a magnetic carrier may be used. In the case where the magnetic developer is used, as a developer carrying member, for example, a cylindrical developing sleeve in which a magnet is provided is used. Further, to the developer, in addition to the toner and the carrier, an additive (for example, a wax or silica fine particles) for adjusting flowability, charging performance, and the like of the toner may be added.

(Photosensitive Drum)

The photosensitive drum 1 is prepared by successively laminating an undercoat layer, a charge generation layer, and a charge transport layer on a cylindrical electroconductive supporting member (core metal) as a lowermost layer. The charge transport layer is formed by coating and drying point prepared by mixing principally a charge transporting material and the binder resin in a solvent. As the principally used charge transporting material, a known charge transporting material can be used. For example, various triarylamine compounds and hydrazone compounds are cited. Further, as the binder resin, for example, a polycarbonate resin, a polyarylate resin, and the like are cited.

A predominant portion by the triboelectric charge with the toner is the charge transport layer as a surface layer (outermost layer) and is the binder resin occupying most thereof. Here, the cited polycarbonate resin or polyarylate resin are positioned on the non-normal polarity side (upper rank) relative to the styrene-acrylic resin which is the binder resin of the toner T in the charging series. That is, the outermost layer of the image bearing member may preferably be formed of a material capable of triboelectrically charging the toner T to the normal polarity in the case where the outermost layer is rubbed with the resin which is the main component of the toner T. In this embodiment, the polycarbonate resin was selected as the binder resin of the outermost layer.

Further, in this embodiment, as the photosensitive drum 1, a cylindrical photosensitive drum with an outer diameter of 24 mm. Depending on the outer diameter of the photosensitive drum 1. A manner of contact (pressing) of the brush member 11 (for example, the above-described penetration amount or an angle described later in a third embodiment) is appropriately changed.

(Charging Roller)

The charging roller 2 in this embodiment will be described. The charging roller 2 includes a core metal as an electroconductive supporting member, a 2 mm-thick elastic layer provided on an outer periphery thereof, and a 25 mm-thick resin layer as a surface layer provided on an outer periphery of the elastic layer. A surface of the surface layer is a surface contacting the photosensitive drum 1 and causing electric discharge on the photosensitive drum 1.

The elastic layer is formed of an electron-conductive rubber material. The electron-conductive rubber material is, for example, a material in which carbon black is dispersed as electroconductive particles (electron-conductive agent) in a binder polymer which itself does not assume electroconductivity and in which an electric resistance is adjusted. As the binder polymer, a known binder polymer used in the electroconductive elastic layer of the charging roller for the electrophotographic apparatus can be used. For example, a hydrin rubber, a butadiene rubber, and the like are cited. In this embodiment, the hydrin rubber was selected.

A kind of the carbon black mixed in the elastic layer is not particularly limited so long as the carbon black is electroconductive carbon black capable of imparting electroconductivity to the elastic layer. Further, to the elastic layer, as a compounding agent, general-purpose agents such as a filler, a processing aid, a cross-linking aid, a cross-linking retardant, a softening agent, a dispersing agent, a colorant, and the like may be added as desired.

As a resin of the surface layer, a resin material positioned on the non-normal polarity side (upper rank) relative to the main component (binder resin) of the toner T in the charging series. For example, the surface layer is formed by coating the outer periphery of the elastic layer with a resin material, for example, polycarbonate urethane, possessing electroconductivity. The residual toner can be triboelectrically charged to the normal polarity in the charging portion P2 by forming the third layers of the charging roller 2 and the photosensitive drum 1 with the above-described materials and by setting the peripheral speed difference between the charging roller 2 and the photosensitive drum 1 as described above.

Further, to the surface layer of the charging roller 2, roughening particles with a polarity such that triboelectrically chargeability is not impaired can be added. For example, there is also a method in which polycarbonate urethane resin similar to the polycarbonate urethane resin of the surface layer is formed in particles and in which the particles are dispersed. That is, the charging roller 2 is not required to closely contact the surface of the photosensitive drum 1 in the charging portion P2, so that a constitution in which the charging roller 2 contacts the surface of the photosensitive drum 1 in a mountain portion of unevenness formed by the roughening particles can be employed.

(Transfer Roller)

The transfer roller 5 is a roller-type transfer member disposed opposed to the photosensitive drum 1. The transfer roller 5 is pressed against the photosensitive drum 1 at a predetermined pressure. The transfer roller 5 of this embodiment is an elastic roller of 12 mm in outer diameter, in which a sponge rubber of an electroconductive nitrile-butadiene hydrin rubber type is formed around a core metal.

(Contact Condition of Brush Member)

In this embodiment, the brush member 11 imparts the electric charge to the residual toner through the triboelectric charge while scattering the residual toner on the photosensitive drum 1. At this time, in order to impart the negative electric charge to the residual toner through the triboelectric charge, as the material of the bristle material (electroconductive threads 11*a*) of the brush member 11, a material positioned on the positive polarity side (upper rank) relative to the main component of the toner T in the charging series is used. Further, a contact pressure between the brush member 11 and the photosensitive drum 1 in the brush contact portion is ensured so that the electroconductive threads 11*a* rub the residual toner with a sufficient force.

As regards the charging series, the main charge of the toner T in this embodiment is the styrene-acrylic resin. The bristle material of the brush member 11 may desirably be a material, such as nylon or rayon, relative to which the styrene-acrylic resin is positioned on the negative polarity side (lower rank) and a difference in charging series therebetween is large. In this embodiment, the nylon resin was selected as the main component of the electroconductive threads 11*a* as described above. Polyester fibers and acrylic fibers are not desired as the material of the electroconductive threads 11*a* since the styrene-acrylic resin is positioned the positive polarity side relative thereto in the charging series and the difference in charging series is also small. However, in the case where the main component of the toner T is different, the polyester fibers or the acrylic fibers can be used as the material of the electroconductive threads 11*a* in some instances.

Incidentally, the surface layer of the photosensitive drum 1 is capable of having the influence on the triboelectric charge of the toner T in the brush contact portion. For that reason, the main component of the surface layer of the photosensitive drum 1 may preferably be a material which is positioned on the positive polarity side relative to the main component of the toner T in the charging series. In this embodiment, as described above, the main component of the surface layer of the photosensitive drum 1 is the polycarbonate resin.

A contact condition of the brush member 11 in the brush contact portion will be further described. In order to study physical properties (parameters) showing the contact condition of the brush member 11, samples 1 to 4 of 4 levels different in thickness and density of the bristle material of the brush member 11 were prepared. The sample 1 is a brush member 11 of which bristle material is thick and is low in density. The sample 2 is a brush member 11 of which bristle material is thin and at a medium level in density. The sample 3 is a brush member 11 of which bristle material is thin and is high in density. The sample 4 is a brush member 11 of which bristle material is at a medium level in thickness and is low in density. Then, the brush member 11 of each of the samples was contacted to the photosensitive drum 1, and then a peak pressure and a maximum contact area ratio in the brush contact portion were calculated in the following methods. Incidentally, the peak pressure is a maximum value of an average contact pressure in a region of a width of 1 mm of the brush contact portion with respect to the short direction, and the maximum contact area ratio is a contact area ratio between the brush member 11 and the photosensitive drum 1 in the region of the width of 1 mm in which the peak pressure is obtained.

A calculating method of the peak pressure is as follows. As shown in FIG. 4, with use of a compression test jig for a compact table-top tester ("EZTest" manufactured by Shimadzu Corporation), normal reaction when a pressing plate was pressed into the brush member 11 while adjusting a flow or bristles (fibers) of the brush member 11 placed horizontally was measured and then a relationship between the penetration amount and the normal reaction was obtained. On the other hand, as shown in FIG. 5, a glass plate was press-contacted to the brush member 11 so as to uniformize the flow of the bristles of the brush member 11 while moving the glass plate in the horizontal direction, and a contact width of the brush member 11 with respect to the short direction SD was measured by observation through a microscope.

In the case where the brush member 11 is prepared so that the density and the thickness of the bristle material thereof are uniform, the peak pressure can be calculated by (formula 1) to (formula 3) below. First, in a state in which an object is press-contacted to the brush member 11 with a predetermined penetration amount, an average (average pressure) of the contact pressure in the brush contact portion can be represented by the (formula 1). In the (formula 1), the normal reaction and the contact width are values measured in a state in which the pressing plate (FIG. 4) or the glass plate (FIG. 5) is press-contacted to the brush member 11 with the predetermined penetration amount.

$$(\text{average pressure})=(\text{normal reaction})/((\text{contact width})\times(\text{longitudinal width}))(\text{gf/mm}^2) \quad \text{(formula 1)}$$

In an actual brush contact portion between the brush member 11 and the photosensitive drum 1, the contact pressure becomes material in a portion where the penetration amount of the brush member 11 into the photosensitive drum 1 is largest. A maximum value of this contact pressure is referred to as the peak pressure. The peak pressure is calculated by the (formula 3) with use of an average penetration amount (formula 2) obtained from a material penetration amount and a minimum penetration amount of the brush member 11.

$$(\text{average penetration amount})=((\text{material penetration amount})+(\text{minimum penetration amount}))/2\ (\text{mm}) \quad \text{(formula 2)}$$

$$(\text{peak pressure})=(\text{average pressure})\times(\text{maximum penetration amount})/(\text{average penetration amount})\ (\text{gf/mm}^2) \quad \text{(formula 3)}$$

The above-described calculating method means in actuality that the contact pressure applied to the surface of the photosensitive drum 1 drawing an arc as shown in FIG. 6 is linearly approximated. Specifically, it is assumed that the brush member 11 of 4 mm in short(-side) width L3 is contacted to the photosensitive drum 1 of 24 mm in diameter from immediately above the photosensitive drum 1 so that the penetration amount becomes 1.2 mm in a center portion with respect to the short direction SD. In this case, the maximum penetration amount is 1.2 mm, the minimum penetration amount is 1.03 mm, and the average penetration amount is 1.115 mm, so that the peak pressure can be calculated using the (formula 3).

The contact area ratio was discriminated by a color tint between a portion (contact portion) where the bristle material of the brush member 11 contacts the glass plate and a portion (non-contact portion) where the bristle material of the brush member 11 does not contact the glass plate when the brush member 11 is contacted to the glass plate as shown in FIG. 5. Part (a) of FIG. 7 is an actual photograph observed through a microscope, and part (b) of FIG. 7 is an image obtained by subjecting the photograph of part (a) of FIG. 7 to binarization so that the contact portion becomes white and the non-contact portion becomes black. The contact area ratio is a ratio of an area of the contact portion to an area of an observation object (i.e., a ratio obtained by dividing the number of white pixels by the number of all the pixels). The maximum contact area ratio is obtained in a position where the peak pressure is obtained, that is, in the center portion with respect to the short direction SD.

In summary, as regards the image forming apparatus including the brush member 11 as in this embodiment, the peak pressure and the maximum contact area ratio can be checked in the following procedure.

1) The outer diameter of the photosensitive drum 1, the bristle height L1 and the short width L3 of the brush member 11, and the shortest distance L2 from the base cloth 11*b* of the brush member 11 to the surface of the photosensitive drum 1 are measured, and the maximum penetration amount (L1-L2) is calculated (see, parts (b) and (c) of FIG. 3).

2) From the outer diameter of the photosensitive drum 1, the short width L3 and the maximum penetration amount of the brush member 11 which are measured in the above-described 1), the minimum penetration amount is calculated on the basis of a geometrical relationship of FIG. 6.

3) From the maximum penetration amount and the minimum penetration amount which are acquired by the above-described 1) and 2), the average penetration amount is calculated on the basis of the (formula 2).

4) A compression test of the brush member 11 is conducted by a method of FIGS. 4 and 5 with use of the average penetration amount calculated in the above-described 3), so that the average pressure is acquired on the basis of the (formula 1).

5) By using the maximum penetration amount, the average penetration amount, and the average pressure which are acquired by the above-described 1), 3), and 4), the peak pressure is calculated on the basis of the (formula 3).

6) In the maximum penetration amount acquired in the above-described 1), the brush member 11 is press-contacted to the glass plate by the method of FIG. 5, and then the contact surface is observed, so that the maximum contact area ratio is calculated.

Further, in order that the peak pressure and the maximum contact area ratio of the brush member 11 are mode desired values, parameters such as the outer diameter of the photosensitive drum 1, the bristle height L1 and the short width L3 of the brush member 11, and the above-described shortest distance L2 are appropriately changed, so that the peak pressure and the maximum contact area ratio may only be required to be checked in the above-described procedure.

Figure 1:
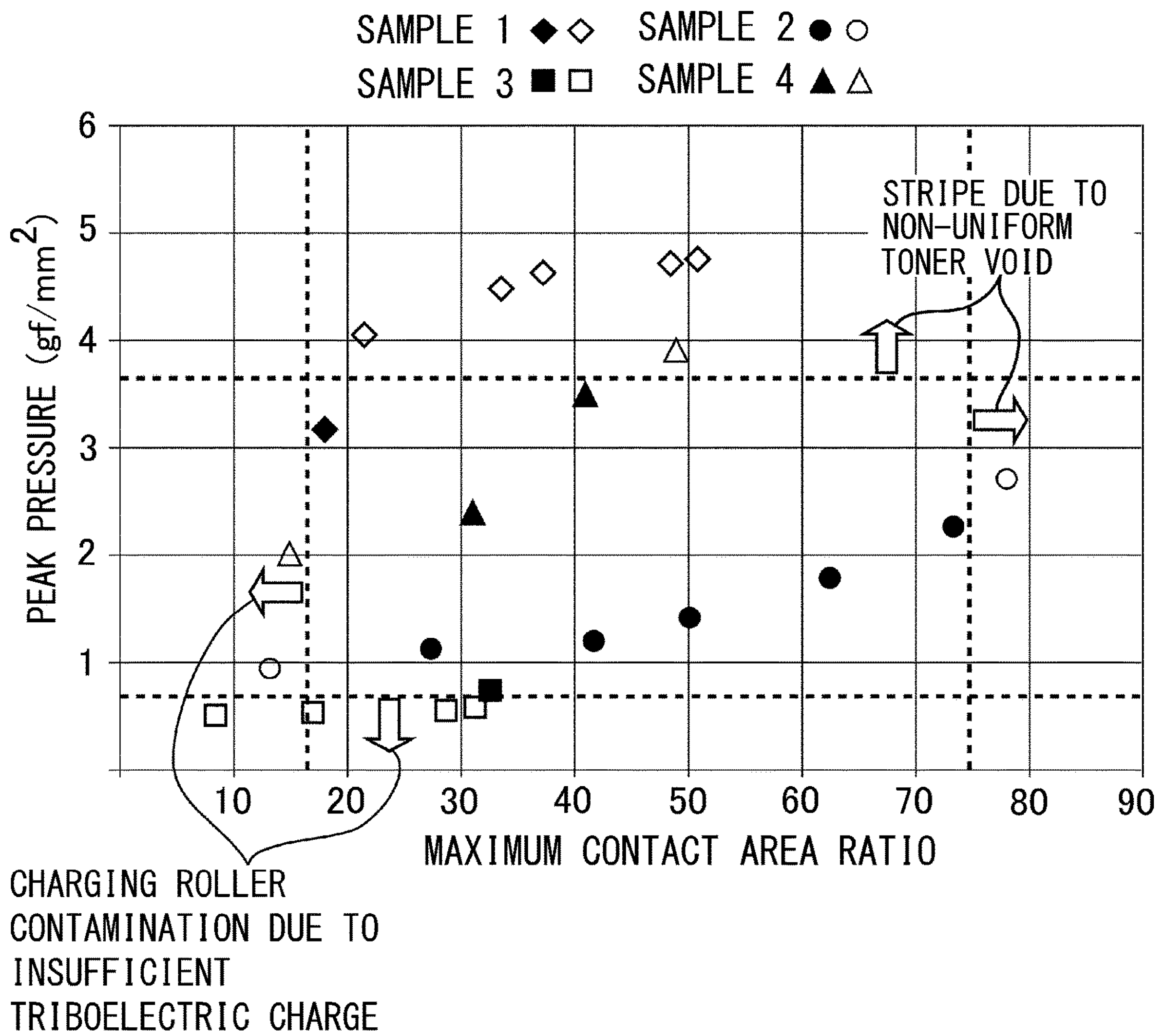
FIG. 1 is a graph showing a relationship between a peak pressure and a maximum contact area ratio of a brush member.

A graph in which in the above-described method, for each of the samples, the peak pressure and the maximum contact area ratio are calculated in a plurality of different conditions and in which values of the peak pressure are plotted on the ordinate and values of the maximum contact area ratio are plotted on the abscissa is FIG. 1. In FIG. 1, points indicated by black marks represent that image defect did not occur, and points indicated by white marks represent that the image defect occurred.

As shown in FIG. 1, in the case where the peak pressure is less than 0.7 gf/mm$^2$ and the maximum contact area ratio is less than 18%, the image defect occurred. This would be considered because in the case where the peak pressure is excessively low, as a result that a degree of contact of the bristle material of the brush member 11 with the toner particles becomes weak, the action for triboelectrically charging the residual toner to the normal polarity becomes insufficient. Further, this would be considered because in the case where the maximum contact area ratio is excessively low, as a result that a frequency of the contact of the toner particles with the bristle material of the brush member 11 becomes low in a region which is a region where the triboelectric charge most easily progresses and in which the peak pressure is applied, the action for triboelectrically charging the residual toner to the normal polarity becomes in sufficient. In either case, when the residual toner reaches the charging portion P2 without being sufficiently supplied with the electric charges of the positive polarity in the brush contact portion, the residual toner charged to the non-normal polarity or the residual toner of which charge amount is close to zero is deposited on the charging roller 2, so that contamination of the charging roller 2 progresses.

Further, in the case where the peak pressure is higher than 3.5 gf/$mm^2$ and in the case where the maximum contact area ratio is higher than 74%, the image defect occurred. This would be considered because in either case of the excessively high peak pressure and the excessively high maximum contact area ratio, a part of the brush contact portion is in a state in which the residual toner cannot pass through the pair of the brush contact portion and thus the residual toner concentratedly pass through a portion (portion where the contact pressure or the density of the bristle material is relatively low through which the residual toner is capable of passing. In this case, the surface of the photosensitive drum 1 passed through the brush contact portion is in a state in which the residual toner is deposited in a stripe shape (linear shape extending in the rotational direction), so that the charging roller 2 is contaminated with the residual toner in the stripe shape. Incidentally, in a region where the peak pressure or the maximum contact area ratio is particularly high, the residual toner is blocked by the brush member 11, so that there is a possibility that not only collection of the residual toner by the developing roller 41 is obstructed but also the blocked toner is scattered and an inside of the image forming apparatus is contaminated with the scattered toner.

Accordingly, it is desired that the brush member 11 is constituted so that the peak pressure and the maximum contact area ratio in the brush contact portion fall within the following region enclosed by a broken line of FIG. 1.

(peak pressure): 0.7 gf/$mm^2$ or more and 3.5 gf/$mm^2$ or less (maximum contact area ratio): 18% or more and 74% or less By this, in the cleaner-less brush type in which the residual toner deposited on the surface of the photosensitive drum 1 passed through the transfer portion P5 is scattered by the brush member 11, an electric charge distribution of the residual toner can be stabilized by the normal polarity. In other words, the electric charge distribution of the residual toner after passing through the brush contact portion can be made a distribution which has a peak on the normal polarity side (negative polarity side) of the toner T and which is sharp compared with the electric charge distribution of the residual toner before entering the brush contact portion.

Incidentally, in the region enclosed by the broken line, the above-described image defect does not readily occur in a central portion than in a peripheral portion. For that reason, it is preferable that the brush member 11 is constituted so that the peak pressure and/or the maximum contact area ratio further falls within the following ranges.

(peak pressure): 1.4 gf/$mm^2$ or more and 2.8 gf/$mm^2$ or less (maximum contact area ratio): 32% or more and 60% or less Here, 1 gf nearly equals to 9.8×mN (milli-newton), so that "0.7 gf/$mm^2$ or more and 3.5 gf/$mm^2$ or less" can be said as "6.9 mN/$mm^3$ or more and 34 mN/$mm^2$ or less". Similarly, "1.4 gf/$mm^2$ or more and 2.8 gf/$mm^2$ or less" can be said as "14 mN/$mm^2$ or more and 28 mN/$mm^2$ or less".

Further, in this embodiment, as an index indicating whether or not the brush member 11 uniformly contacts the photosensitive drum 1, Clark-Evans index is introduced. The Clark-Evans index represents a tendency as to whether in the case where a plurality of points are distributed in a certain flat surface region, the points are distributed locally and concentratedly or are distributed with a distance mutually.

A calculating method of the Clark-Evans index will be described. First, when a distance from a point i to a nearest adjacent point is di and the number of the points is n, an average value (average nearest adjacent distance) W of distances from each of points to an associated nearest adjacent point is represented by the following formula (numerical formula 1).

$$W = \frac{1}{n}\sum_{i=1}^{n} d_i \quad \text{(numerical formula 1)}$$

Here, as an evaluation criterion, the case where the points are randomly distributed on a flat surface with an area S (in accordance with uniform Poisson distribution) will be considered. In this case, an expected value E (W) of the average nearest adjacent distance W is represented by the following formula (numerical formula 2).

$$E(W) \approx \frac{1}{2\sqrt{n/S}} \quad \text{(numerical formula 2)}$$

In order to compare the cases where the numbers of the points and densities are different from each other, a value w obtained by standardizing the average nearest adjacent distance W with the expected value E (W) as represented by the following formula (numerical formula 3) is referred to as the Clark-Evans index.

$$w = \frac{W}{E(W)} \quad \text{(numerical formula 3)}$$

In order to acquire the Clark-Evans index of the brush member 11, as shown in FIG. 5, the brush member 11 is pressed against the glass plate surface, and the brush contact portion is observed through the glass plate surface from a side opposite from the side where the brush member 11 is pressed against the glass plate surface. In the brush contact portion, when the free ends of the bristle material in a certain area (100 $mm^2$) are represented by points, a distribution of the points as shown in part (c) of FIG. 7 is obtained. From this distribution of the points, the Clark-Evans index is calculated using the above-described formulas (numerical formulas 1 to 3).

Incidentally, a part of the bristle material contacts the glass (plate) surface even at a portion closer to a base than the free ends are. The action by which the toner T is triboelectrically charged by such a bristle material would be considered that contribution of a portion (most pressing point) where the bristle material most strongly contacts the glass surface is large. However, the distribution of the most pressing point of the bristle material is mostly common to a distribution of the free ends of the bristle material, and property as the distribution is substantially unchanged. For that reason, in this embodiment, the Clark-Evans index is calculated from the free end distribution of each bristle material contacting the glass surface.

As regards the Clark-Evans index, w=1 holds in the case of a random distribution, w<1 holds in the case of concentrated distribution, and w>1 holds in the case of regular distribution. An extreme example of the regular distribution is a lattice-shaped distribution over an entire area of an observation object. An extreme example of the concentrated distribution is a distribution such that the points are concentrated at a single portion or several portions in the area of the observation object.

A result of acquisition of the Clark-Evans index for actual samples of the brush member 11 is as follows.

Sample 1: w=1.01

Sample 2: w=1.13

Sample 3: w=1.15

Sample 4: w=1.07

Sample obtained by intentionally twisting sample 2 in bundle: w=0.7

From a property of the Clark-Evans index, when w>1 holds, it can be said that the free ends of the bristle materials of the brush member 11 are loosened without making a bundle. On the other hand, when w<1 holds, it is suggested that the bristle materials of the brush member 11 makes the bundle (aggregation, lump) due to some cause.

In order to cause the brush member to normally function, it is required that the bristle materials of the brush member 11 contact the surface of the photosensitive drum 1 in a loosened state without making the bundle. In this embodiment, the brush member 11 is constituted so that the Clark-Evans index is 1 or more (w≥1). This condition can be said as a condition for ensuring that the bristle materials do not make the bundle due to some cause.

Incidentally, depending on the constitution of the brush member 11, it would be also considered that even in the brush contact portion, a value of the Clark-Evans index is different place by place. In that case, the Clark-Evans index at a portion (place where the contact pressure is the peak pressure) where the penetration amount of the brush member 11 is largest is 1 or more. This is because at the portion where the penetration amount is largest, the bundle of the bristle materials is liable to be formed by a force received by the bristle materials.

(Qualitative Description of Phenomenon)

How a phenomenon changes depending on the calculated peak pressure and the calculated maximum contact area ratio will be described. Schematic views when the peak pressure or the maximum contact area ratio is insufficient (reference example 1) are shown in FIGS. 8 and 9. FIG. 8 is the schematic view showing principal members of the image forming portion 101. FIG. 9 is an enlarged view of a part of FIG. 8, in which the electric charges of the toner are represented by three kinds of the positive polarity (+), the negative polarity (−), and weak electric charge (0).

As shown in FIG. 9, as the residual toner, toner particles having a broad electric charge distribution enter the brush member 11. In this example, the peak pressure or the maximum contact area ratio of the brush member 11 is insufficient and thus the triboelectric chargeability is low, and therefore, the residual toner passes through the brush contact portion while maintaining the broad electric charge distribution. Thereafter, when the residual toner reaches the charging portion P2, as described above, particularly, the toner charged to the positive polarity causes improper charging due to deposition thereof on the charging roller 2 and causes white background fog due to collection failure thereof by the developing roller 41 in some instances. Further, when the toner with the weak electric charge is large in amount, the toner cannot sufficiently impart the electric charge of the negative polarity in the charging portion P2 in some cases, and in that case, the toner with the weak electric charge is not readily collected by the developing roller 41.

Next, a phenomenon of the case (reference example 2) where the peak pressure or the maximum contact area ratio is excessively high will be described.

Part (a) of FIG. 10 is a schematic view of a model test in which in FIG. 5, the glass plate as a model is strongly pressed against the brush member 11 (maximum penetration amount: 3 mm) and then the toner is supplied. With movement of the glass plate, the toner is supplied, so that a state in which a flow of the toner T is created is observed.

When the peak pressure or the maximum contact area ratio is high, the brush member 11 is strongly pressed against the photosensitive drum 1. As in a place indicated by X in part (a) of FIG. 10, at a portion where of the brush contact portion, at a portion where the bristle materials (electroconductive threads 11*a*) makes a bundle (aggregate), the brush member 11 is more strongly pressed against the photosensitive drum 1, so that passing of the toner T is strongly restricted. On the other hand, in a place indicated by Y, the electroconductive threads do not make the bundle, and a flow of the toner T is concentrated, so that the toner T passes through the place in a large amount.

At x of part (b) of FIG. 10, on the surface of the photosensitive drum 1 passed through the brush contact portion, an amount and electric charges of the toner deposited on a portion corresponding to the place indicated by X in part (a) of FIG. 10 are schematically shown. At y of part (b) of FIG. 10, on the surface of the photosensitive drum 1 passed through the brush contact portion, an amount and electric charges of the toner deposited on a portion corresponding to the place indicated by Y in part (a) of FIG. 10 are schematically shown. In the place (X, x) where the toner T does not readily passes through the place, the toner T passes through the place while being strongly rubbed with the brush member 11, and therefore, the electric charges of the negative polarity are imparted to most of the toner T. On the other hand, in the place (Y, y) where the toner concentratedly passes through the place, a part of the toner T is liable to pass through the place without being strongly rubbed with the brush member 11, and the toner amount increases. Therefore, the residual toner deposited in the stripe shape on the place (Y, y) where the toner concentratedly passes through the place is deposited on the charging roller 2, so that contamination of the constitution example roller 2 with the residual toner is liable occur in the stripe shape.

FIGS. 11 and 12 are schematic views showing this embodiment. FIG. 11 is the schematic view showing principal members of the image forming portion 101. FIG. 12 is an enlarged view of a part of FIG. 11, in which similarly as in FIG. 9, the electric charges of the toner are shown by being divided into the three kinds. Compared with FIGS. 8 and 9, a contact condition is set so that the brush member 11 is strongly pressed against the photosensitive drum 1 and a state in which the peak pressure and the maximum contact area ratio are excessively high (FIG. 10) is not formed.

As shown in FIG. 12, the brush member 11 in this embodiment is set to have an appropriate peak pressure and an appropriate maximum contact area ratio, and therefore, the residual toner with the broad electric charge distribution is triboelectrically charged by being rubbed with the bristle materials (electroconductive threads 11*a*) of the brush member 11 when the residual toner passes through the brush contact portion. Further, the brush member 11 is constituted so that the peak pressure and the maximum contact area ratio do not become excessively high and the Clark-Evans index satisfies w≥, and therefore, the residual toner passed through the brush contact portion is not concentrated in the stripe shape. For this reason, contamination of the charging brush 2 with the residual toner and collection failure of the residual toner by the developing roller 41 are not readily caused, so that an image quality can be maintained at a high level for a long term.

Second Embodiment

A second embodiment of the present invention will be described. This embodiment is different from the first embodiment in that a voltage is applied to the brush member 11. In the following, elements to which reference numerals or symbols common to the first and second embodiments have the substantially same constitutions and functions as those described in the first embodiment, and a portion different from the first embodiment will be principally described.

As shown in a schematic view of FIG. 13, in the cleaner-less brush type, toner particles are entangled and caught in the neighborhood of a base of the bristle materials (electroconductive threads 11*a*) of the brush member 11 in some instances. The toner T caught by this portion is basically pushed out toward a downstream of the rotational direction of the photosensitive drum 1 by that new residual toner successively reaches the brush contact portion. However, compared with the toner T passing through the brush contact portion while being rolled by being rubbed with a free end portion of the bristle material of the brush member 11, the toner pushed out after being caught by the base portion of the bristle material tends to have an insufficient amount of the electric charges of the normal polarity (negative polarity).

Therefore, in this embodiment, in order to urge the toner T toward a region (toward the photosensitive drum 1 side) where the bristle material of the brush member 11 and the surface of the photosensitive drum 1 are in contact with each other, the voltage is applied to the brush member 11.

In this embodiment, during image formation, the surface of the photosensitive drum 1 is charged to the dark portion potential Vd of −700 V in the charging portion P2. The image region on the photosensitive drum 1 is exposed to light by the exposure device 3 to have the light portion potential Vl of −100 V. Then, the photosensitive drum surface passes through the transfer portion P5 where a transfer voltage of +1000 V is applied to the transfer roller 5, so that the dark portion potential Vd becomes about −200 V, and the light portion potential Vl becomes about −50 V. Accordingly, the surface potential of the photosensitive drum 1 reaching the brush contact portion during the image formation becomes about −20 V to about −200 V.

As shown in FIG. 14, to the brush member 11, a brush power source E11 as a voltage applying means is electrically connected. During the image formation, to the brush member 11, by the brush power source E11, a predetermined brush voltage E is applied. The predetermined brush voltage E is a potential of the same polarity as the normal polarity of the toner T relative to the surface potential (particularly polarity after passing through the transfer portion where the dark portion potential is higher than the light portion potential) of the photosensitive drum 1 reaching the brush contact portion during the image formation. In this embodiment, to the brush member 11, a voltage of −400 V is applied.

Of the residual toner entering the brush contact portion, the toner T charged to the negative polarity (normal polarity) is urged toward the photosensitive drum 1 side electrostatically in the brush contact portion by a potential difference between the brush voltage E (−400 V) and the surface potential (−50 V to −200 V) of the photosensitive drum 1. By this, the toner T charged to the negative polarity is pressed against the photosensitive drum 1 and is rolled while contacting the bristle material of the brush member 11 and the surface of the photosensitive drum 1, so that the negative toner T is sufficiently triboelectrically charged. By this, the toner T is sufficiently triboelectrically charged in the brush contact portion, so that the electric charge distribution of the residual toner can be stabilized in the normal polarity, and thus it is possible to suppress an occurrence of inconveniences such as the contamination of the charging roller 2 with the residual toner and the collection failure (improper collection) of the residual toner by the developing roller 41.

Here, the brush voltage E is set at a value to a degree such that electric discharge does not occur between the brush member 11 and the photosensitive drum 1. This is because when unnecessary electric discharge is carried out, the photosensitive drum 1 is contaminated with a discharge product and deterioration of the photosensitive drum 1 is accelerated.

In this embodiment, similarly as the first embodiment, the brush member 11 is disposed substantially in parallel to the surface of the photosensitive drum 1. Accordingly, as shown in FIG. 14, a contact pressure between the brush member 11 and the photosensitive drum 1 becomes maximum (peak value) in a center portion of the brush contact portion with respect to the short direction.

Here, of the residual toner entering the brush contact portion, the toner T charged to the positive polarity (non-normal polarity) is liable to be attracted toward the base side of the bristle material during entrance thereof into the brush contact portion. The toner T attracted to the base side of the bristle material is moved to a downstream by being pushed out by the toner T newly supplied from an upstream side, and at that time, the moved toner T is triboelectrically charged to the negative polarity by being rubbed with the bristle material. Thus, the toner T changed in polarity to the negative polarity during movement through the inside of the brush member 11 is pressed against the photosensitive drum 1 by the brush voltage E, and is triboelectrically charged by being rolled while contacting the bristle material of the brush member 11 and the surface of the photosensitive drum 1. However, the change in polarity of the toner T, attracted to the base side of the bristle material, to the negative polarity is delayed, there is a possibility that the toner T in a state in which a charge amount thereof is insufficient passes through the brush contact portion.

Therefore, in order to quickly change the polarity of the toner, attracted to the base side of the bristle material, to the negative polarity, in this embodiment, it is desirable that a lower limit is set for each of the peak pressure and the contact area ratio of the brush member 11 in a most upstream position of the brush contact portion with respect to the rotational direction R1 of the photosensitive drum 1. As an example, setting was made so that the penetration amount of the brush member 11 in the most upstream position of the brush contact portion is 1.2 mm and so that the penetration amount of the brush member 11 in a center position of the brush contact portion with respect to the short direction (rotational direction R1) of the brush contact portion. By this, in the most upstream position of the brush contact portion, the following relationships are satisfied.

(contact pressure)≥0.7 gf/mm$^2$ (contact area ratio)≥18%

Conditions of the peak pressure, the maximum contact area ratio, and the Clark-Evans index are similar to those in the first embodiment.

When the contact pressure and the contact area ratio in the most upstream position of the brush contact portion are set as described above, the polarity of the toner T can be quickly changed to the negative polarity at an upstream portion of the brush contact portion as shown in FIG. 15, so that the toner T can be made less accumulated at the base portion of the bristle material of the brush contact portion. Then, the toner T is sufficiently triboelectrically charged in the brush contact portion, so that the electric charge distribution of the residual toner can be further stabilized in the normal polarity.

Incidentally, in this embodiment, the toner T is pressed against the photosensitive drum 1 side by the action of the brush voltage E, so that even in the case where the brush member 11 is not necessarily be positioned on the positive polarity side (non-normal polarity side) relative to the toner T in the charging series, the polarity of the toner T can be changed to the negative polarity in the brush contact portion. However, a constitution in which the brush member 11 is positioned on the positive side relative to the toner T in the charging series is advantageous for changing the polarity of the toner T to the negative polarity.

Further, in this embodiment, the principal action of the brush voltage E was described from the viewpoint that the toner T entering the inside of the brush member 11 is pressed toward the photosensitive drum 1 side. The present invention is not limited thereto. The change in polarity of the toner T to the negative polarity may be accelerated by injecting (supplying) the electric charge of the normal polarity into the toner T through the brush member 11 under application of the brush voltage E to the brush member 11. Further, by the application of the brush voltage E, the action of pressing the toner T against the photosensitive drum 1 and the action of injecting the electric charge into the toner T may be taken simultaneously.

Third Embodiment

A third embodiment of the present invention will be described. This embodiment is different from the second embodiment in that the brush member 11 is disposed so as to be inclined relative to the photosensitive drum 1. In the following, elements to which reference numerals or symbols common to the first to third embodiments have the substantially same constitutions and functions as those described in the first or second embodiment, and a portion different from the first or second embodiment will be principally described.

FIGS. 16 and 17 are schematic views showing this embodiment. FIG. 16 is the voltage showing principle members of the image forming portion 101. FIG. 17 is an enlarged view of a part of FIG. 16, in which similarly as in FIG. 9, the electric charges of the toner T are indicated by being divided into the three kinds.

In this embodiment, the brush member 11 is disposed in an inclined state relative to the photosensitive drum 1 so that with respect to the rotational direction R1 of the photosensitive drum 1, the contact pressure and the contact area ratio in a most upstream portion of the brush contact portion become the peak pressure and the maximum contact area ratio, respectively. A tangential line TL of the photosensitive drum 1 is a tangential line of the photosensitive drum 1 at a point 1*a* of intersection between a rectilinear line perpendicularly drawn from a center position of the brush member 11 with respect to the short direction SD in the short direction SD (in a direction in which the base cloth 11*b* extends as viewed in the longitudinal direction). In this embodiment, a direction in which the brush member 11 is inclined is an inclination direction in which the base cloth 11*b* of the brush member 11 is spaced away from the tangential line TL toward a downstream of the rotational direction R1.

An angle between the short direction D of the brush member 11 and the tangential line TL is referred to as an inclination angle. In this embodiment, it was suitable that the inclination angle is set at 12 degrees and the brush member 11 is disposed so that a penetration amount (maximum penetration amount) in the most upstream portion of the brush contact portion becomes 1.2 mm. Also, in this embodiment, in the most upstream position of the brush contact portion, the following relationships are satisfied.

(contact pressure)≥0.7 gf/mm$^2$ (contact area ratio)≥18%

Incidentally, the inclination angle and the penetration amount can be appropriately changed depending on an outer diameter of the photosensitive drum 1, a necessary peak pressure, and a necessary contact area ratio.

Conditions of the peak pressure, the maximum contact area ratio, and the Clark-Evans index are similar to those in the first embodiment.

In this embodiment, the toner T entering the brush contact portion is pressed against the photosensitive drum 1 side by the action of the brush voltage E similarly as in the second embodiment. By this, the toner T is sufficiently triboelectrically charged in the brush contact portion, so that the electric charge distribution of the residual toner can be stabilized in the normal polarity, and thus it is possible to suppress an occurrence of inconveniences such as the contamination of the charging roller 2 with the residual toner and the collection failure (improper collection) of the residual toner by the developing roller 41.

In addition, in this embodiment, as shown in FIG. 17, a constitution in which the contact pressure and the contact area ratio become maximum in the most upstream portion of the brush contact portion is employed. For that reason, of the residual toner entering the brush contact portion, the polarity of the toner T charged to the positive polarity (non-normal polarity) can be quickly changed to the negative polarity by triboelectrically charging the bristle material of the brush member 11, so that the electric charge distribution of the residual toner can be further stabilized in the normal polarity.

In this embodiment, a constitution in which the contact pressure and the contact area ratio become maximum in the most upstream portion of the brush contact portion by disposing the brush member 11 in the inclined state was employed. The present invention is not limited thereto. For example, by employing a constitution such that the bristle height of the brush member 11 becomes shorter from one side (upstream side of the rotational direction R1) toward the other side (downstream side of the rotational direction R1) with respect to the short direction SD, the contact pressure and the contact area ratio may be made maximum in the most upstream portion of the brush contact portion.

In the above-described embodiments, the constitution including the charging roller 2 which is the charging member of the contact charging type was described, but a charging member of a type (for example, corona discharging type) other than the contact charging type may be used. Even in such a case, by applying the constitutions described in the above-described embodiments, at least two improper collection of the residual toner by the developing roller 41 can be suppressed.

Further, in the above-described embodiments, the constitution of the direct transfer type in which the toner image is directly transferred from the photosensitive drum 1 (image bearing member) onto the sheet (recording material) as the toner image receiving member was described, but the present invention may be applied to an image forming apparatus of an intermediary transfer type. In the case of the intermediary transfer type, the transfer member refers to, for example, a transfer roller (primary transfer roller) for primary-transferring the toner image from the photosensitive drum 1 as the image bearing member onto the intermediary transfer member as the toner image receiving member. As the intermediary transfer member, an endless belt member stretched by a plurality of rollers can be used. The toner image primary-transferred on the intermediary transfer member is secondary-transferred from the intermediary transfer member onto the sheet (recording material) by a secondary transfer means such as a secondary transfer roller for forming a secondary transfer nip between itself and the intermediary transfer member. Even in a constitution of such an intermediary transfer type, effects similar to the effects of the above-described embodiments can be obtained by replacing the transfer roller in each of the above-described embodiments with the primary transfer roller.

According to the present invention, the electric charge distribution of the residual toner can be stabilized in the normal polarity.

Fourth Embodiment

An outline of an image forming apparatus 100 according to a fourth embodiment will be described using FIGS. 19 and 20. FIG. 19 is a schematic view of the image forming apparatus 100. FIG. 20 is an enlarged view of an image forming portion 101 provided in the image forming apparatus 100. The image forming apparatus 100 is a monochromatic printer for forming a monochromatic image on a sheet S on the basis of image information received from an external device. As the sheet S which is a recording material, it is possible to use various sheets different in size and material, including paper such as plain paper or thick paper; a plastic film; a cloth; a sheet material such as coated paper subjected to surface treatment; a special-shaped sheet material such as an envelope or index paper; and the like.

As shown in FIGS. 19 and 20, the image forming apparatus 100 includes the image forming portion 101 of an electrophotographic type in which an image is formed on the sheet S, and a sheet feeding mechanism (6, 8, 12) for feeding and conveying the sheet S. The image forming portion 101 includes a photosensitive drum 1 as an image bearing member, a charging roller 2 as a charging means, an exposure device 3 as an exposure means, a developing device 4 as a developing means, a transfer roller 5 as a transfer means, a brush member 11, and a fixing device 9 as a fixing means. Of the image forming portion 101, a latent image unit 1A including the photosensitive drum 1, the charging roller 2, and the brush member 11, and the developing device 4 as a developing voltage are constituted as a cartridge C detachably mountable to an image forming apparatus main assembly 100A.

The photosensitive drum 1 is an electrophotographic photosensitive member molded in a drum shape. The photosensitive drum 1 has the drum shape (cylindrical shape) of, for example, 24 mm in diameter, and is rotationally driven at a peripheral speed (process speed) of 100 mm/sec during image formation. The charging roller 2 is a charging member of a contact constitution example type in which the charging roller 2 contacts the photosensitive drum 1. A contact portion between the charging roller 2 and the photosensitive drum 1 is a charging portion P2 (charging position) where charging of a surface of the photosensitive drum 1 is carried out.

The developing device 4 includes a developing roller 41, a supplying roller 42, a stirring member 43, a developing blade 44, and a toner accommodating portion 45. The developing roller 41 is a developing member or a developer carrying member for supplying toner T to a developing portion P4 (developing position), where the developing roller 41 and the photosensitive drum oppose each other, by being rotated while carrying the toner T. In this embodiment, a so-called contact development type in which a toner layer carried on the developing roller 41 contacts the surface of the photosensitive drum 1 in the developing portion P4 is used. The developing roller 41 is disposed at an opening of the toner accommodating portion 45 provided in a position opposing the photosensitive drum 1. The supplying roller 42 supplies (applies) the toner T in a supplying chamber 45*a* of the toner accommodating portion 45 to the developing roller 41. The stirring member 43 is disposed in the toner accommodating portion 45 and stirs the toner T in the toner accommodating portion 45 by being rotated, and supplies the toner T into the supplying chamber 45*a*. The toner accommodating portion 45 is a container for accommodating the toner T as a developer. The developing blade 44 is contacted from an inside of the toner accommodating portion 45 to a surface of the developing roller 41, rotating toward the developing portion P4, with a predetermined pressing force (pressure). The developing blade 44 is formed of, as a main component, a material (for example, iron or copper) which is on a positive polarity side (non-normal polarity side) relative to a main component (binder resin) in a charging series. By this, the toner T is triboelectrically charged to a negative polarity (normal (charge) polarity) by being rubber with the developing blade 44.

The developing roller 41 is, for example, a roller which includes an electroconductive rubber layer (elastic layer) and which has a diameter of 12 mm. The supplying roller 42 is a roller including a sponge-like outer layer with a diameter of 10 mm, for example.

The transfer roller 5 is disposed in contact with the surface of the photosensitive drum 1. A nip where the transfer roller 5 and the photosensitive drum 1 oppose each other is a transfer portion 5 where the toner image is transferred from the photosensitive drum 1 onto the sheet S.

The brush member 11 is disposed downstream of the transfer portion P5 and upstream of the charging portion P2 with respect to a rotational direction R1 of the photosensitive drum 1. The brush member 11 is disposed in contact with the surface of the photosensitive drum 1 in a predetermined contact condition. Details of the brush member 11 will be described later.

The fixing device 9 includes a fixing roller 9*a* or a flexible fixing film as a first rotational member, a pressing roller 9*b* as a second rotatable member contacting the first rotatable member with a predetermined pressing force, and a heating means for heating the image on the sheet S through the first rotatable member. As the heating means, a halogen lamp generating radiant heat or a heater substrate in which a pattern of a heat generating resistor is formed on a ceramic substrate can be used.

The sheet feeding mechanism includes a cassette 6, a feeding roller 7, a feeding (conveying) roller pair 8, and a discharging roller pair 12. The cassette 6 is a stacking portion in which sheets S are stacked. The feeding roller 7 is a feeding member for feeding the sheets one by one from the cassette 6. The feeding roller pair 8 is a feeding member for feeding the sheet S, fed from the cassette 6, to the transfer portion P5. The discharging roller pair 12 is a discharging member for discharging the sheet S on which the image is formed by the image forming portion 101.

In the following, an outline of an image forming operation by the image forming apparatus 100 will be described. When an execution instruction of the image forming operation is provided to the image forming apparatus 100, the photosensitive drum 1 is rotationally driven in a predetermined rotational direction R1 in FIG. 20, and the surface of the photosensitive drum 1 is electrically charged uniformly by the charging roller 2. The charging roller 2 is rotated in a rotational direction R2 in which the charging roller 2 is rotated together with the photosensitive drum 1 in the charging portion P2. The exposure device 3 exposes the surface of the photosensitive drum 1 to light by irradiating the surface of the photosensitive drum 1 with laser light L through a window portion 3*a* between the latent image unit 1A and the developing device 4 on the basis of the image information received from the external device. By this, an electrostatic latent image is written (formed) on the surface of the photosensitive drum 1.

In this embodiment, the reverse development type is employed. For that reason, the charging roller 2 charges the surface of the photosensitive drum 1 to a dark portion potential Vd of a negative polarity by being supplied with a voltage (charging voltage) of the negative polarity which is the same as the normal polarity of the toner T. After the charging, a light portion potential V1 of a region (image region) in which the photosensitive drum surface is exposed to light by the exposure device 3 is lower than the dark portion potential Vd. In a constitution example of this embodiment, for example, the photosensitive drum surface is charged to Vd=−500 (V) with use of a DC charging voltage of −1100 V.

In the developing device 4, the toner T accommodated in the toner accommodating portion 45 is uniformized by the stirring member 43, and is supplied to the developing roller 41 by the supplying roller 42. The toner T carried on the developing roller 41 is not only triboelectrically charged to the normal polarity by being rubbed with the developing blade 44 but also regulated in a predetermined layer thickness during passing through the developing blade 44. By rotation of the developing roller 41, the toner T charged to the normal polarity is supplied to the developing portion P4. Then, a voltage (developing V) of the normal polarity which is the same as the normal polarity of the toner T is applied to the developing roller 41, so that the toner T is transferred onto the photosensitive drum 1 depending on a potential distribution on the surface of the photosensitive drum 1. By this, the electrostatic latent image on the surface of the photosensitive drum 1 is developed and visualized as a toner image. The developing voltage is −350 V, for example. Further, the developing roller 41 is rotated at a peripheral speed (for example, 140 mm/sec) faster than the peripheral speed of the photosensitive drum 1 in a rotational direction R4 in which the developing roller 41 is rotated together with the photosensitive drum 1 in the developing portion P4. The toner image formed on the surface of the photosensitive drum 1 is fed to the transfer portion P5 in a state in which the toner image is carried on the photosensitive drum 1.

In parallel to the above-described process, the sheets S and fed one by one from the cassette 6 by the feeding roller 7, and then the sheet S is conveyed to the transfer portion P5 by the feeding (conveying) roller pair 8. A voltage (transfer voltage) of a positive polarity opposite to the normal polarity of the toner T is applied to the transfer roller 5, so that the toner image is transferred from the photosensitive drum 1 onto the sheet S in the transfer portion P5. The transfer voltage is +1000 V, for example.

The sheet S passed through the transfer portion P5 is conveyed to the fixing device 9. In the fixing device 9, the image on the sheet S is heated and fixed by the first rotatable member heated by the heating means while nipping and conveying the sheet S in the nip between the first rotatable member and the second rotatable member. The sheet S passed through the fixing device 9 is discharged to a discharge tray 13 provided at an upper portion of the image forming apparatus 100 by the discharging roller pair 12.

(Cleaner-Less Brush Type)

Next, a cleaner-less brush type using the brush member 11 will be described. In this embodiment, a simultaneous development and cleaning type in which residual toner which was not transferred onto a toner image receiving member (sheet S) in the transfer portion P5 is collected by the developing roller 41 when the residual toner reaches the developing portion P4 next time is employed. In the simultaneously development and cleaning type, the residual toner collected by the developing roller 41 is stirred together with another toner in the toner accommodating portion 45 and then is used for the development again.

In the simultaneous development and cleaning type, the residual toner which was not transferred onto the toner image receiving member in the transfer portion P5 is collected by the developing roller 41, and therefore, the brush member 11 basically permits passing of the residual toner therethrough. For that reason, the "brush member" in this embodiment is different from a brush member as a cleaning device (drum cleaner) for the purpose of removing the residual toner from the photosensitive drum 1. Incidentally, in the simultaneous development and cleaning type, the cleaning device for collecting the residual toner is not disposed, and therefore, such a type is called a cleaner-less brush type in some cases.

In the cleaner-less brush type, in the simultaneous development and cleaning type, the brush member 11 for scattering the residual toner deposited on the surface of the photosensitive drum 1 passed through the transfer portion P5 is disposed downstream of the transfer portion P5 and upstream of the charging portion P2 with respect to the rotational direction R1. By disposing the brush member 11, a state in which the residual toner locally exists in a large amount on the photosensitive drum 1 can be alleviated. When the residual toner locally exists in the large amount on the photosensitive drum 1, there is a possibility that image defects are caused by improper charging due to contamination of the charging roller 2 with the residual toner and by improper collection of the residual toner in the developing portion P4. On the other hand, in the cleaner-less brush type, the residual toner is scattered by the brush image 11, and behavior of the residual toner in the charging portion P2 and the developing portion P4 is uniformized, so that the above-described inconveniences can be suppressed.

Further, a brush voltage power source E11 (FIG. 20) for applying a bias voltage (brush voltage) of the same polarity as the normal polarity of the toner T to the brush member 11 may preferably be disposed. By applying the brush voltage to the brush member 11, the toner T charged to the non-normal polarity can be held on the brush member 11 while permitting passing of the toner T of the normal polarity. Further, the toner T of the non-normal polarity held on the brush member 11 is moved toward the charging portion P2 while being carried on the surface of the photosensitive drum 1 when the toner T of the non-normal polarity held by the brush member 11 is changed in polarity to the normal polarity by friction with the bristle material of the brush member 11.

The brush voltage applied to the brush member 11 in this embodiment has a magnitude to a degree such that the electric discharge does not occur between the brush member 11 and the photosensitive drum 1. However, by applying the brush voltage to the brush member 11, the electric charge of the normal polarity is injected from the brush member 11 to the residual toner, so that the polarity of the residual toner may be changed to the normal polarity.

Incidentally, a constitution in which the brush voltage is not applied to the brush member 11. Even in that case, the toner T is triboelectrically charged in the brush contact portion, so that the polarity of the toner T can be changed to the normal polarity. Further, in the constitution in which the brush voltage is not applied to the brush member 11, the brush member 11 can be a member electrically connected to a ground potential.

(Operation Peculiar to Cleaner-Less Brush Type)

In the cleaner-less brush type, the residual toner passed through the contact portion between the brush member 11 and the photosensitive drum 1 reaches the charging portion P2. To the charging roller 2, the charging voltage of a same polarity as the normal polarity of the toner is applied, and therefore, of the residual toner particles, toner particles charged to the normal polarity pass through the charging portion 2 while being pressed against the photosensitive drum 1. On the other hand, of the residual toner particles, toner particles charged to the non-normal polarity or toner particles of which charge amount is close to zero are partially deposited on the charging roller 2 in the charging portion P2. When the residual toner is deposited and accumulated on the charging roller 2, uniform charging of the photosensitive drum 1 is prevented, so that the image defect due to the improper charging becomes apparent.

In this embodiment, in order to alleviate a degree of deposition of the residual toner on the charging roller 2, a peripheral spaced difference between the charging roller 2 and the photosensitive drum 1 is set. Specifically, a peripheral speed of the charging roller 2 is set at a value higher than a peripheral speed of the photosensitive drum 1 by 5% or more, preferably be 10% or more. Further, in order to charge the residual toner to the normal polarity by friction between the charging roller 2 and the photosensitive drum 1, materials of a surface layer of the charging roller 2 and a surface layer of the photosensitive drum 1 are selected. That is, in the charging series, the materials of the surface layer of the charging roller 2 and the surface layer of the photosensitive drum 1 are positioned in a higher rank (positive polarity side, non-normal polarity side) than a main component (binder resin) of the toner. By constituting the peripheral speed difference and the materials as described above, in the charging portion P2, the residual toner is charged to the normal polarity by friction with the charging roller 2 or the photosensitive drum 1, so that deposition of the residual toner on the charging roller 2 can be suppressed.

The residual toner passed through the charging portion P2 reaches the developing portion P4 with rotation of the photosensitive drum 1.

Of the residual toner particles carried on the photosensitive drum 1 in a non-image region (non-exposure region), the toner particles charged to the normal polarity are transferred onto the developing roller 41 and are collected in the toner accommodating portion 45 by a potential difference between the dark portion potential Vd and the developing voltage. On the other hand, of the residual toner particles carried on the photosensitive drum 1 in an image region (exposure region), the toner particles charged to the normal polarity are not transferred onto the developing roller 41 and remain on the photosensitive drum 1 by a potential difference between the light portion potential Vl and the developing voltage. In this case, the toner particles are sent as a part of the toner image, obtained by developing the electrostatic latent image, to the transfer portion P5. Incidentally, a voltage value of the developing voltage has the same polarity as the normal polarity of the toner, and is higher than the light portion potential Vl and is lower than the dark portion potential Vd.

Ideally, of the residual toner particles, the toner particles charged to the non-normal polarity and the toner particles of which charge amount is close to zero are changed in polarity to the normal polarity, and thus are collected by the developing roller 41 in the developing portion P4 without being deposited on the charging roller 2. However, when the residual toner charged to the non-normal polarity in a large amount enters the charging portion P2, the residual toner which is not changed in polarity to the normal polarity in the charging portion P2 is liable to be deposited on the charging roller 2. Further, when the residual toner which is not changed in polarity to the normal polarity in the charging portion P2 reaches the developing portion P4, the residual toner passes through the developing portion P4 without being collected by the developing roller 41. In this case, there is a possibility that contamination of the transfer roller 5 with the residual toner and image defect (white background fog) such that a thin toner image is formed on a white background portion (non-image region) occurs.

In the following, constituent elements of the image forming apparatus 100 will be specifically described.

(Brush Member)

First, the brush member 11 in this embodiment will be described. As shown in FIGS. 19 and 20, the brush member 11 contacts the surface of the photosensitive drum 1 in a position downstream of the transfer portion P5 and upstream of the charging portion P2 with respect to the rotational direction R1 of the photosensitive drum 1. That is, the image forming apparatus 100 includes the brush member 11 disposed downstream of the transfer member and upstream of the developing member with respect to the rotational direction of the image bearing member and contacting the surface of the image bearing member. In the following, a region where the brush member 11 contacts the photosensitive drum 1 is referred to as a "brush contact portion".

Part (a) of FIG. 21 is a perspective view of the latent image unit 1A, part (b) of FIG. 21 is a sectional view of the latent image unit 1A in a plane perpendicular to a rotational axis of the photosensitive drum 1. Part (c) of FIG. 21 is a schematic view showing a state of the brush contact portion as viewed in an arrow 4C direction of part (b) of FIG. 21 from an upstream side of the rotational direction R1 of the photosensitive drum 1. The brush member 11 is fixed to a bearing surface 14*a* provided on a frame 14 of the latent image unit 1A for rotatably supporting the photosensitive drum 1 and the charging roller 2, and is supported by the frame 14.

Part (a) of FIG. 22 is a sectional view of the brush member 11 in a single body state cut along a flat plane perpendicular to a longitudinal direction of the brush member 11. The single body state is a state in which the brush member 11 is not mounted on the frame 14 of the latent image unit 1A as a supporting member, i.e., a state in which an external force does not act on the brush member 11. Part (b) of FIG. 22 is a sectional view of the brush member 11 in a state in which the brush member 11 is contacted to the photosensitive drum 1.

As shown in parts (a) and (b) of FIG. 22, the brush member 11 includes a base cloth 11*b* as a base portion and an electroconductive thread (yarn) 11*a* as a bristle material (fiber) supported by the base cloth 11*b*. The base cloth 11*b* is formed of a synthetic resin fiber containing carbon black as an electroconductive agent. The electroconductive thread 11*a* is formed of, for example, a nylon fiber (pile yarn) in which the electroconductive agent is added, and is textured and planted on the base cloth 11*b*. The material of the electroconductive thread 11*a* is not limited to nylon, but other synthetic resin fibers such as
fibers of rayon, acrylic resin, or polyester resin may be used.

The brush member 11 is a member extending thin and long in a predetermined direction. In the following, an extension direction is referred to as a longitudinal direction LD (see, also, part (a) of FIG. 21) of the brush member 11, and a direction along the base cloth 11*b* and perpendicular to the longitudinal direction LD is referred to as a short direction SD of the brush member 11. In the single body state in which the external force does not act on the brush member 11 (part (a) of FIG. 22), the electroconductive thread 11*a* projects in a direction (direction normal to the base cloth 11*b*) substantially perpendicular to both the longitudinal direction LD and the short direction SD.

As shown in part (a) of FIG. 22, a distance from the base cloth 11*c* to a free end of the electroconductive thread 11*a* in the brush member 11 in the single body state is bristle height L1. The bristle height L1 of the brush member 11 in an example of this embodiment is 5.75 mm. The brush member 11 is fixed to the frame 14 (part (b) of FIG. 21) of the latent image unit 1A by a fixing means such as a double-side tape. The bearing surface of the frame 14 for the brush member 11 is set so that free ends of the electroconductive threads 11*a* enter the photosensitive drum 1. For this reason, the brush member 11 is in a state in which the free ends of the electroconductive threads 11*a* are pressed against the surface of the photosensitive drum 1 and are flexed (bent).

As shown in part (c) of FIG. 21, the brush member 11 is disposed in an attitude such that the longitudinal direction LD thereof is substantially parallel to the rotational axis direction of the photosensitive drum 1.

On the other hand, in part (b) of FIG. 21, a schematic view of the brush member 11 disposed in an attitude such that the short direction SD thereof is substantially parallel to the surface of the photosensitive drum 1 is shown, but an angle of the brush member 11 disposed is not limited thereto. In this embodiment, the brush member 11 is disposed in the inclined state relative to the surface of the photosensitive drum 1. That is, the bearing surface 14*a* (and the base cloth 11*b* supported by the bearing surface 14*a*) of the brush member 11 is disposed is the inclined state relative to a tangential direction of the photosensitive drum 1 so as to be spaced from the surface of the photosensitive drum 1 toward a downstream of the rotational direction R1 of the photosensitive drum 1. Definition of the inclination angle of the brush member 11 and a range of the inclination angle will be described later.

A minimum distance from the base cloth 11*b* of the brush member 11, fixed to the bearing surface 14*a*, to the photosensitive drum 1 is taken as L2. In this embodiment, a difference between L2 and L1 (L1-L2) is a maximum penetration amount of the brush member 11 into the photosensitive drum 1. However, L2<L1 holds.

In the example of this embodiment, the maximum penetration amount of the brush member 11 into the photosensitive drum 1 is, for example, 1.58 mm. Further, in this embodiment, as shown in part (b) of FIG. 21 and part (a) of FIG. 22, as regards the brush member 11 in the single body state, a length (length in a range in which the electroconductive threads 11*a* are planted) of the brush member 11 with respect to the short direction SD, which is a short(-side) width L3 is, for example, 4 mm in the example of this embodiment. The short width L3 may preferably be 3 mm or more for maintaining a performance of the brush member 11 for a long term. As shown in part (b) of FIG. 22, in the state in which the brush member 11 is pressed against the photosensitive drum 1, an occupied width of the electroconductive threads 11*a* with respect to the short direction SD is somewhat broadened.

Further, in the example of this embodiment, a longitudinal width L4 (part (c) of FIG. 21) which is a length of the brush member 11 with respect to the longitudinal direction LD is 216 mm. The longitudinal width L4 is set so that with respect to the longitudinal direction LD, the brush member 11 is capable of contacting an entire area of an image forming region (toner image formable region, maximum region of the latent image formed by the exposure device 3) on the photosensitive drum 1. Further, in the example of this embodiment, a thickness of the electroconductive threads 11*a* is for example, 2 denier and a density of the electroconductive threads 11*a* is 240 kF/inch$^2$. Here, 1 kF/inch$^2$ is a density of 1000 fibers per square centimeter. The thickness and density of the electroconductive threads 11*a* are capable of being appropriately changed as long as the electroconductive threads 11*a* satisfy a function required for the brush member 11. As an example, it is preferable that the thickness of the electroconductive threads 11*a* is denier or more and 6 denier or less and that the density of the electroconductive threads 11*a* is 150 kF/inch$^2$ and 350 kF/inch$^2$. Incidentally, 1 kF/inch$^2$ represents a planting density of 1000 fibers per square inch.

Incidentally, in the case of nylon electroconductive threads 11*a* used in this embodiment, when 1 to 6 denier which is a unit of formula for direct yarn count is converted into a fiber diameter, 1 to 6 denier corresponds to about 10 μm to about 30 μm. For this reason, in the case where the bristle material other than nylon is used as the brush member, it is possible to use a bristle material with a thickness of 1 denier or more and 6 denier or less in terms of direct yarn count and of 10 μm or more and 30 μm or less in term of the fiber diameter.

"1 denier or more and 6 denier or less" can be said as "1.1 decitex or more and 6.7 decitex or less". Further, 1 inch$^2$ is about 6.45 $cm^2$, and therefore, "150 $kF/inch^2$ or more and 350 $kF/inch^2$" can be said as "23 $kF/mm^2$ or more and 54 $kF/mm^2$".

In this embodiment, the brush member 11 is constituted so as to permit the passing of the residual toner while scattering the residual toner deposited on the surface of the photosensitive drum 1 passed through the transfer portion P6. For that reason, in the case where the electroconductive threads 11*a* are excessively thick, there is a possibility that the residual toner cannot be uniformly scattered and passes through the brush contact portion in a stripe shape and thus leads to stripe-shaped contamination of the charging roller 2 with the residual toner. Further, in the case where the electroconductive threads 11*a* are excessively high in density, the residual toner is blocked by the brush contact portion, and thus not only constitutes an obstacle to collection of the residual toner by the developing roller 41 but also contaminates an inside of the image forming apparatus by being dropped or scattered from the photosensitive drum 1. Further, the brush member 11 has a function of triboelectrically charging the residual toner in the brush contact portion. For that reason, in the case where the electroconductive threads 11*a* are excessively thin, there is possibility that the electroconductive threads 11*a* are readily flexed even when the residual toner contacts the electroconductive threads 11*a* and are escaped from the residual toner, and thus the toner particles are not rolled and the residual toner is not sufficiently triboelectrically charged. Further, in the case where the electroconductive threads 11*a* are excessively low in density, a frequency of collision with the electroconductive threads 11*a* becomes low, so that there is a possibility that the residual toner cannot be sufficiently triboelectrically charged.

In the above description, from the viewpoints of a function of scattering the residual toner and a function of triboelectrically charging the residual toner, preferred ranges of the thickness and the density of the electroconductive threads 11*a* were described, but depending on functions required for the brush member 11, details of the thickness, the density, the material, the bristle height, and the like can be appropriately changed. Incidentally, the brush member 11 in this embodiment may have a function of blocking a foreign matter (for example, paper powder) other than the residual toner in the brush contact portion.

(Developer)

In this embodiment, as the developer, the toner T which is one-component developer of which normal polarity (normal charge polarity) is the negative polarity. For that reason, in the following description of this embodiment, the "negative polarity" is synonymous with the normal polarity of the toner T and the "positive polarity" is synonymous with the non-normal polarity of the toner T unless otherwise specified.

The toner T contains a binder resin and a colorant and may further contain a parting agent, a charge control agent, and an external additive as desired. As the binder resin, styrene-acrylic resin and polyester resin, which are lower in rank of the charging series (negative polarity side) than nylon and rayon constituting the electroconductive threads 11*a* of the brush member 11 are, can be preferably used. That is, a main component (binder resin) of the toner T may desirably be positioned on the positive polarity side (lower rank) relative to the material of the bristle materials of the brush member 11 in the charging series. In this embodiment, as the binder resin of the toner, the styrene-acrylic resin is employed.

As the colorant, a known colorant can be used. For example, a dye and a pigment are cited. As the parting agent, a known charge control agent can be used. The charge control agent has an acid value or a hydroxy value and may preferably have the negative polarity which is equivalent to or more than the binder resin. As the external additive, a known external additive can be used. For example, silica, alumina, titania, titanium composite oxide, and the like are cited. The colorant and the parting agent may preferably be included in the binder resin so as not to have the influence on the charge polarity of the toner particle surface.

Further, as the toner, a polymerization toner formed by a polymerization method can be employed. The toner T with a particle size (volume-average particle size) of 4-10 μm, preferably 6-8 μm may preferably be used. In this embodiment, spherical toner prepared by the polymerization method and with a particle size of 7 μm is used. Further, the toner T in this embodiment is so-called non-magnetic one-component developer which does not contain a magnetic component and which is carried on the developing roller 41 principally by an intermolecular force or an electrostatic force (mirror force). However, as the developer, a one-component developer consisting of toner containing the magnetic component may be used. Further, as the developer, a two-component developer constituted by non-magnetic toner and a magnetic carrier may be used. In the case where the magnetic developer is used, as a developer carrying member, for example, a cylindrical developing sleeve in which a magnet is provided is used. Further, to the developer, in addition to the toner and the carrier, an additive (for example, a wax or silica fine particles) for adjusting flowability, charging performance, and the like of the toner may be added.

(Photosensitive Drum)

The photosensitive drum 1 is prepared by successively laminating an undercoat layer, a charge generation layer, and a charge transport layer on a cylindrical electroconductive supporting member (core metal) as a lowermost layer. The charge transport layer is formed by coating and drying point prepared by mixing principally a charge transporting material and the binder resin in a solvent. As the principally used charge transporting material, a known charge transporting material can be used. For example, various triarylamine compounds and hydrazone compounds are cited. Further, as the binder resin, for example, a polycarbonate resin, a polyarylate resin, and the like are cited.

A predominant portion in the triboelectric charge with the toner is the charge transport layer as a surface layer (outermost layer) and is the binder resin occupying most thereof. Here, the cited polycarbonate resin or polyarylate resin are positioned on the non-normal polarity side (upper rank) relative to the styrene-acrylic resin which is the binder resin of the toner T in the charging series. That is, the outermost layer of the image bearing member may preferably be formed of a material capable of triboelectrically charging the toner T to the normal polarity in the case where the outermost layer is rubbed with the resin which is the main component of the toner T. In this embodiment, the polycarbonate resin was selected as the binder resin of the outermost layer.

Further, in this embodiment, as the photosensitive drum 1, a cylindrical photosensitive drum with an outer diameter of 24 mm. Depending on the outer diameter of the photosensitive drum 1. A manner of contact (pressing) of the brush member 11 (for example, the above-described penetration amount or an angle described later in a sixth embodiment) is appropriately changed.

(Charging Roller)

The charging roller 2 in this embodiment will be described. The charging roller 2 includes a core metal as an electroconductive supporting member, a 2 mm-thick elastic layer provided on an outer periphery thereof, and a 25 mm-thick resin layer as a surface layer provided on an outer periphery of the elastic layer. A surface of the surface layer is a surface contacting the photosensitive drum 1 and causing electric discharge on the photosensitive drum 1.

The elastic layer is formed of an electron-conductive rubber material. The electron-conductive rubber material is, for example, a material in which carbon black is dispersed as electroconductive particles (electron-conductive agent) in a binder polymer which itself does not assume electroconductivity and in which an electric resistance is adjusted. As the binder polymer, a known binder polymer used in the electroconductive elastic layer of the charging roller for the electrophotographic apparatus can be used. For example, a hydrin rubber, a butadiene rubber, and the like are cited. In this embodiment, the hydrin rubber was selected.

A kind of the carbon black mixed in the elastic layer is not particularly limited so long as the carbon black is electroconductive carbon black capable of imparting electroconductivity to the elastic layer. Further, to the elastic layer, as a compounding agent, general-purpose agents such as a filler, a processing aid, a cross-linking aid, a cross-linking retardant, a softening agent, a dispersing agent, a colorant, and the like may be added as desired.

As a resin of the surface layer of the charging roller 2, a resin material positioned on the non-normal polarity side (upper rank) relative to the main component (binder resin) of the toner T in the charging series. For example, the surface layer is formed by coating the outer periphery of the elastic layer with a resin material, for example, polycarbonate urethane, possessing electroconductivity. The residual toner can be triboelectrically charged to the normal polarity in the charging portion P2 by forming the third layers of the charging roller 2 and the photosensitive drum 1 with the above-described materials and by setting the peripheral speed difference between the charging roller 2 and the photosensitive drum 1 as described above.

Further, to the surface layer of the charging roller 2, roughening particles with a polarity such that triboelectrically chargeability is not impaired can be added. For example, there is also a method in which polycarbonate urethane resin similar to the polycarbonate urethane resin of the surface layer is formed in particles and in which the particles are dispersed. That is, the charging roller 2 is not required to closely contact the surface of the photosensitive drum 1 in the charging portion P2, so that a constitution in which the charging roller 2 contacts the surface of the photosensitive drum 1 in a mountain portion of unevenness formed by the roughening particles can be employed.

(Transfer Roller)

The transfer roller 5 is a roller-type transfer member disposed opposed to the photosensitive drum 1. The transfer roller 5 is pressed against the photosensitive drum 1 at a predetermined pressure. The transfer roller 5 of this embodiment is an elastic roller of 12 mm in outer diameter, in which a sponge rubber of an electroconductive nitrile-butadiene hydrin rubber type is formed around a core metal.

(Contact Condition of Brush Member)

In this embodiment, the brush member 11 imparts the electric charge to the residual toner through the triboelectric charge while scattering the residual toner on the photosensitive drum 1. At this time, in order to impart the negative electric charge to the residual toner through the triboelectric charge, as the material of the bristle material (electroconductive threads 11*a*) of the brush member 11, a material positioned on the positive polarity side (upper rank) relative to the main component of the toner T in the charging series is used. Further, a contact pressure between the brush member 11 and the photosensitive drum 1 in the brush contact portion is ensured so that the electroconductive threads 11*a* rub the residual toner with a sufficient force.

As regards the charging series, the main charge of the toner T in this embodiment is the styrene-acrylic resin. The bristle material of the brush member 11 may desirably be a material, such as nylon or rayon, relative to which the styrene-acrylic resin is positioned on the negative polarity side (lower rank) and a difference in charging series therebetween is large. In this embodiment, the nylon resin was selected as the main component of the electroconductive threads 11*a* as described above. Polyester fibers and acrylic fibers are not desired as the material of the electroconductive threads 11*a* since the styrene-acrylic resin is positioned the positive polarity side relative thereto in the charging series and the difference in charging series is also small. However, in the case where the main component of the toner T is different, the polyester fibers or the acrylic fibers can be used as the material of the electroconductive threads 11*a* in some instances.

Incidentally, the surface layer of the photosensitive drum 1 is capable of having the influence on the triboelectric charge of the toner T in the brush contact portion. For that reason, the main component of the surface layer of the photosensitive drum 1 may preferably be a material which is positioned on the positive polarity side relative to the main component of the toner T in the charging series. In this embodiment, as described above, the main component of the surface layer of the photosensitive drum 1 is the polycarbonate resin.

A contact condition of the brush member 11 in the brush contact portion will be further described. In order to study physical properties (parameters) showing the contact condition of the brush member 11, samples 1 to 4 of 4 levels different in thickness and density of the bristle material of the brush member 11 were prepared. The sample 1 is a brush member 11 of which bristle material is thick and is low in density. The sample 2 is a brush member 11 of which bristle material is thin and at a medium level in density. The sample 3 is a brush member 11 of which bristle material is thin and is high in density. The sample 4 is a brush member 11 of which bristle material is at a medium level in thickness and is low in density. Then, the brush member 11 of each of the samples was contacted to the photosensitive drum 1, and then a peak pressure and a maximum contact area ratio in the brush contact portion were calculated in the following methods. Incidentally, the peak pressure is a maximum value of an average contact pressure in a region of a width of 1 mm of the brush contact portion with respect to the short direction, and the maximum contact area ratio is a contact area ratio between the brush member 11 and the photosensitive drum 1 in the region of the width of 1 mm in which the peak pressure is obtained.

A calculating method of the peak pressure is as follows. As shown in part (a) of FIG. 24, with use of a compression test jig for a compact table-top tester ("EZTest" manufactured by Shimadzu Corporation), normal reaction when a pressing plate 71 was pressed into the brush member 11 while adjusting a flow or bristles (fibers) of the brush member 11 placed horizontally was measured and then a relationship between the penetration amount and the normal reaction was obtained. On the other hand, as shown in part (b) of FIG. 24, a glass plate 72 was press-contacted to the brush member 11 so as to uniformize the flow of the bristles of the brush member 11 while moving the glass plate in a horizontal direction D, and a contact width 73 of the brush member 11 with respect to the short direction SD was measured by observation of the brush contact portion through a microscope from a side opposite from the glass plate 72. The horizontal direction D is one side of the short direction SD corresponding to the rotational direction R1 of the photosensitive drum 1.

In the case where the brush member 11 is prepared so that the density and the thickness of the bristle material thereof are uniform, the peak pressure can be calculated by the above-described (formula 1) to (formula 3). First, in a state in which an object is press-contacted to the brush member 11 with a predetermined penetration amount, an average (average pressure) of the contact pressure in the brush contact portion can be represented by the (formula 1). In the (formula 1), the normal reaction and the contact width are values measured in a state in which the pressing plate 71 or the glass plate 72 is press-contacted to the brush member 11 with the predetermined penetration amount.

In an actual brush contact portion between the brush member 11 and the photosensitive drum 1, the contact pressure becomes material in a portion where the penetration amount of the brush member 11 into the photosensitive drum 1 is largest. A maximum value of this contact pressure is referred to as the peak pressure. The peak pressure is calculated by the (formula 3) with use of the average penetration amount (formula 2) obtained from a material penetration amount and a minimum penetration amount of the brush member 11.

The above-described calculating method means in actuality that the contact pressure applied to the surface of the photosensitive drum 1 drawing an arc as shown in FIG. 6 is linearly approximated. Specifically, it is assumed that the brush member 11 of 4 mm in short(-side) width L3 is contacted to the photosensitive drum 1 of 24 mm in diameter from immediately above the photosensitive drum 1 so that the penetration amount becomes 1.2 mm in a center portion with respect to the short direction SD. In this case, the maximum penetration amount is 1.2 mm, the minimum penetration amount is 1.03 mm, and the average penetration amount is 1.115 mm, so that the peak pressure can be calculated using the (formula 3).

Incidentally, in the case where the density, the thickness, and the like of the brush member 11 are not set uniformly with respect to the short direction SD, the brush member 11 is cut for each unit length (for example, 1 mm) thereof with respect to the short direction SD, and then normal is measured, so that a contact pressure in each unit length region (range) is obtained. Then, an average of acquired values of the contact pressure is taken as an average pressure, and a maximum value is taken as a peak pressure.

In order to calculate the discrimination was made by a color tint between a portion (contact portion) where the bristle material of the brush member 11 contacts a glass plate and a portion (non-contact portion) where the bristle material of the brush member 11 does not contact the glass plate when the brush member 11 is contacted to a glass plate g as shown in FIG. 25. Part (a) of FIG. 7 is an actual photograph observed through a microscope, and part (b) of FIG. 7 is an image obtained by subjecting the photograph of part (a) of FIG. 7 to binarization so that the contact portion becomes white and the non-contact portion becomes black. The contact area ratio is a ratio of an area of the contact portion to an area of an observation object. In general, with respect to the short direction SD, in a position where the peak pressure is obtained, the contact area ratio becomes maximum (maximum contact area ratio).

In summary, as regards the image forming apparatus including the brush member 11 as in this embodiment, the peak pressure and the maximum contact area ratio can be checked in the following procedure.

1) The outer diameter of the photosensitive drum 1, the bristle height L1 and the short width L3, and the longitudinal width L4 of the brush member 11, and the shortest distance L2 from the base cloth 11*b* of the brush member 11 to the surface of the photosensitive drum 1 are measured, and the maximum penetration amount (L1-L2) is calculated (see, parts (b) and (c) of FIG. 20).
2) From the outer diameter of the photosensitive drum 1, the short width L3 and the maximum penetration amount of the brush member 11 which are measured in the above-described 1), the minimum penetration amount is calculated on the basis of a geometrical relationship of FIG. 6.
3) From the maximum penetration amount and the minimum penetration amount which are acquired by the above-described 1) and 2), the average penetration amount is calculated on the basis of the (formula 2).
4) A compression test of the brush member 11 is conducted by a method of parts (a) and (b) of FIG. 24 with use of the average penetration amount calculated in the above-described 3), so that the average pressure is acquired on the basis of the (formula 1).
5) By using the maximum penetration amount, the average penetration amount, and the average pressure which are acquired by the above-described 1), 3), and 4), the peak pressure is calculated on the basis of the (formula 3).
6) In the maximum penetration amount acquired in the above-described 1), the brush member 11 is press-contacted to the glass plate by the method of FIG. 25, and then the contact surface is observed, so that the maximum contact area ratio is calculated.

Further, in order that the peak pressure and the maximum contact area ratio of the brush member 11 are mode desired values, parameters such as the outer diameter of the photosensitive drum 1, the bristle height L1 and the short width L3 of the brush member 11, and the above-described shortest distance L2 are appropriately changed, so that the peak pressure and the maximum contact area ratio may only be required to be checked in the above-described procedure.

A graph in which in the above-described method, for each of the samples, the peak pressure and the maximum contact area ratio are calculated in a plurality of different conditions and in which values of the peak pressure are plotted on the ordinate and values of the maximum contact area ratio are plotted on the abscissa is FIG. 1. In FIG. 1, points indicated by black marks represent that image defect did not occur, and points indicated by white marks represent that the image defect occurred.

As shown in FIG. 1, in the case where the peak pressure is less than 0.7 $gf/mm^2$ and the maximum contact area ratio is less than 18%, the image defect occurred. This would be considered because in the case where the peak pressure is excessively low, only a part of the bristle material of the brush member 11 contacts the photosensitive drum 1, and therefore, the action for triboelectric charging the residual toner to the normal polarity becomes in sufficient. Further, it would be considered because also in the case where the maximum contact area ratio is excessively low, as a result that a frequency of contact of the toner particles with the bristle material of the brush member becomes low, the action for triboelectrically charging the residual toner to the normal polarity becomes insufficient. In either case, when the residual toner reaches the charging portion P2 without being sufficiently supplied with the electric charges of the positive polarity in the brush contact portion, the residual toner charged to the non-normal polarity or the residual toner of which charge amount is close to zero is deposited on the charging roller 2, so that contamination of the charging roller 2 progresses. x Further, in the case where the peak pressure is higher than 3.5 gf/mm$^2$ and in the case where the maximum contact area ratio is higher than 74%, the image defect occurred. This would be considered because in either case of the excessively high peak pressure and the excessively high maximum contact area ratio, a part of the brush contact portion is in a state in which the residual toner cannot pass through the pair of the brush contact portion and thus the residual toner concentratedly pass through a portion (portion where the contact pressure or the density of the bristle material is relatively low through which the residual toner is capable of passing. In this case, the surface of the photosensitive drum 1 passed through the brush contact portion is in a state in which the residual toner is deposited in a stripe shape (linear shape extending in the rotational direction), so that the charging roller 2 is contaminated with the residual toner in the stripe shape. Incidentally, in a region where the peak pressure or the maximum contact area ratio is particularly high, the residual toner is blocked by the brush member 11, so that there is a possibility that not only collection of the residual toner by the developing roller 41 is obstructed but also the blocked toner is scattered and an inside of the image forming apparatus is contaminated with the scattered toner.

Accordingly, it is desired that the brush member 11 is constituted so that the peak pressure and the maximum contact area ratio in the brush contact portion fall within the following region enclosed by a broken line of FIG. 1.

(peak pressure): 0.7 gf/mm$^2$ or more and 3.5 gf/mm$^2$ or less (maximum contact area ratio): 18% or more and 74% or less By this, in the cleaner-less brush type in which the residual toner deposited on the surface of the photosensitive drum 1 passed through the transfer portion P5 is scattered by the brush member 11, an electric charge distribution of the residual toner can be stabilized by the normal polarity. In other words, the electric charge distribution of the residual toner after passing through the brush contact portion can be made a distribution which has a peak on the normal polarity side (negative polarity side) of the toner T and which is sharp compared with the electric charge distribution of the residual toner before entering the brush contact portion.

Incidentally, in the region enclosed by the broken line, the above-described image defect does not readily occur in a central portion than in a peripheral portion. For that reason, it is preferable that the brush member 11 is constituted so that the peak pressure and/or the maximum contact area ratio further falls within the following ranges.

(peak pressure): 1.4 gf/mm$^2$ or more and 2.8 gf/mm$^2$ or less (maximum contact area ratio): 32% or more and 60% or less Here, 1 gf nearly equals to 9.8×mN (milli-newton), so that "0.7 gf/mm$^2$ or more and 3.5 gf/mm$^2$ or less" can be said as "6.9 mN/mm$^3$ or more and 34 mN/mm$^2$ or less". Similarly, "1.4 gf/mm$^2$ or more and 2.8 gf/mm$^2$ or less" can be said as "14 mN/mm$^2$ or more and 28 mN/mm$^2$ or less".

Further, in this embodiment, as an index indicating whether or not the brush member 11 uniformly contacts the photosensitive drum 1, Clark-Evans index is introduced. The Clark-Evans index represents a tendency as to whether in the case where a plurality of points are distributed in a certain flat surface region, the points are distributed locally and concentratedly or are distributed with a distance mutually.

A calculating method of the Clark-Evans index will be described. First, when a distance from a point i to a nearest adjacent point is di and the number of the points is n, an average value (average nearest adjacent distance) W of distances from each of points to an associated nearest adjacent point is represented by the above-described formula (numerical formula 1).

Here, as an evaluation criterion, the case where the points are randomly distributed on a flat surface with an area S (in accordance with uniform Poisson distribution) will be considered. In this case, an expected value E (W) of the average nearest adjacent distance W is represented by the above-described formula (numerical formula 2).

In order to compare the cases where the numbers of the points and densities are different from each other, a value w obtained by standardizing the average nearest adjacent distance W with the expected value E (W) as represented by the above-described formula (numerical formula 3) is referred to as the Clark-Evans index.

In order to acquire the Clark-Evans index of the brush member 11, as shown in part (a) of FIG. 23, the brush member 11 is pressed against the glass plate surface, and the brush contact portion is observed through the glass plate surface from a side opposite from the side where the brush member 11 is pressed against the glass plate surface. In the brush contact portion, when the free ends of the bristle material in a certain area (100 mm$^2$) are represented by points, a distribution of the points as shown in part (b) of FIG. 23 is obtained. From this distribution of the points, the Clark-Evans index is calculated using the above-described formulas (numerical formulas 1 to 3).

Incidentally, a part of the bristle material contacts the glass (plate) surface even at a portion closer to a base than the free ends are. The action by which the toner T is triboelectrically charged by such a bristle material would be considered that contribution of a portion (most pressing point) where the bristle material most strongly contacts the glass surface is large. However, the distribution of the most pressing point of the bristle material is mostly common to a distribution of the free ends of the bristle material, and property as the distribution is substantially unchanged. For that reason, in this embodiment, the Clark-Evans index is calculated from the free end distribution of each bristle material contacting the glass surface.

As regards the Clark-Evans index, w=1 holds in the case of a random distribution, w<1 holds in the case of concentrated distribution, and w>1 holds in the case of regular distribution. An extreme example of the regular distribution is a lattice-shaped distribution over an entire area of an observation object. An extreme example of the concentrated distribution is a distribution such that the points are concentrated at a single portion or several portions in the area of the observation object.

A result of acquisition of the Clark-Evans index for actual samples of the brush member 11 is as follows.

Sample 1: w=1.01

Sample 2: w=1.13

Sample 3: w=1.15

Sample 4: w=1.07

Sample obtained by intentionally twisting sample 2 in bundle: w=0.7

From a property of the Clark-Evans index, when w>1 holds, it can be said that the free ends of the bristle materials of the brush member 11 are loosened without making a bundle. On the other hand, when w<1 holds, it is suggested that the bristle materials of the brush member 11 makes the bundle (aggregation, lump) due to some cause.

In order to cause the brush member to normally function, it is preferable that the bristle materials of the brush member 11 contact the surface of the photosensitive drum 1 in a loosened state without making the bundle. In this embodiment, the brush member 11 is constituted so that the Clark-Evans index is 1 or more (w≥1). This condition can be said as a condition for ensuring that the bristle materials do not make the bundle due to some cause.

Incidentally, depending on the constitution of the brush member 11, it would be also considered that even in the brush contact portion, a value of the Clark-Evans index is different place by place. In that case, the Clark-Evans index at a portion (place where the contact pressure is the peak pressure) where the penetration amount of the brush member 11 is largest is 1 or more. This is because at the portion where the penetration amount is largest, the bundle of the bristle materials is liable to be formed by a force received by the bristle materials.

(Arrangement of Brush Member)

Next, arrangement of the brush member 11 relative to the photosensitive drum 1 will be described. In this embodiment, the brush member 11 is disposed in the inclined state so that a contact pressure of the brush member 11 to the photosensitive drum 1 is higher on a brush leading end (brush front end) side than on a brush trailing end (voltage rear end) side. Here, the "brush leading end" refers to an end portion of the brush member 11 on an upstream side with respect to the rotational direction R1 of the photosensitive drum 1, and the "brush trailing end" refers to an end portion of the brush member 11 on a downstream side with respect to the rotational direction R1 of the photosensitive drum 1.

In the following, the arrangement of the brush member 11 will be specifically described using FIG. 18. FIG. 18 is a schematic view for illustrating the arrangement of the brush member 11 relative to the photosensitive drum 1. FIG. 18 shows a state in which the brush member 11 and the photosensitive drum 1 are viewed in the rotational axis direction (the longitudinal direction LD of the brush member 11) of the photosensitive drum 1. Incidentally, the bristle materials (electroconductive threads 11*a*) of the brush member 11 are shown virtually in a state (single body state) in which the bristle materials extend without interfering with the photosensitive drum 1.

In FIG. 18, the rotational axis of the photosensitive drum 1 is represented by "O". A rectilinear line (first rectilinear line) extending from the rotational axis O through a center position of the base cloth 11*b* of the brush member 11 with respect to the short direction SD is represented by "m". A rectilinear line perpendicular to the rectilinear line m is represented by "Lt". The rectilinear line Lt is a rectilinear line parallel to a tangential line t of the surface of the photosensitive drum 1 in an intersection point p between the rectilinear line m and the surface of the photosensitive drum 1. Further, a rectilinear line (third rectilinear line extending in the short direction SD) drawn along the base cloth 11*b* is represented by "n".

At this time, in this embodiment, the brush member 11 is disposed so that the rectilinear line n drawn along the base cloth 11*b* is inclined relative to the rectilinear line Lt, extending in a tangential direction of the surface of the photosensitive drum 1, with respect to a direction in which the base cloth 11*b* approaches the surface of the photosensitive drum 1 toward the upstream side of the rotational direction R1 of the photosensitive drum 1.

An angle β (°) between the rectilinear line n and the rectilinear line Lt represents an inclination angle of the brush member 11. The inclination angle may suitably set in a range of, for example, 8° or more and 16° or less. When is excessively large, a difference in penetration amount between the brush leading end and the brush trailing end becomes large, and therefore, there is a possibility that the penetration amount becomes excessive in the brush leading end and thus the toner is blocked and that the brush penetration amount becomes negative (non-contact). When β is excessively small, as described in the following, it becomes difficult to provide a proper difference in contact pressure and contact area ratio between the brush leading end and the brush trailing end.

In the example of this embodiment, β=12° was set. In this case, the penetration amount of the brush member 11 into the photosensitive drum 1 becomes maximum in the brush leading end, and a value thereof (maximum penetration amount) is 1.58 mm.

As described above, the brush member 11 is disposed in the inclined state, whereby the contact pressure and the contact area ratio in the brush leading end are higher than the contact pressure and the contact area ratio in the brush trailing end, respectively. That is, of the brush contact portion (contact portion between the brush member and the image bearing member), in a first position, the contact pressure is higher than the contact pressure in a second position downstream of the first position with respect to the rotational direction R1 of the image bearing member. Further, the contact area ratio between the brush member and the image bearing member in the first position is higher than the contact area ratio between the brush member and the image bearing member in the second position.

In the example of this embodiment, the contact pressure in the brush leading end is 2 gf/mm$^2$, and the contact pressure in the brush trailing end is 1 gf/mm$^2$. Further, the contact area ratio is 50% in the brush leading end and is 20% in the brush trailing end. In this embodiment, a relationship between a short direction position and the contact pressure of the brush member 11 is shown in part (a) of FIG. 26, a relationship between the short direction position and the contact area ratio of the brush member 11 is shown in part (b) of FIG. 26, and a relationship between the contact pressure and the contact area ratio is shown in part (c) of FIG. 26. Here, the short direction position of the brush member 11 is a position with respect to the short direction SD in which the brush leading end is taken as a basis (0).

The example shown in part (a) and (b) of FIG. 26 is an example of a constitution in which the contact pressure and the contact area ratio in the first position on the brush leading end side are higher than the contact pressure and the contact area ratio in the second position on the brush trailing end side than the first position is, curves drawn to represent the contact pressure and the contact area ratio may be different. As in this example, it is preferable that the contact pressure and the contact area ratio become maximum in the brush leading end. Further, it is preferable that the contact pressure and the contact area ratio monotonously decrease from the brush leading end toward the brush trailing end, but the contact pressure and the contact area ratio at least in the brush leading end may only be required to be higher than the contact pressure and the contact area ratio in the brush trailing end.

It is preferable that a difference between the contact pressure (maximum value) in the brush leading end and the contact pressure (maximum value) in the brush trailing end is 0.6 $gf/mm^2$ or more and 1.5 $gf/mm^2$ or less.

Further, it is preferable that a difference between the contact area ratio (maximum value) in the brush leading end and the contact area ratio (maximum value) in the brush trailing end is 15% or more and 40% or less.

Further, in this embodiment as specifically described later, a penetration amount δ1 (mm) of the brush leading end into the photosensitive drum 1 and a penetration amount δ2 (mm) of the brush trailing end into the photosensitive drum 1 satisfy a relationship of: δ1>δ2>70.

(Brush Application Bias)

Further, to the brush member 11, the brush power source E11 (FIG. 20) as the voltage applying means is connected. During the image formation, to the brush member 11, a predetermined voltage (brush bias) is applied by the brush power source E11. In this embodiment, during the image formation, to the brush member 11, a DC voltage of the negative polarity is applied as the brush voltage. In this embodiment, the brush voltage during the image formation is −350. On the other hand, the surface potential in a surface region of the photosensitive drum 1 passing through the transfer portion P5 and moving toward the brush contact portion is 0 to −200 V. Accordingly, the brush voltage is set so that in the brush contact portion, the surface of the photosensitive drum 1 is on the normal polarity side of the toner and the brush member 11 is on the non-normal polarity side of the toner. By such a brush voltage setting, the toner charged to the normal polarity is attracted to the photosensitive drum 1 side, and the toner charged to the non-normal polarity is attracted to the brush member 11 side.

(Behavior of Toner in Brush Contact Portion)

The toner which is not transferred from the photosensitive drum 1 onto the sheet by the transfer roller 5 is sent to the brush contact portion by rotation of the photosensitive drum 1. At this time, when the contact pressure of the brush contact portion is high, the toner particles are easily rolled by being rubbed with the brush member 11 and the surface of the photosensitive drum 1, so that the electric charge of the normal polarity is easily imparted to the residual toner.

However, when the contact pressure is excessively high, in the brush contact portion, at a place where the contact pressure is higher than the contact pressure at a peripheral portion or at a place where the density of the bristle material is higher than the density of the bristle material at a peripheral portion, most of the toner cannot pass through the place, while the toner concentratedly passes through a place where the contact pressure or the density is low. As a result, as shown in part (a) of FIG. 27, a state in which the toner T passed through the brush contact portion is distributed in a stripe shape is formed. Part (a) of FIG. 27 shows the state in which a periphery of the brush member 11 is viewed from an outer periphery side of the photosensitive drum 1, in which the residual toner is represented by a gray portion (dot pattern), and a region where the residual toner is not deposited is represented by a non-tinted (color-free) portion.

The state in which the toner T passed through the brush contact portion is distributed in the stripe shape will be described using part (b) of FIG. 27. Part (b) of FIG. 27 is a schematic view showing a cross section, of the surface of the photosensitive drum 1 passed through the brush contact portion, cut along the longitudinal direction. In the toner T passed through the brush contact portion, the toner particles of the non-normal polarity (+) are contained. In addition, in a status in which the toner T passes through the brush contact portion in the stripe shape, at a place through which the toner T passes, there is a tendency that the brush member 11 does not contact a part of the toner particles and an amount of the toner particles passing through the brush contact portion while being kept in the non-normal polarity without being triboelectrically charged by the brush member 11 becomes large.

In the charging portion P2, to the charging roller 2, a charging voltage of the same polarity as the normal polarity of the toner T is applied. For that reason, as shown in part (c) of FIG. 27, the toner T of the normal polarity is pressed against the surface of the photosensitive drum 1 and passes through the charging portion P2 without being deposited on the charging roller 2. On the other hand, for the above-described reason, when the toner of the non-normal polarity reaches the charging portion P2, the toner T is attracted to and deposited on the charging roller 2 by the charging voltage. When the toner deposited on the charging roller 2 is accumulated, there is a possibility that image defect due to improper charging occurs. For that reason, the toner passed through the brush member 11 in the stripe shape as described above causes stripe-shaped contamination of the charging roller 2 with the toner, and appears as a stripe-shaped image defect due to the improper charging finally appearing in a certain position of the image with respect to a main scan direction.

On the other hand, in this embodiment, the constitution in which the contact pressure and the contact area ratio on the brush leading end side of the brush contact portion are higher than the contact pressure and the contact area ratio on the brush trailing end side of the brush contact portion was employed. By this, it is possible to prevent the toner T to pass through the brush member (to uniformly scatter the toner T) while imparting the electric charge of the normal polarity to the toner T. This will be described.

Parts (a) of FIG. 28 is a conceptual diagram showing a contact state of the brush member 11 to the photosensitive drum 1 in this embodiment. Part (b) of FIG. 28 is a sectional view of the surface of the photosensitive drum 1 in the brush leading end portion along the longitudinal direction of the photosensitive drum 1. Part (c) of FIG. 28 is a sectional view of the surface of the photosensitive drum 1 in a brush central portion alone the longitudinal direction of the photosensitive drum 1. Part (d) of FIG. 28 is a sectional view of the surface of the photosensitive drum 1 in the brush trailing end side along the photosensitive drum 1.

As shown in part (a) of FIG. 28, the contact pressure and the contact area ratio in the brush leading end side are high, and therefore, many toner particles are rolled in the brush leading end portion, so that the electric charges of the normal polarity are imparted to the toner particles by the triboelectric charge. However, the toner during passing through the brush leading end portion concentrates at a part of a portion with respect to the longitudinal direction.

Thereafter, by the rotation of the photosensitive drum 1, as shown in parts (b) and (c) of FIG. 28, with movement of the toner through the brush contact portion toward the brush trailing end side, the bristle materials of the brush member 11 randomly contact the toner. Further, the contact pressure and the contact area ratio lower toward the brush trailing end side, and therefore, the toner T easily moves freely in the longitudinal direction. Concentration of the toner T is alleviated, and the bristle materials of the brush member 11 uniformly contact the toner T, so that the polarity of the toner T in a large amount can be changed to the normal polarity. Further, the brush voltage is applied to the brush member 11, so that a part of the toner T of the non-normal polarity is attracted to the brush member 11.

Thus, according to the constitution, of this embodiment, while imparting the electric charge of the normal polarity to the toner T by the brush member 11, the toner T is prevented from passing through the brush member 11 in the stripe shape and is uniformly scattered, so that an occurrence of the improper charging can be suppressed over a long term.

(Verification Experiment)

In order to verify that the improper charging can be prevented by the constitution of this embodiment, an experiment for checking whether or not the improper charging occurs in a plurality of constitution examples different in constitution of the brush member 11 and contact condition with the photosensitive drum 1 was conducted. A table 1 appearing thereinafter shows a principal contact condition and the occurrence or non-occurrence of the improper charging in each of the constitution examples, and a table 2 appearing hereinafter shows detailed constitutions of each of the constitution examples.

The constitution described as the example of this embodiment is a constitution example 1-1.

In a constitution example 1-2, the contact pressure and the contact area ratio is made substantially constant from the brush leading end side toward the brush trailing end side.

In a constitution example 1-3, the contact pressure and the contact area ratio decrease from the brush leading end side toward the brush trailing end side in a degree similar to the degree in the constitution example 1-1, and compared with the constitution example 1-1, the bristle material of the brush member 11 is thick and is low in density.

In a constitution example 1-4, the contact pressure and the contact area ratio decrease from the between side toward the brush trailing end side in a degree similar to the degree in the constitution example 1-1, and compared with the constitution example 1-1, the bristle material of the brush member 11 is high in density.

In a constitution example 1-5, the contact pressure and the contact area ratio decrease from the brush leading end side toward the brush trailing end side in a degree similar to the degree of the constitution example 1-1, and compared with the constitution example 1-1, the short width of the brush member 11 is narrow.

In a constitution example 1-6, the contact pressure and the contact area ratio decrease from the brush leading end side toward the brush trailing end side, but compared with the constitution example 1-1, change amounts of the contact pressure and the contact area ratio are small.

In a constitution example 1-7, the contact pressure and the contact area ratio decrease from the brush leading end side toward the brush trailing end side in a degree similar to the degree of the constitution example 1-1, and the short width of the brush member 11 is an intermediary value between the short widths in the constitution examples 1-1 and 1-5.

In a constitution example 1-8, the contact pressure and the contact area ratio decrease from the brush leading end side toward the brush trailing end side and a change amount thereof is an intermediary value between the change amounts in the constitution examples 1-1 and 1-6.

An experimental environment is a low-temperature and low-humidity environment (15° C./10% RH). In the experiment, an operation in which images each with a print ratio (coating ratio, image ratio) of 3% were intermittently outputted on two sheets was repeated and the images were outputted on 10000 sheets, and then a solid white sample image was outputted. At that time, whether or not a black spot (dot-like image defect occurred was checked. In the table 1, the case where a black spot is observed is represented by that the improper charging occurred ("YES"), and the case where the black spot is not observed is represented by the improper charging did not occur ("NO"). Incidentally, the change amount of the contact pressure is a difference between the contact pressure in the brush leading end and the contact pressure in the brush trailing end.

The change amount of the contact area ratio is a difference between the contact area ratio in the brush leading end and the contact area ratio in the brush trailing end. Further, constitutions which are not specifically mentioned in the constitution examples ("CNS. EXS.") 1-2 to 1-8 are common to the constitution example ("CNS. EX.") 1-1.

TABLE 1

| CNS. EX. | PP*1 ($gf/mm^2$) | MCAR*2 (%) | CPCA*3 ($gf/mm^2$) | CARCA*4 (%) | SW*5 (mm) | IC*6 |
|---|---|---|---|---|---|---|
| 1-1 | 2 | 50 | 1 | 30 | 4 | NO |
| 1-2 | 2 | 50 | 0 | 0 | 4 | YES |
| 1-3 | 4 | 20 | 1 | 30 | 4 | YES |
| 1-4 | 2 | 70 | 1 | 30 | 4 | YES |
| 1-5 | 2 | 50 | 1 | 30 | 2 | YES |
| 1-6 | 2 | 50 | 0.3 | 10 | 4 | YES |
| 1-7 | 2 | 50 | 1 | 30 | 3 | NO |
| 1-8 | 2 | 50 | 0.6 | 18 | 4 | NO |

*1"PP" is the peak pressure.
*2"MCAR" is the maximum contact area ratio.
*3"CPCA" is the contact pressure change amount.
*4"CARCA" is the contact area ratio change amount.
*5"SW" is the short width.
*6"IC" is the improper charging.

TABLE 2

| | | | | PENETRATION AMOUNT | | | | |
|---|---|---|---|---|---|---|---|---|
| CNS. EX. | BT*1 (denier) | D*2 ($inch^2$) | SW*3 (mm) | MAX*4 (mm) | BLE*5 (mm) | MIN*6 (mm) | BTE*7 (mm) | CW*8 (mm) |
| 1-1 | 2 | 240 | 4 | 1.58 | 1.58 | 0.43 | 0.43 | 1.15 |
| 1-2 | 2 | 240 | 4 | 1.2 | 1.2 | 1.03 | 1.2 | 0.17 |
| 1-3 | 6 | 180 | 4 | 1.58 | 1.58 | 0.43 | 0.43 | 1.15 |
| 1-4 | 2 | 400 | 4 | 1.58 | 1.58 | 0.43 | 0.43 | 1.15 |
| 1-5 | 2 | 240 | 2 | 1.58 | 1.58 | 0.43 | 0.43 | 1.15 |
| 1-6 | 2 | 240 | 4 | 1.2 | 1.15 | 0.98 | 0.98 | 0.22 |
| 1-7 | 2 | 240 | 3 | 1.58 | 1.58 | 0.53 | 0.53 | 1.05 |
| 1-8 | 2 | 240 | 4 | 1.42 | 1.42 | 0.61 | 0.61 | 1.81 |

*1"BT" is the brush thickness.
*2"D" is the density.
*3"SW" is the short width.
*4"MAX" is the maximum penetration amount.
*5"BLE" is the brush leading end penetration amount.
*6"MIN" is the minimum penetration amount.
*7"BTE" is the brush trailing end penetration amount.
*8"CW" is the penetration amount change width.

As shown in the table 1, in the constitution examples 1-1, 1-7, and 1-8, the black did not occur, so that it was confirmed that improper charging can be prevented. On the other hand, in the constitution examples 1-2 to 1-6, the improper charging occurred.

The reason that the improper charging occurred in the constitution example 1-2 in which the contact pressure and the contact pressure and the contact area ratio does not decrease from the brush leading end toward the brush trailing end would be considered because the contact pressure and the contact area ratio are high even on the brush trailing end side and therefore the toner passes through the brush contact portion in the stripe shape. From this, it is understood that as in the constitution example 1-1, the constitution in which the contact pressure and the contact area ratio decrease from the brush leading end toward the brush trailing end is effective in prevention of the occurrence of the improper charging.

Further, the improper charging occurred in the constitution example 1-6 in which the change amounts of the contact pressure and the contact area ratio are small, and the improper charging did not occur in the constitution example 1-8 in which the change amounts of the contact pressure and the contact area ratio are larger than those in the constitution example 1-6 and smaller than those in the constitution example 1-1. From this, it is understood that the larger change amounts of the contact pressure and the contact area ratio are capable of effectively suppressing the occurrence of the improper charging. Specifically, it is preferable that the change amount of the contact pressure is 0.6 gf/mm$^2$ or more, and the change amount of the contact area ratio is 15% or more (preferably 18% or more in the constitution example 1-8), further preferably 1.0 gf/mm$^2$ or more and 30% or more, respectively. However, a timing when the improper charging occurred in the constitution example 1-6 is later than the timing in the constitution example 1-2 in which the contact pressure and the contact area ratio does not decrease, so that depending on a specific constitution (for example, lifetime setting of the charging roller 2) of the image forming apparatus, the occurrence of the improper charging can be suppressed even in the constitution example 1-6 in some cases.

Specifically, a difference between the constitution example 1-2 and the constitution example 1-6 will be described. The penetration amounts of the brush upstream end and the brush downstream end are the same in the constitution example 1-2, whereas the penetration amount of the brush upstream end is larger than the penetration amount of the brush downstream end in the constitution example 1-6. For that reason, in the constitution example 1-6, the contact pressure and the contact area ratio in the upstream end of the brush contact portion are higher than the contact pressure and the contact area ratio at least in the downstream end of the brush contact portion. Accordingly, a timing when the improper charging occurs in the constitution example 1-6 is later than the timing in the constitution example 1-2 in which the contact pressure and the contact area ratio do not decrease, and therefore, it can be said that in the constitution example 1-6, there is a certain effect in suppression of the improper charging. However, from the table 2, in both the constitution example 1-2 and the constitution example 1-6, the maximum penetration amount is obtained in the neighborhood of a central portion, not at the brush upstream end, so that a toner scattering effect from the brush upstream end toward the brush trailing end is not sufficiently obtained in some cases.

The reason why the improper charging occurred in the constitution example 1-5 is because the brush member 11 extremely short in short width cannot sufficiently scatter, the toner on the brush trailing end side. On the other hand, the improper charging did not occur in the constitution example 1-7 in which the short width of the brush member 11 is 3 mm. Accordingly, it is understood that the short width of the brush member 11 may preferably be 3 mm or more.

The reason why the improper charging occurred in the constitution example 1-3 would be considered that a minimum value (contact pressure of the brush trailing end portion) of the contact pressure of the brush member 11 is excessively high, and therefore, the toner passed through the brush member 11 in the stripe shape. For that reason, the brush trailing end contact pressure may preferably be 1.5 gf/mm$^2$ or less (more preferably be 1.4 gf/mm$^2$ or less) in the constitution example 1-8).

The reason why the improper charging occurred in the constitution example 1-4 would be considered that the contact area ratio in the brush trailing end portion is excessively high, and therefore, the toner passes through the brush member 11 in the stripe shape. For that reason, it is preferable that the contact area ratio in the brush trailing end portion is made, for example, 40% or less (more preferably be 32% or less in the constitution example 1-8). Further, the density of the bristle material of the brush member 11 may preferably be made 350 kF/inch$^2$ or less as described above.

As described above, in this embodiment, the constitution in which the contact pressure and the contact area ratio on the brush leading end side are higher than the contact pressure and the contact area ratio on the brush trailing end side is employed, so that the occurrence of the improper charging can be suppressed for a long term.

Modified Embodiment

In this embodiment, the brush member 11 with certain bristle height was disposed in the inclined state relative to the tangential direction of the photosensitive drum 1, so that the constitution in which the contact pressure and the contact area ratio are higher on the brush leading end side than on the brush trailing end side was realized. The present invention is not limited thereto, but a constitution, in which the contact pressure and the contact area ratio are decreased by providing, for example, a stepped portion of the bristle height between the brush leading end and the brush trailing end may be employed.

Fifth Embodiment

In a fifth embodiment, a constitution in which a bristle material density of the brush member 11 is different depending on a place in order to make the contact pressure and the contact area ratio higher on the brush leading end side than on the brush trailing end side is employed. In the following, elements represented by the reference numerals or symbols common to the fourth and fifth embodiments substantially the same constitutions and functions as those in the fourth embodiment, and a difference from the fourth embodiment will be principally described.

In the brush member 11 in this embodiment, the bristle material density on the brush leading end side is made higher than the bristle material density on the brush trailing end side. In an example of this embodiment, electroconductive threads 11*a* with a thickness of 2 denier and used as bristle materials and are decreased in density at three levels of 240 kF/inch$^2$, 200 kF/inch$^2$, and 160 kF/inch$^2$ for each 2 mm from the brush leading end side toward the brush trailing end side. The short width of the brush member 11 in this embodiment is 6 mm.

A schematic view in the case where the brush member 11 is observed from the free end side of the bristle materials is shown in each of parts (a) and (b) of FIG. 29. Part (a) of FIG. 29 shows this embodiment, in which the density of the bristle materials (electroconductive threads 11*a*) decreases toward the brush trailing end side (downstream side of the rotational direction R1 of the photosensitive drum 1). On the other hand, in the fourth embodiment shown in part (b) of FIG. 29, the density of the bristle materials (electroconductive threads 11*a*) is constant.

Thus, in this embodiment, a constitution in which the bristle material density in a first position on the brush leading end side is higher than the bristle material density in a second position on the brush trailing end side was employed. This embodiment is an example of a constitution in which the contact pressure and the contact area ratio in the first position on the brush leading end side are higher than the contact pressure and the contact area ratio in the second position on the brush trailing end side.

Also, in this embodiment, the Clark-Evans index w of the brush member 11 may desirably be $w \geq 1$.

In this embodiment, different from the fourth embodiment, there is no need to dispose the brush member 11 in the inclined state relative to the photosensitive drum 1. In the example of this embodiment, $\beta=0$ holds in FIG. 1. In this example, the penetration amount (maximum penetration amount) of the brush member 11 into the photosensitive drum 1 was 1 mm.

In the example of this embodiment, the contact pressure of the brush member 11 to the photosensitive drum 1 is 2 $gf/mm^2$ at the brush leading end and is 1 $gf/mm^2$ at the brush trailing end. Further, the contact area ratio is 50% at the brush leading end and is 20% at the brush leading end.

Also, in this embodiment, the brush voltage may preferably be applied to the brush member 11. The brush voltage is set at −350 V similarly as in the fourth embodiment, for example.

(Verification Experiment)

In order to verify that the improper charging can be prevented by the constitution of this embodiment, an experiment for checking whether or not the improper charging occurs in a plurality of constitution examples different in constitution of the brush member 11 and contact condition with the photosensitive drum 1 was conducted. A table 3 appearing thereinafter shows a is principal contact condition and the occurrence or non-occurrence of the improper charging in each of the constitution examples, and a table 4 appearing hereinafter shows detailed constitutions of each of the constitution examples. The experimental environment, the output image, the sample image, and the evaluation method of the improper charging are common to the fourth and fifth embodiments.

The constitution described as the example of this embodiment is a constitution example 2-1.

In a constitution example 2-2, the contact pressure and the contact area ratio is made substantially constant from the brush leading end side toward the brush trailing end side.

In a constitution example 2-3, the contact pressure and the contact area ratio decrease from the brush leading end side toward the brush trailing end side in a degree similar to the degree in the constitution example 2-1, and compared with the constitution example 2-1, the bristle material of the brush member 11 is thick and is low in density.

In a constitution example 2-4, the contact pressure and the contact area ratio decrease from the between side toward the brush trailing end side in a degree similar to the degree in the constitution example 2-1, and compared with the constitution example 2-1, the bristle material of the brush member 11 is high in density as a whole.

In a constitution example 2-5, the contact pressure and the contact area ratio decrease from the brush leading end side toward the brush trailing end side, but compared with the constitution example 2-1, change amounts of the contact pressure and the contact area ratio are small.

In a constitution example 2-6, the contact pressure and the contact area ratio decrease from the brush leading end side toward the brush trailing end side and a change amount thereof is an intermediary value between the change amounts in the constitution examples 2-1 and 2-5.

TABLE 3

| CNS. EX. | PP*1 ($gf/mm^2$) | MCAR*2 (%) | CPCA*3 ($gf/mm^2$) | CARCA*4 (%) | SW*5 (mm) | IC*6 |
|---|---|---|---|---|---|---|
| 2-1 | 2 | 50 | 1 | 30 | 6 | NO |
| 2-2 | 2 | 50 | 0 | 0 | 6 | YES |
| 2-3 | 4 | 50 | 1 | 30 | 6 | YES |
| 2-4 | 3 | 70 | 1 | 30 | 6 | YES |
| 2-5 | 2 | 50 | 0.3 | 10 | 6 | YES |
| 2-6 | 2 | 50 | 0.6 | 18 | 6 | NO |

*1"PP" is the peak pressure.
*2"MCAR" is the maximum contact area ratio.
*3"CPCA" is the contact pressure change amount.
*4"CARCA" is the contact area ratio change amount.
*5"SW" is the short width.
*6"IC" is the improper charging.

TABLE 4

| | | DENSITY*2 | | PENETRATION AMOUNT | | |
|---|---|---|---|---|---|---|
| CNS. EX. | BT*1 (denier) | (LE/CT/TE) ($kF/inch^2$) | SW*3 (mm) | MAX*4 (mm) | MIN*5 (mm) | CW*6 (mm) |
| 2-1 | 2 | 240/200/160 | 6 | 1 | 0.97 | 0.03 |
| 2-2 | 2 | 240/240/240 | 6 | 1 | 0.97 | 0.03 |
| 2-3 | 6 | 130/110/90 | 6 | 1 | 0.97 | 0.03 |
| 2-4 | 2 | 400/360/320 | 6 | 1 | 0.97 | 0.03 |
| 2-5 | 2 | 240/220/200 | 6 | 1 | 0.97 | 0.03 |
| 2-6 | 2 | 240/210/180 | 6 | 1 | 0.97 | 0.03 |

*1"BT" is the brush thickness.
*2"DENSITY" is measured at the leading end ("LE"), the center ("CT"), and the trailing end ("TE").
*3"SW" is the short width.
*4"MAX" is the maximum penetration amount.
*5"MIN" is the minimum penetration amount.
*6"CW" is the penetration amount change width.

As shown in the table 3, in the constitution examples 2-1 and 2-6, the black did not occur, so that it was confirmed that improper charging can be prevented. On the other hand, in the constitution examples 2-2 to 2-5, the improper charging occurred.

The reason that the improper charging occurred in the constitution example 2-2 in which the contact pressure and the contact pressure and the contact area ratio does not decrease from the brush leading end toward the brush trailing end would be considered because the contact pressure and the contact area ratio are high even on the brush trailing end side and therefore the toner passes through the brush contact portion in the stripe shape. From this, it is understood that as in the constitution example 2-1, the constitution in which the contact pressure and the contact area ratio decrease from the brush leading end toward the brush trailing end is effective in prevention of the occurrence of the improper charging.

Further, the improper charging occurred in the constitution example 2-5 in which the change amounts of the contact pressure and the contact area ratio are small, and the improper charging did not occur in the constitution example 2-6 in which the change amounts of the contact pressure and the contact area ratio are larger than those in the constitution example 2-5 and smaller than those in the constitution example 1-1. From this, it is understood that the larger change amounts of the contact pressure and the contact area ratio are capable of effectively suppressing the occurrence of the improper charging. Specifically, it is preferable that the change amount of the contact pressure is 0.6 gf/mm$^2$ or more, and the change amount of the contact area ratio is 15% or more, and these change amounts are more preferably 1.0 gf/mm$^2$ or more and 30% or more, respectively. However, a timing when the improper charging occurred in the constitution example 2-5 is later than the timing in the constitution example 2-2 in which the contact pressure and the contact area ratio does not decrease, so that depending on a specific constitution (for example, lifetime setting of the charging roller 2) of the image forming apparatus, the occurrence of the improper charging can be suppressed even in the constitution example 2-6 in some cases.

The reason why the improper charging occurred in the constitution example 2-3 would be considered that a minimum value (contact pressure of the brush trailing end portion) of the contact pressure of the brush member 11 is excessively high, and therefore, the toner passed through the brush member 11 in the stripe shape. For that reason, the brush trailing end contact pressure may preferably be 1.5 gf/mm$^2$ or less, for example.

The reason why the improper charging occurred in the constitution example 2-4 would be considered that the contact area ratio in the brush trailing end portion is excessively high, and therefore, the toner passes through the brush member 11 in the stripe shape. For that reason, it is preferable that the contact area ratio in the brush trailing end portion is made, for example, 40% or less. Further, the density of the bristle material in the brush trailing end portion may preferably be made 200 kF/inch$^2$ or less, more preferably be 180 kF/inch$^2$ or less.

As described above, also, by the constitution of this embodiment, the occurrence of the improper charging can be suppressed for a long term.

Modified Embodiment

In this embodiment, the bristle material develop of the brush member 11 was changed at the three levels, but a constitution in which the contact pressure and the contact area ratio are decreased by continuously decreasing the bristle material density from the brush leading end side toward the brush trailing end side may be employed. Further, the bristle material density may be decreased at two levels or at four or more levels.

Further, the brush member 11 in this embodiment may be disposed in the inclined state relative to the photosensitive drum 1 similarly as in the fourth embodiment.

Sixth Embodiment

In a sixth embodiment, a constitution in which a bristle material thickness of the brush member 11 is different depending on a place in order to make the contact pressure and the contact area ratio higher on the brush leading end side than on the brush trailing end side is employed. In the following, elements represented by the reference numerals or symbols common to the fourth and sixth embodiments substantially the same constitutions and functions as those in the fourth embodiment, and a difference from the fourth embodiment will be principally described.

In the brush member 11 in this embodiment, the bristle material thickness on the brush leading end side is made higher than the bristle material thickness on the brush trailing end side. In an example of this embodiment, electroconductive threads 11*a* with a density of 240 kF/inch$^2$ and used as bristle materials. The electroconductive threads 11*a* are decreased in thickness at three levels of 2 denier, 1.5 denier, and 1 denier for each 2 mm from the brush leading end side toward the brush trailing end side. The short width of the brush member 11 in this embodiment is 6 mm.

A schematic view in the case where the brush member 11 is observed from the free end side of the bristle materials is shown in each of parts (a) and (b) of FIG. 30. Part (a) of FIG. 30 shows this embodiment, in which the bristle materials (electroconductive threads 11*a*) become thin toward the brush trailing end side (downstream side of the rotational direction R1 of the photosensitive drum 1). On the other hand, in the fourth embodiment shown in part (b) of FIG. 30, the thickness of the bristle materials (electroconductive threads 11*a*) is constant.

Thus, in this embodiment, a constitution in which the bristle material thickness in a first position on the brush leading end side is larger (thicker) than the bristle material thickness in a second position on the brush trailing end side was employed. This embodiment is an example of a constitution in which the contact pressure and the contact area ratio in the first position on the brush leading end side are higher than the contact pressure and the contact area ratio in the second position on the brush trailing end side.

Also, in this embodiment, the Clark-Evans index w of the brush member 11 may desirably be $w \geq 1$.

In this embodiment, different from the fourth embodiment, there is no need to dispose the brush member 11 in the inclined state relative to the photosensitive drum 1. In the example of this embodiment, $\beta=0$ holds in FIG. 1. In this example, the penetration amount (maximum penetration amount) of the brush member 11 into the photosensitive drum 1 was 1 mm.

In the example of this embodiment, the contact pressure of the brush member 11 to the photosensitive drum 1 is 2 gf/mm$^2$ at the brush leading end and is 1 gf/mm$^2$ at the brush trailing end. Further, the contact area ratio is 50% at the brush leading end and is 20% at the brush leading end.

Also, in this embodiment, the brush voltage may preferably be applied to the brush member 11. The brush voltage is set at −350 V similarly as in the fourth embodiment, for example.

(Verification Experiment)

In order to verify that the improper charging can be prevented by the constitution of this embodiment, an experiment for checking whether or not the improper charging occurs in a plurality of constitution examples different in constitution of the brush member 11 and contact condition with the photosensitive drum 1 was conducted. A table 5 appearing thereinafter shows a principal contact condition and the occurrence or non-occurrence of the improper charging in each of the constitution examples, and a table 6 appearing hereinafter shows detailed constitutions of each of the constitution examples. The experimental environment, the output image, the sample image, and the evaluation method of the improper charging are common to the fourth and sixth embodiments.

The constitution described as the example of this embodiment is a constitution example 3-1.

In a constitution example 3-2, the contact pressure and the contact area ratio is made substantially constant from the brush leading end side toward the brush trailing end side.

In a constitution example 3-3, the contact pressure and the contact area ratio decrease from the brush leading end side toward the brush trailing end side in a degree similar to the degree in the constitution example 3-1, and compared with the constitution example 3-1, the bristle material of the brush member 11 is thick and is low in density as a whole.

In a constitution example 3-4, the contact pressure and the contact area ratio decrease from the between side toward the brush trailing end side in a degree similar to the degree in the constitution example 3-1, and compared with the constitution example 3-1, the bristle material of the brush member 11 is high in density as a whole.

In a constitution example 3-5, the contact pressure and the contact area ratio decrease from the brush leading end side toward the brush trailing end side, but compared with the constitution example 3-1, change amounts of the contact pressure and the contact area ratio are small.

In a constitution example 3-6, the contact pressure and the contact area ratio decrease from the brush leading end side toward the brush trailing end side and a change amount thereof is an intermediary value between the change amounts in the constitution examples 3-1 and 3-5.

TABLE 5

| CNS. EX. | PP*1 ($gf/mm^2$) | MCAR*2 (%) | CPCA*3 ($gf/mm^2$) | CARCA*4 (%) | SW*5 (mm) | IC*6 |
|---|---|---|---|---|---|---|
| 3-1 | 2 | 50 | 1 | 30 | 4 | NO |
| 3-2 | 2 | 50 | 0 | 0 | 4 | YES |
| 3-3 | 4 | 20 | 1 | 30 | 4 | YES |
| 3-4 | 2 | 70 | 1 | 30 | 4 | YES |
| 3-5 | 2 | 50 | 0.3 | 10 | 2 | YES |
| 3-6 | 2 | 50 | 0.6 | 18 | 3 | NO |

*1"PP" is the peak pressure.
*2"MCAR" is the maximum contact area ratio.
*3"CPCA" is the contact pressure change amount.
*4"CARCA" is the contact area ratio change amount.
*5"SW" is the short width.
*6"IC" is the improper charging.

TABLE 6

| CNS. EX. | BT*1 (LE/CT/TE) (denier) | DENSITY*2 (LE/CT/TE) ($kF/inch^2$) | SW*3 (mm) | PENETRATION AMOUNT MAX*4 (mm) | MIN*5 (mm) | CW*6 (mm) |
|---|---|---|---|---|---|---|
| 3-1 | 2/1.5/1 | 240/270/160 | 6 | 1 | 0.97 | 0.03 |
| 3-2 | 2 | 240 | 6 | 1 | 0.97 | 0.03 |
| 3-3 | 6/5/4 | 130/150/170 | 6 | 1 | 0.97 | 0.03 |
| 3-4 | 2/1.5/1 | 300/330/360 | 6 | 1 | 0.97 | 0.03 |
| 3-5 | 2/1.85/1.7 | 240/247/255 | 6 | 1 | 0.97 | 0.03 |
| 3-6 | 2/1.7/1.4 | 240/255/270 | 6 | 1 | 0.97 | 0.03 |

*1"BT" is the brush thickness at the leading end ("LE"), the center ("CT"), and the trailing end ("TE").
*2"DENSITY" is measured at the leading end ("LE"), the center ("CT"), and the trailing end ("TE").
*3"SW" is the short width.
*4"MAX" is the maximum penetration amount. amount.
*5"MIN" is the minimum penetration amount.
*6"CW" is the penetration amount change width.

As shown in the table 5, in the constitution examples 3-1 and 3-6, the black did not occur, so that it was confirmed that improper charging can be prevented. On the other hand, in the constitution examples 3-2 to 3-5, the improper charging occurred.

The reason that the improper charging occurred in the constitution example 3-2 in which the contact pressure and the contact pressure and the contact area ratio does not decrease from the brush leading end toward the brush trailing end would be considered because the contact pressure and the contact area ratio are high even on the brush trailing end side and therefore the toner passes through the brush contact portion in the stripe shape. From this, it is understood that as in the constitution example 3-1, the constitution in which the contact pressure and the contact area ratio decrease from the brush leading end toward the brush trailing end is effective in prevention of the occurrence of the improper charging.

Further, the improper charging occurred in the constitution example 3-5 in which the change amounts of the contact pressure and the contact area ratio are small, and the improper charging did not occur in the constitution example 3-6 in which the change amounts of the contact pressure and the contact area ratio are larger than those in the constitution example 3-5 and smaller than those in the constitution example 3-1. From this, it is understood that the larger change amounts of the contact pressure and the contact area ratio are capable of effectively suppressing the occurrence of the improper charging. Specifically, it is preferable that the change amount of the contact pressure is 0.6 $gf/mm^2$ or more, and the change amount of the contact area ratio is 15% or more, and these change amounts are more preferably 1.0 $gf/mm^2$ or more and 30% or more, respectively. However, a timing when the improper charging occurred in the constitution example 3-5 is later than the timing in the constitution example 3-2 in which the contact pressure and the contact area ratio does not decrease, so that depending on a specific constitution (for example, lifetime setting of the charging roller 2) of the image forming apparatus, the occurrence of the improper charging can be suppressed even in the constitution example 3-6 in some cases.

The reason why the improper charging occurred in the constitution example 3-3 would be considered that a minimum value (contact pressure of the brush trailing end portion) of the contact pressure of the brush member 11 is excessively high, and therefore, the toner passed through the brush member 11 in the stripe shape. For that reason, the brush trailing end contact pressure may preferably be 1.5 $gf/mm^2$ or less, for example.

The reason why the improper charging occurred in the constitution example 3-4 would be considered that the contact area ratio in the brush trailing end portion is excessively high, and therefore, the toner passes through the brush member 11 in the stripe shape. For that reason, it is preferable that the contact area ratio in the brush trailing end portion is made, for example, 40% or less.

As described above, also, by the constitution of this embodiment, the occurrence of the improper charging can be suppressed for a long term.

Modified Embodiment

In this embodiment, the bristle material thickness of the brush member 11 was changed at the three levels, but a constitution in which the contact pressure and the contact area ratio are decreased by continuously decreasing the bristle material thickness from the brush leading end side toward the brush trailing end side may be employed. Further, the bristle material thickness may be decreased at two levels or at four or more levels.

Further, the brush member 11 in this embodiment may be disposed in the inclined state relative to the photosensitive drum 1 similarly as in the fourth embodiment.

Seventh Embodiment

In a seventh embodiment, a constitution in which a penetration amount of the brush member 11 into the photosensitive drum 1 becomes small from the upstream side (brush leading end side) toward the downstream side (brush trailing end side) with respect to a rotational direction of the photosensitive drum 1 and a detailed condition thereof will be studied. In the following, elements represented by the reference numerals or symbols common to the fourth and seventh embodiments substantially the same constitutions and functions as those in the fourth embodiment, and a difference from the fourth embodiment will be principally described.

A positional relationship between the brush member 11 and the photosensitive drum 1 when the brush member 11 is disposed in the inclined state relative to the photosensitive drum 1 is shown in FIG. 31. FIG. 31 is a schematic view of the brush member 11 and the photosensitive drum 1 as viewed in the rotational axis direction of the photosensitive drum 1.

As the brush member 11 in this embodiment, the brush member 11 described in the example of the fourth embodiment was used. That is, the brush member 11 is constant in the bristle height L1, the density, and the thickness of the bristle materials as shown in part (a) of FIG. 22. Further, the brush member 11 is actually in a state in which the brush member 11 is flexed along the surface of the photosensitive drum 1 as shown in part (b) of FIG. 22, but in FIG. 31, an interference thereof with the photosensitive drum 1 is disregarded and a state in which the bristle material enters the photosensitive drum 1 is illustrated. A relation of the penetration amount δ of the brush member 11 into the photosensitive drum 1 will be described. In FIG. 31, a rotational axis O of the photosensitive drum 1 is the origin of coordinates. A coordinate axis extending in parallel to the short direction SD of the brush member 1 is an X-axis, and a coordinate axis (axis extending in a direction parallel to a direction normal to the base cloth 11*b*) perpendicular to the X-axis is a Y-axis.

At a leading end (upstream end) of the brush member 11 with respect to the rotational direction R1 of the photosensitive drum 1, the penetration amount of the brush member 11 into a phantom circle Cl defining the surface of the photosensitive drum 1 is represented by δ1. At a trailing end (downstream end) of the brush member 11 with respect to the rotational direction R1, the penetration amount of the brush member 11 into the phantom circle Cl is represented by δ2. At a center between the leading end and the trailing end of the brush member 11 with respect to the short direction SD, the penetration amount of the brush member 11 into the phantom circle Cl is represented by δ3. At this time, the penetration amounts δ1, δ2 and δ are represented by the following (formula 4) to (formula 6), respectively.

$$\delta 1 = r \times \sin(90 - \theta 1) - P \quad \text{(formula 4)}$$

$$\delta 2 = r \times \sin(90 - \theta 2) - P \quad \text{(formula 5)}$$

$$\delta 3 = r \times \sin(90 - \theta 3) - P \quad \text{(formula 6)}$$

Here, r is a radius of the photosensitive drum 1, and P is a distance from the rotation axis O of the photosensitive drum 1 to the free end of the bristle material of the brush member 11 with respect to a Y-axis direction. In other words, P is a length obtained by subtracting a distance L5, from the rotational axis O to the base cloth of the brush member 11 with respect to the Y-axis direction, from a bristle height L1 of the brush member 11. First terms on the right side of the (formula 4) to (formula 6) represent Y-coordinate of intersection points A1, A2 and A3 between the phantom circle Cl and the associated bristle material positioned at the leading end, the trailing end, and the center, respectively.

Further, angles θ1, θ2 and θ3 (°) which are formed by rectilinear lines extending from the rotational axis O of the photosensitive drum 1 through the intersection point A1, A2 and A3 between the brush member 11 and the phantom circle Cl and by associated rectilinear lines parallel to the Y-axis are represented by the following formulas (formula 7) to (formula 9), respectively.

$$\theta 1 = 90 - A\ \mathrm{COS}(Q1/r) \quad \text{(formula 7)}$$

$$\theta 2 = 90 - A\ \mathrm{COS}(Q2/r) \quad \text{(formula 8)}$$

$$\theta 3 = 90 - A\ \mathrm{COS}(Q3/r) \quad \text{(formula 9)}$$

Here, Q1 is a distance from the rotational axis O to the leading end of the brush member 11 in the X-axis direction. Q2 is a distance from the rotational axis O to the trailing end of the brush member 11 in the X-axis direction. Q3 is a distance from the rotational axis O to the center of the brush member 11 in the X-axis direction. That is, Q3=(Q1+Q2)/2 holds. Further, when the short(-side) width of the brush member 11 is L3, Q2=Q1+L3 and Q3=Q1+L3/2 hold. Further, ACOS is inverse trigonometric function (inverse function of cosine).

The penetration amount of the brush member 11 in the example of this embodiment was δ1=1.6 mm at the brush leading end, δ3=1.2 mm at the center, and δ2=0.45 mm at the brush trailing end. That is, a constitution in which the penetration amount δ1 at the upstream end of the brush member 11 with respect to the rotational direction R1 of the photosensitive drum 1 is larger than the penetration amount δ2 at the downstream end of the brush member 11 and in which δ=0 holds was employed. Further, the radius r of the photosensitive drum 1 was 12 mm. Further, θ is a contact angle of the brush member 11 to the photosensitive drum 1. In the example of this embodiment, setting was made so that the contact angle θ3 is 16°.

Also, in this embodiment, the brush voltage may preferably be applied to the brush member 11. The brush voltage is set at −350 V similarly as in the fourth embodiment, for example. Further, also, in this embodiment, the Clark-Evans index w of the brush member 11 may desirably satisfy w≥1.

(Verification Experiment)

In order to verify that the improper charging can be prevented by the constitution of this embodiment, an experiment for checking whether or not the improper charging occurs in a plurality of constitution examples different in constitution of the brush member 11 and contact condition with the photosensitive drum 1 was conducted. A table 7 appearing thereinafter shows a contact condition and the occurrence or non-occurrence of the improper charging in each of the constitution examples. The experimental environment, the output image, the sample image, and the evaluation method of the improper charging are common to the fourth and seventh embodiments.

The constitution described as the example of this embodiment is a to constitution example 4-1.

In the constitution example 4-2, the penetration amount becomes constant from the leading end to the trailing end of the brush member 11 (δ1=δ3=δ2).

In the constitution example 4-3, the penetration amount increases from the leading end to the trailing end of the brush member 11 (δ1<δ3<δ2).

In the constitution example 4-4, the penetration amount decreases from the leading end to the trailing end of the brush member 11, but compared with the constitution example 4-1, a degree of the decrease is moderate.

A difference in the penetration amount between the respective constitution examples is, for example, set by setting the bristle height L1 at a different value for each of three equal regions divided from the short width L3 of the brush member 11 with respect to the short direction SD (in which the bristle height is changed at three levels). For example, in the constitution example 4-3, the bristle height becomes long from the brush leading end side toward the brush trailing end side.

TABLE 7

| CNS. | PA*[1] (mm) | | | RATIO | | | SW*[2] | |
|---|---|---|---|---|---|---|---|---|
| EX. | LE(δ3) | CT(δ3) | TE(δ2) | δ3/δ1 | δ2/δ3 | δ2/δ1 | (mm) | IC*[3] |
| 4-1 | 1.6 | 1.2 | 0.45 | 0.75 | 0.38 | 0.28 | 4 | NO |
| 4-2 | 1.2 | 1.2 | 1.2 | 1.00 | 1.00 | 1.00 | 4 | YES |
| 4-3 | 0.4 | 1.2 | 1.6 | 3.00 | 1.33 | 4.00 | 4 | YES |
| 4-4 | 1.3 | 1.2 | 0.9 | 0.92 | 0.75 | 0.69 | 4 | SL |

*[1]"PA" is the penetration amount at the leading end ("LE"), the center "CT", and the trailing end ("TE").

*[2]"SW" is the short width.

*[3]"IC" is the improper charging. "YES" represents that the improper charging occurred. "NO" represents that the improper charging did not occur. "SL" represents that the improper charging slightly occurred.

As shown in the table 7, in the constitution examples 4-1, the black did not occur, so that it was confirmed that improper charging can be prevented. On the other hand, in the constitution examples 4-2 and 403, the improper charging occurred. In the constitution example 4-1, the slight improper charging occurred.

In the constitution examples 4-2 and 4-3, the penetration amount δ2 at the brush trailing end is equal to or larger than δ1. The reason why the improper charging occurred in the constitution examples 4-2 and 4-3 would be considered because the contact pressure or the contact area ratio is excessively high in the brush trailing end portion and therefore the toner passes through the brush member 11 in the stripe shape.

On the other hand, the reason why the improper charging did not occur or slightly occurred in the constitution examples 4-1 and 4-4 in which the penetration amount δ2 at the brush trailing end is smaller than the penetration amount δ1 at the brush leading end would be considered because the contact pressure and the contact area ratio in the brush trailing end portion are low and thus the toner can be scattered.

Further, in the constitution example 4-4 larger in ratio δ/δ1 of the penetration amounts δ1 and δ2 at the brush leading end and the brush trailing end than in the constitution example 4-1, the slight improper charging occurred. From this, it is preferable that the ratio δ2/δ1 between the penetration amounts δ1 and δ2 at the brush leading end and the brush trailing end is small. For example, δ2/δ1>0.69 is preferred. Further, since the slight improper charging occurred in the constitution example 4-4 smaller in difference (δ1−δ2) between the penetration amounts δ1 and δ2 at the brush leading end and the brush trailing end than in the constitution example 4-1, the difference (δ1−δ2) between δ1 and δ2 may preferably be large. For example, (δ1−δ2)>0.4 is preferred.

In the above-described table 7, the ratio between two of the penetration amounts δ1 to δ3 at the leading end, the center, and the trailing end of the brush member 11 are shown. When each ratio is less than 1, the ratio shows that the penetration amount of the brush member 11 decreases from the upstream side toward the downstream side with respect to the rotational direction R1 of the photosensitive drum 1. In this case, as the ratio is closer to 1, the degree of the decrease in penetration amount is more moderate (decrease rate is small), and as the ratio is closer to 0, the degree of the decrease in penetration amount is abrupt (decrease rate is large).

In the constitution examples 4-1 and 4-4, the improper charging is suppressed, and therefore, a relationship of 1>δ3/δ1>δ2/δ3 may preferably hold. This relationship means that the decrease rate of the penetration amount from the brush leading end to the brush center is relatively small and that the decrease rate of the penetration amount from the brush center to the brush trailing end is relatively large. By this constitution, in a portion on a side upstream of the center of the brush member 11 which is a portion large in penetration amount, the toner is triboelectrically charged properly, so that the polarity of the toner can be changed to the normal polarity. Further, the penetration amount becomes small in a portion downstream of the center of the brush member 11, so that the toner is scattered and can be prevented from passing through the brush member 11 in the stripe shape.

As described above, also, by the constitution of this embodiment, the occurrence of the improper charging can be suppressed for a long term.

Eighth Embodiment

In an eighth embodiment, a condition in which the brush member 11 contacts the photosensitive drum 1 with a proper penetration amount even in the case where an outer diameter of the photosensitive drum 1 changed will be studied. In the following, elements represented by the reference numerals or symbols common to the first, fourth, seventh and eighth embodiments substantially the same constitutions and functions as those in the first and fourth embodiments, and a difference from the first and fourth embodiments will be principally described.

As the brush member 11 in this embodiment, the brush member 11 described in the example of the fourth and seventh embodiments was used. That is, the brush member 11 is constant in the bristle height L1, the density, and the thickness of the bristle materials as shown in part (a) of FIG. 22. Definition of the penetration amounts δ1 to δ3 of the brush member 11 into the photosensitive drum 1 and definition of the contact angle θ3 of the brush member 11 are the same as those described in the fourth embodiment.

In this embodiment, the penetration amount of the brush member 11 is fixed at δ1=1.6 mm at the center and at δ=1.2 mm at the brush trailing end, and the penetration amount δ2 at the brush leading end is controlled by adjusting the contact angle θ3 to the photosensitive drum 1 with a different outer diameter. The radius r of the photosensitive drum 1 studied ranges from 6 mm to 24 mm.

Also, in this embodiment, the brush voltage may preferably be applied to the brush member 11. The brush voltage is set at −350 V similarly as in the fourth embodiment, for example. Further, also, in this embodiment, the Clark-Evans index w of the brush member 11 may desirably satisfy w≥1.

(Verification Experiment)

In order to verify that the improper charging can be prevented by the constitution of this embodiment, an experiment for checking whether or not the improper charging occurs in a plurality of constitution examples different in outer diameter of the photosensitive drum 1 was conducted. A table 8 appearing thereinafter shows a contact condition and the occurrence or non-occurrence of the improper charging in the case where the penetration amount δ3 at the brush center is fixed at 1.2 mm and the contact angle θ3 is set at 16°, and a table 9 appearing hereinafter shows a contact condition and the occurrence or non-occurrence of the improper charging in the case where the δ1=1.6 and δ3=1.2 are set by adjusting the contact angle θ3. The experimental environment, the output image, the same image, and the evaluation method of the improper charging are common to the fourth and eighth embodiments.

TABLE 8

| PDR*[1] (mm) | BA*[2] (°) | PA*[2] (mm) LE (δ1) | CT (δ3) | TE (δ2) | RATIO δ/δ1 | δ2/δ3 | δ2/δ1 | SW*[4] (mm) | IC*[5] |
|---|---|---|---|---|---|---|---|---|---|
| 6 | 16 | 1.42 | 1.20 | 0.21 | 0.85 | 0.18 | 0.15 | 4 | YES |
| 8 | 16 | 1.50 | 1.20 | 0.32 | 0.80 | 0.27 | 0.21 | 4 | YES |
| 10 | 16 | 1.55 | 1.20 | 0.39 | 0.77 | 0.33 | 0.25 | 4 | SL |
| 12 | 16 | 1.60 | 1.20 | 0.45 | 0.75 | 0.38 | 0.28 | 4 | NO |
| 14 | 16 | 1.61 | 1.20 | 0.47 | 0.75 | 0.39 | 0.29 | 4 | NO |
| 16 | 16 | 1.63 | 1.20 | 0.49 | 0.74 | 0.41 | 0.30 | 4 | NO |
| 18 | 16 | 1.65 | 1.20 | 0.51 | 0.73 | 0.43 | 0.31 | 4 | NO |
| 20 | 16 | 1.66 | 1.20 | 0.52 | 0.73 | 0.43 | 0.32 | 4 | NO |
| 22 | 16 | 1.66 | 1.20 | 0.52 | 0.72 | 0.43 | 0.31 | 4 | NO |
| 24 | 16 | 1.69 | 1.20 | 0.52 | 0.71 | 0.43 | 0.31 | 4 | NO |

*[1]"PDR" is the photosensitive drum radius.
*[2]"BA" is the brush angle.
*[3]"PA" is the penetration amount at the leading end ("LE"), the center "CT", and the trailing end ("TE").
*[4]"SW" is the short width.
*[5]"IC" is the improper charging. "YES" represents that the improper charging occurred. "NO" represents that the improper charging did not occur. "SL" represents that the improper charging slightly occurred.

TABLE 9

| PDR*[1] (mm) | BA*[2] (°) | PA*[3] (mm) LE (δ1) | CT (δ3) | TE (δ2) | RATIO δ/δ1 | δ2/δ3 | δ2/δ1 | SW*[4] (mm) | IC*[5] |
|---|---|---|---|---|---|---|---|---|---|
| 6 | 25.4 | 1.60 | 1.20 | −0.11 | 0.75 | −0.09 | −0.07 | 4 | YES |
| 8 | 18.0 | 1.60 | 1.20 | 0.22 | 0.75 | 0.18 | 0.14 | 4 | NO |
| 10 | 16.6 | 1.60 | 1.20 | 0.36 | 0.75 | 0.30 | 0.23 | 4 | NO |
| 12 | 16.0 | 1.60 | 1.20 | 0.45 | 0.75 | 0.38 | 0.28 | 4 | NO |
| 14 | 14.9 | 1.60 | 1.20 | 0.50 | 0.75 | 0.42 | 0.31 | 4 | NO |
| 16 | 14.4 | 1.60 | 1.20 | 0.54 | 0.75 | 0.45 | 0.34 | 4 | NO |
| 18 | 14.0 | 1.60 | 1.20 | 0.58 | 0.75 | 0.48 | 0.36 | 4 | NO |
| 20 | 13.4 | 1.60 | 1.20 | 0.61 | 0.75 | 0.51 | 0.38 | 4 | NO |
| 22 | 13.4 | 1.60 | 1.20 | 0.58 | 0.75 | 0.48 | 0.36 | 4 | NO |
| 24 | 13.2 | 1.60 | 1.20 | 0.61 | 0.75 | 0.51 | 0.38 | 4 | NO |

*[1]"PDR" is the photosensitive drum radius.
*[2]"BA" is the brush angle.
*[3]"PA" is the penetration amount at the leading end ("LE"), the center "CT", and the trailing end ("TE").
*[4]"SW" is the short width.
*[5]"IC" is the improper charging. "YES" represents that the improper charging occurred. "NO" represents that the improper charging did not occur. "SL" represents that the improper charging slightly occurred.

As shown in the table 8, in the case where the angle θ3 of the brush member 11 is fixed at 16°, the improper charging occurred when the radius r of the photosensitive drum 1 is less than 10 mm, and the improper charging slightly occurred when the radius r is 10 mm. On the other hand, the improper charging did not occur when the radius r is larger than 10 mm.

With a smaller radius r of the photosensitive drum 1, the penetration amount δ1 at the brush leading end when the brush member 11 is contacted to the photosensitive drum 1 in a condition of δ3=1.2 mm and θ3=16° becomes smaller. For that reason, with the smaller radius r of the photosensitive drum 1, the ratio (δ3/δ1) of the penetration amount δ3 at the brush center to the penetration amount δ1 at the brush leading end becomes larger. That is, with the smaller radius r of the photosensitive drum 1, δ3/δ1 approaches 1, so that the contact state (contact pressure, contact area ratio) of the brush central portion becomes closer to the contact state of the brush leading end portion.

In the case where the radius r of the photosensitive drum 1 is small, it would be considered that a state in which the toner is localized at the brush leading end portion where the penetration amount is large is formed, and then the localization of the toner is not readily eliminated even at the brush central portion. Further, the toner cannot be sufficiently scattered only by the brush trailing end portion, so that the toner passes through the brush member 11 in the stripe shape. As a result, it would be considered that the improper charging occurred in the case where the radius r of the photosensitive drum 1 is less than 10 mm. On the other hand, it would be considered that in the case where the radius r of the photosensitive drum 1 is larger than 10 mm, δ3/δ1 is relatively small, and therefore, the brush central portion contributes to scattering of the toner and thus the toner does not readily pass through the brush member 11 in the stripe shape and the improper charging is suppressed.

From this, the ratio (δ3/δ1) of the penetration amount δ3 at the brush center to the penetration amount δ1 at the brush leading end would be considered that δ3/δ1≤0.77 may preferably hold, and more preferably, δ3/δ1≤0.75 holds.

Therefore, as shown in the table 9, when the contact angle θ3 is set so as to satisfy δ/δ1=0.75 for each of the photosensitive drums 1 different in radius r, the improper charging did not occur even in the case where the radius r is 8 mm and 10 mm.

Incidentally, as regards the brush member 11 of 4 mm in short width L3 used in verification, when the relationship of δ3/δ1≤0.75 is intended to be satisfied in the case where the radius r of the photosensitive drum 1 is 6 mm, the brush trailing end floats from the surface of the photosensitive drum 1. As a result, in the case of r=6 mm, the improper charging occurred.

Further, from a result of the table 9, the ratio (δ2/δ1) of the penetration amount δ2 at the brush trailing end to the penetration amount δ1 at the brush leading end may preferably be in a range of 0.14≤δ2/δ1≤0.38. By making the penetration amount at the brush trailing end smaller than the penetration amount at the brush leading end so as to fall within this range, the toner is uniformly scattered on the trailing end side of the brush member 11 while being triboelectrically charged properly on the leading end side of the brush member 11.

Other Embodiments

In the above-described embodiments, the constitution of the direct transfer type in which the toner image is directly transferred from the photosensitive drum 1 (image bearing member) onto the sheet (recording material) as the toner image receiving member was described, but the present invention may be applied to an image forming apparatus of an intermediary transfer type. In the case of the intermediary transfer type, the transfer member refers to, for example, a transfer roller (primary transfer roller) for primary-transferring the toner image from the photosensitive drum 1 as the image bearing member onto the intermediary transfer member as the toner image receiving member. As the intermediary transfer member, an endless belt member stretched by a plurality of rollers can be used. The toner image primary-transferred on the intermediary transfer member is secondary-transferred from the intermediary transfer member onto the sheet (recording material) by a secondary transfer means such as a secondary transfer roller for forming a secondary transfer nip between itself and the intermediary transfer member. Even in a constitution of such an intermediary transfer type, effects similar to the effects of the above-described embodiments can be obtained by replacing the transfer roller in each of the above-described embodiments with the primary transfer roller.

Further, in the above-described embodiments, principally, electric charge impartment by the triboelectric charge due to the friction between the brush member and the toner was described, but a method of imparting the electric charge is not limited thereto. For example, a constitution in which injection charging for injecting the electric charge into the toner through the brush member is carried out may be employed. That is, irrespective of the charge imparting method, the brush member may only be required to be capable of localizing the electric charge distribution of the residual toner, after passing through the brush contact portion and before reaching the charging portion, on the normal polarity side compared with the electric charge distribution of the residual toner before reaching the brush contact portion while being carried on the image bearing member.

According to the present invention, in the constitution in which the brush member contacting the image bearing member, the occurrence of the improper charging can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2021-204782 filed on Dec. 17, 2021, and 2021-204783 filed on Dec. 17, 2021, which are hereby incorporated by reference herein in their entirety.

What is claimed is:

1. An image forming apparatus comprising:

a rotatable image bearing member;

a developing member configured to develop an electrostatic latent image, formed on a surface of the image bearing member, with toner in a developing portion;

a transfer member configured to transfer a toner image, obtained by developing the electrostatic latent image by the developing member, from the image bearing member onto a toner image receiving member in a transfer portion; and a brush contacting the surface of the image bearing member in a contact portion downstream of the transfer portion and upstream of the developing portion with respect to a rotational direction of the image bearing member, wherein the toner which is not transferred onto the toner image receiving member is collected by the developing member, wherein in a charging series, the toner is positioned on the same side as a normal charge polarity of the toner relative to the brush, and wherein in the contact portion, a maximum value of a contact pressure of 0.7 gf/$mm^2$ or more and 3.5 gf/$mm^2$ or less, a maximum contact area ratio is 18% or more and 74% or less, and a Clark-Evans index of the brush is 1 or more.

2. An image forming apparatus comprising:

a rotatable image bearing member;

a developing member configured to develop an electrostatic latent image, formed on a surface of the image bearing member, with toner in a developing portion;

a transfer member configured to transfer a toner image, obtained by developing the electrostatic latent image by the developing member, from the image bearing member onto a toner image receiving member in a transfer portion;

a brush contacting the surface of the image bearing member in a contact portion downstream of the transfer member and upstream of the developing member with respect to a rotational direction of the image bearing member; and voltage applying means configured to apply a voltage to the brush, wherein the toner which is not transferred onto the toner image receiving member is collected by the developing member, wherein the voltage applied to the brush by the voltage applying means is on the same side as a normal charge polarity of the toner relative to a surface potential of the image bearing member, and wherein in the contact portion, a maximum value of a contact pressure of 0.7 gf/$mm^2$ or more and 3.5 gf/$mm^2$ or less, a maximum contact area ratio is 18% or more and 74% or less, and a Clark-Evans index of the brush is 1 or more.

3. An image forming apparatus according to claim 2, wherein in a charging series, the toner is positioned on the same side as the normal charge polarity of the toner relative to the brush.

4. An image forming apparatus according to claim 2, wherein in a most upstream portion of the contact portion with respect to the rotational direction, the contact pressure is 0.7 gf/$mm^2$ or more, the contact area ratio is 18% or more, and the Clark-Evans index is 1 or more.

5. An image forming apparatus according to claim 2, wherein in a most upstream portion of the contact portion with respect to the rotational direction, the contact pressure and the contact area ratio are maximum.

6. An image forming apparatus according to claim 5, wherein the brush includes a base portion extending in a longitudinal direction parallel to a rotational axis direction of the image bearing member and a short direction perpendicular to the longitudinal direction and includes a bristle material supported by the base portion, and wherein as viewed in the rotational axis direction, the brush is inclined relative to the image bearing member so that the base portion is spaced from a tangential line of the image bearing member toward a downstream of the rotational direction.

7. An image forming apparatus according to claim 1, wherein in the contact portion, a maximum value of the contact pressure is 1.4 gf/$mm^2$ or more and 2.8 gf/$mm^2$ or less, and a maximum contact area ratio is 32% or more and 60% or less.

8. An image forming apparatus according to claim 1, further comprising:

a charging member configured to electrically charge the surface of the image bearing member in a charging portion, wherein the brush is disposed downstream of the transfer portion and upstream of the charging portion with respect to the rotational direction of the image bearing member.

9. An image forming apparatus according to claim 8, wherein the charging member is a charging roller disposed and rotated in contact with the image bearing member in the charging portion.

10. An image forming apparatus according to claim 8, wherein in a charging series, the toner is positioned on the same side as the normal charge polarity of the toner relative to a material of a surface layer of the charging member and a material of a surface layer of the image bearing member.

11. An image forming apparatus according to claim 1, wherein the brush includes a base portion and a bristle material supported by the base portion, and wherein the bristle material is a synthetic resin fiber of 1 denier or more and 6 denier or less in thickness, and a density of the bristle material is 150 $kF/inch^2$ or more.

12. An image forming apparatus according to claim 1, wherein the toner image receiving member is a recording material.

13. An image forming apparatus according to claim 1, wherein the toner image receiving member is an intermediary transfer member, and wherein the image forming apparatus further comprises secondary transfer means configured to transfer the toner image, transferred onto the intermediary transfer member, onto the recording material.

14. An image forming apparatus comprising:

a rotatable image bearing member;

a charging member forming a charging portion in contact with the image bearing member and configured to electrically charge a surface of the image bearing member in the charging portion;

a developing member configured to develop, with the toner, an electrostatic latent image formed on the surface of the image bearing member;

a transfer member configured to transfer a toner image, obtained by developing the electrostatic latent image by the developing member, from the image bearing member onto a toner image receiving member in a transfer portion; and a brush provided so as to contact the surface of the image bearing member in a contact portion downstream of the transfer portion and upstream of the charging portion with respect to a rotational direction of the image bearing member, and configured to electrically charge the toner which is not transferred onto the toner image receiving member, wherein the toner which is not transferred onto the toner image receiving member is collected by the developing member, wherein with respect to the rotational direction, a contact pressure between the brush and the image bearing member at an upstream end of the brush in the contact portion is higher than a contact pressure between the brush and the image bearing member at a downstream end of the brush in the contact portion, and wherein a contact area ratio between the brush and the image bearing member at the upstream end of the brush is larger than a contact area ratio between the brush and the image bearing member at the downstream end of the brush.

15. An image forming apparatus according to claim 14, wherein the contact pressure and the contact area ratio monotonously decreases from the upstream end toward the downstream end with respect to the rotational direction.

16. An image forming apparatus according to claim 14, wherein a difference in contact pressure between a maximum value and a minimum value is 0.6 $gf/mm^2$ or more and 1.5 $gf/mm^2$ or less, and a difference in contact area ratio between a maximum value and a minimum value is 15% or more and 40% or less.

17. An image forming apparatus according to claim 14, wherein a difference in contact pressure between a material value and a minimum value is 0.7 $gf/mm^2$ or more and 3.5 $gf/mm^2$ or less, and a difference in contact area ratio between a maximum value and a minimum value is 18% or more and 74% or less.

18. An image forming apparatus according to claim 14, wherein a difference contact pressure between a maximum value and a minimum value is 1.4 $gf/mm^2$ or more and 2.8 $gf/mm^2$ or less, and a difference in contact area ratio between a maximum value and a minimum value is 32% or more and 60% or less.

19. An image forming apparatus according to claim 14, wherein the brush includes a base portion extending in a longitudinal direction parallel to a rotational axis direction of the image bearing member and a short direction perpendicular to the longitudinal direction and includes a bristle material supported by the base portion and contacting the surface of the image bearing member, and wherein the brush is inclined relative to the image bearing member so that the base portion is spaced from the image bearing member toward a downstream of the rotational direction.

20. An image forming apparatus according to claim 19, wherein as viewed in the rotational axis direction, a rectilinear line passing through a rotational axis and a center of the base portion with respect to the short direction is a first rectilinear line, and wherein an angle between a second rectilinear line perpendicular to the first rectilinear line and a third rectilinear line extending along the base portion in the short direction is 8° or more and 16° or less.

21. An image forming apparatus according to claim 14, wherein the brush includes a bristle material contacting the surface of the image bearing member, and wherein a density of the bristle material at the upstream end of the brush is higher than a density of the bristle material at the downstream end of the brush.

22. An image forming apparatus according to claim 14, wherein the brush includes a bristle material contacting the surface of the image bearing member, wherein a thickness of the bristle material at the upstream end of the brush is larger than a thickness of the bristle material at the downstream end of the brush.

23. An image forming apparatus according to claim 14, wherein when a penetration amount of the brush in the surface of the image bearing member at the upstream end of the brush with respect to the rotational direction is δ1 (mm) and a penetration amount of the brush in the surface of the image bearing member at the downstream end of the brush with respect to the rotational direction is δ2 (mm), the following relationship is satisfied:

$$\delta 1 > \delta 2 > 0.$$

24. An image forming apparatus comprising:

a rotatable image bearing member;

a charging member forming a charging portion in contact with the image bearing member and configured to electrically charge a surface of the is image bearing member in the charging portion;

a developing member configured to develop, with the toner, an electrostatic latent image formed on the surface of the image bearing member;

a transfer member configured to transfer a toner image, obtained by developing the electrostatic latent image by the developing member, from the image bearing member onto a toner image receiving member in a transfer portion; and a brush provided so as to contact the surface of the image bearing member in a contact portion downstream of the transfer portion and upstream of the charging portion with respect to a rotational direction of the image bearing member, and configured to electrically charge the toner which is not transferred onto the toner image receiving member, wherein the toner which is not transferred onto the toner image receiving member is collected by the developing member, and wherein when a penetration amount of the brush in the surface of the image bearing member at the upstream end of the brush with respect to the rotational direction is δ1 (mm) and a penetration amount of the brush in the surface of the image bearing member at the downstream end of the brush with respect to the rotational direction is δ2 (mm), the following relationship is satisfied:

$$\delta 1>\delta 2>0.$$

25. An image forming apparatus according to claim 23, wherein when the penetration amount at a center between the upstream end and the downstream end of the brush with respect to a short direction of the brush perpendicular to a rotational axis direction of the image bearing member is δ3 (mm), the following relationship is satisfied:

$$1>\delta 3/\delta 1>\delta 2/\delta 3.$$

26. An image forming apparatus according to claim 24, wherein when the penetration amount at a center between the upstream end and the downstream end of the brush with respect to a short direction of the brush perpendicular to a rotational axis direction of the image bearing member is δ3 (mm), the following relationship is satisfied:

$$1>\delta 3/\delta 1>\delta 2/\delta 3.$$

27. An image forming apparatus according to claim 25, wherein when a radius of the image bearing member is r (mm), in a range of r>6, the following relationships are satisfied:

$$0.14\leq\delta 2/\delta 1\leq 0.38, \text{ and}$$

$$\delta 3/\delta 1\leq 0.75.$$

28. An image forming apparatus according to claim 26, wherein when a radius of the image bearing member is r (mm), and in a range of r>6, the following relationships are satisfied:

$$0.14\leq\delta 2/\delta 1\leq 0.38, \text{ and}$$

$$\delta 3/\delta 1\leq 0.75.$$

29. An image forming apparatus according to claim 25, wherein in a region from the upstream end to the downstream end of the brush, the penetration amount monotonously decreases.

30. An image forming apparatus according to claim 14, further comprising voltage applying means configured to apply a voltage of the same polarity as a normal charge polarity of the toner to the brush.

31. An image forming apparatus according to claim 30, wherein a value of the voltage applied to the brush by the voltage applying means is on the same side as the normal charge polarity of the toner relative to a surface potential of the image bearing member reaching the contact portion with the brush.

32. An image forming apparatus according to claim 14, wherein in a charging series, the toner is positioned on the same side as a normal charge polarity of the toner relative to the brush.

33. An image forming apparatus according to claim 32, wherein a peripheral speed of the charging member is higher than a peripheral speed of the image bearing member, and wherein in a charging series, the toner is positioned on the same side as a normal charge polarity of the toner relative to a material of a surface layer of the charging member and a material of a surface layer of the image bearing member.

34. An image forming apparatus according to claim 14, wherein a Clark-Evans index of the brush in the contact portion between the brush and the image bearing member is 1 or more.

35. An image forming apparatus according to claim 14, wherein a length of the brush in a short direction of the brush perpendicular to a rotational axis direction is 3 mm or more, wherein a bristle material of the brush is a synthetic resin fiber is having a thickness of 1 denier or more and 6 denier or less, and wherein a density of the bristle material is 150 kF/inch$^2$ or more.

36. An image forming apparatus according to claim 14, wherein the toner image receiving member is a recording material.

37. An image forming apparatus according to claim 14, wherein the toner image receiving member is an intermediary transfer member, and wherein the image forming apparatus further comprises secondary transfer means configured to transfer the toner image, transferred onto the intermediary transfer member, onto the recording material.

* * * * *